(12) United States Patent
Tanaka et al.

(10) Patent No.: US 7,301,686 B2
(45) Date of Patent: Nov. 27, 2007

(54) OPTICALLY CONTROLLED OPTICAL-PATH-SWITCHING APPARATUS, AND METHOD OF SWITCHING OPTICAL PATHS

(75) Inventors: Norio Tanaka, Tokyo (JP); Ichiro Ueno, Isehara (JP); Takashi Hiraga, Ikeda (JP); Nobutaka Tanigaki, Ikeda (JP); Toshiko Mizokuro, Ikeda (JP); Noritaka Yamamoto, Ikeda (JP); Hiroyuki Mochizuki, Ikeda (JP)

(73) Assignees: Dainichiseika Color & Chemicals Mfg. Co., Ltd., Tokyo (JP); National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 10/586,351

(22) PCT Filed: Feb. 17, 2005

(86) PCT No.: PCT/JP2005/002964

§ 371 (c)(1),
(2), (4) Date: Jul. 14, 2006

(87) PCT Pub. No.: WO2005/081573

PCT Pub. Date: Sep. 1, 2005

(65) Prior Publication Data

US 2007/0104417 A1    May 10, 2007

(30) Foreign Application Priority Data

Feb. 20, 2004 (JP) .............................. 2004-044991

(51) Int. Cl.
| G02F 1/03 | (2006.01) |
| G02F 1/01 | (2006.01) |
| G02F 1/29 | (2006.01) |
| G02F 1/295 | (2006.01) |
| G02B 27/14 | (2006.01) |
| G02B 27/12 | (2006.01) |
| G02B 3/10 | (2006.01) |
| G02B 6/00 | (2006.01) |

(52) U.S. Cl. .............................. 359/244; 385/4; 385/31; 359/288; 359/299; 359/636; 359/639; 359/721

(58) Field of Classification Search ................. 359/244
See application file for complete search history.

(56) References Cited

U.S. PATENT DOCUMENTS 6,452,710 B1 * 9/2002 Hiraga et al. ................ 359/244
2005/0248844 A1 11/2005 Ueno et al.

FOREIGN PATENT DOCUMENTS

EP        1 011 007 A1     6/2000

(Continued)

Primary Examiner—Kevin S. Wood
Assistant Examiner—Kajli Prince
(74) Attorney, Agent, or Firm—Oliff & Berridge, PLC

(57) ABSTRACT

An optical signal optical path switching method comprising steps of using a thermal lens based on a distribution of refractive index produced reversibly caused by temperature increase generated in an area of the light-absorbing layer film of thermal lens forming devices 1, 2 and 3, that has absorbed control light beams 121, 122 and 123, and in the periphery thereof, causing the converged signal light beam to exit from the thermal lens forming device with an ordinary divergence angle when the control light beams 121, 122 and 123 have not been irradiated and no thermal lens has been formed, and causing the converged signal light beam to exit from the thermal lens forming device with a divergence angle larger than the ordinary divergence angle when the control light beams have been irradiated and a thermal lens has been formed, and causing the signal light beam to travel straight through holes 61, 62 and 63 of mirrors provided with the holes for the signal light beam to pass through when the control light beams have not been irradiated and no thermal lens has been formed, and changing the optical path by reflecting the signal light beam using the hole-provided mirror when the control light beams have been irradiated and a thermal lens has been formed.

18 Claims, 24 Drawing Sheets

FOREIGN PATENT DOCUMENTS

| | | |
|---|---|---|
| JP | A-60-014221 | 1/1985 |
| JP | A-08-286220 | 11/1996 |
| JP | A-08-320535 | 12/1996 |
| JP | A-08-320536 | 12/1996 |
| JP | A-09-329816 | 12/1997 |
| JP | A-10-090733 | 4/1998 |
| JP | A-10-090734 | 4/1998 |
| JP | A-10-148853 | 6/1998 |
| JP | A-10-148852 | 6/1999 |
| JP | A-11-194373 | 7/1999 |
| JP | A-2004-109892 | 4/2004 |
| WO | WO 2004/027508 A1 | 4/2004 |

* cited by examiner

OPTICALLY CONTROLLED OPTICAL-PATH-SWITCHING APPARATUS, AND METHOD OF SWITCHING OPTICAL PATHS

BACKGROUND OF THE INVENTION

1. Field of the Invention

The present invention relates to an optically controlled optical-path-switching-type optical signal transmission apparatus and to a method of switching optical paths for optical signals, that are used in the fields of optical communications and of optical information processing.

2. Description of the Related Art

In order to cope with the explosive increase of network traffic along with the expansion of the Internet and corporate and domestic intranets, an optical path switching apparatus not involving any electric signal (optical switch), i.e., a light-to-light direct switch is being sought. As an optical fiber, an optical waveguide, or an apparatus for or a method of switching courses for light beams propagating in space to travel, i.e., optical paths, schemes are known such as, for example, a space division scheme in which s optical paths are switched in an optical waveguide or between optical waveguides, a wavelength division multiplexing scheme in which a multiplexed light beam having a plurality of wavelengths is switched by dividing the light beam for optical paths according to the wavelength, a time division multiplexing scheme in which optical paths of light beams that are time-division-multiplexed at an constant time interval are switched, and a free space scheme in which spatially optical paths of light beams propagating through space are divided and coupled using a mirror or a shutter. Each of these schemes can be multiplexed, or a plurality of schemes can be used in combination.

Proposed space-division-type optical switches include those that utilize a directional coupler, those that create a copy of an optical signal using an optical dropper and switch a light beam between ON and OFF using a gate device, those that transmit or reflect a light beam propagating a waveguide by varying the refractive index of the waveguide at a crossing portion of an intersection or a Y-shaped branching point, and others. However, all of these remain in the stage of research and development. Apparatuses employing a thermo-optical effect created by using an electric heater to vary the refractive index of a waveguide of a Mach-Zehnder-interferometer-type optical waveguide switch are approaching practical application, but such apparatuses re disadvantageous in that this type of apparatus has a low response speed, of approximately 1 millisecond, and also requires an electric signal to operate the optical switch.

Meanwhile, available free-space-type optical switches include a micro-electro mechanical system (abbreviated to MEMS), an exciton absorption reflection switch (abbreviated to EARS), a multi-stage-beam-deflector-type optical switch, a hologram-type switch, a liquid crystal switch, and others. However, these switches cannot be said to be sufficiently developed for practical use because they have assignments such as that they have mechanically movable portions; they are dependent on polarized electromagnetic radiation, and other factors.

On the other hand, there is active study of total-light-type optical devices or optical control methods that modulate the intensity or the frequency of a light beam directly by utilizing variation of the transmittance or the refractive index caused when an optical device is irradiated with light.

The inventors of the invention described in the present application are continuing an ongoing study of an optical control method aimed at development of a new information processing technique with a total-light-type optical device, etc. using an organic nanoparticle thermo-optical lens forming device formed by dispersing organic pigment aggregate in a polymer matrix (see Takashi Hiraga, Norio Tanaka, Kikuko Hayamizu and Tetsuo Moriya, "Formation, Structure Evaluation and Photo-Material Property of Associated/Aggregated Pigment", Journal of Electronic Technology General Institute, Electronic Technology General Institute, Agency of Industrial Science and Technology, Ministry of International Trade and Industry, Vol. 59, No. 2, pp. 29-49 (1994)). Currently, a device employing a scheme that modulates a signal light beam (780 nm) by a control light beam (633 nm), having a characteristic that the control light beam and the signal light beam are coaxial and have incidence of the same focal point, and based on an operational principle that the signal light beam is refracted by a thermal lens formed transiently by absorption of the control light beam, is being developed and a high-speed response of approximately 20 nanoseconds has been achieved. Japanese Patent Application Laid-Open Publications Nos. 1996-286220, 1996-320535, 1996-320536, 1997-329816, 1998-90733, 1998-90734 and 1998-148852 disclose an optical control method of carrying out intensity modulation and/or light flux density modulation of a signal light beam transmitted through an optical device by reversibly varying the transmittance and/or the refractive index of the signal light beam in a different wavelength band from that of the control light beam by irradiating the optical device comprising optically responsive composition, with the control light beam, wherein the control light beam and the signal light beam are converged and irradiated on the optical device, and the optical paths of the control light beam and the signal light beam are adjusted such that an area having the highest photon density in the vicinity of a focus (beam waist) of each of the control light beam and the signal light beam are overlapped on each other in the optical device. Furthermore, Japanese Patent Application Laid-Open Publication No. 1998-148853 discloses an optical control method of carrying out intensity modulation and/or light flux density modulation of a signal light beam transmitting a thermal lens by reversibly forming the thermal lens based on the distribution of density variation caused by a temperature increase generated in an area of the photo-responsive composition, that has absorbed the control light beam and the surrounding area thereof, wherein a control light beam and the signal light beam having a wavelength different from each other are irradiated on an optical device comprising photo-responsive composition, the wavelength of the control light beam is selected from a wavelength band that the photo-responsive composition absorbs. Yet further, in Japanese Patent Application Laid-Open Publication No. 1998-148853, it is described that a pigment/resin film or a pigment solution film is, for example, used as the optical device and a response time of the signal light beam against the irradiated control light beam for the case where the control light beam has a power of 2 to 25 mW is shorter than 2 μsec.

Here, the thermal lens effect is a refractive effect in which molecules, etc. that have absorbed light in the central area of light absorption convert the light into heat, a temperature distribution is created by propagation of this heat to the surrounding area, and, as a result, the refractive index of an optical transmitting matter is varied spherically from the center of the light absorption to the outer region to create a distribution for the refractive index which is lower at the center of the light absorption and higher continuing outward, with functions similar to those of a convex lens. The thermal lens effect has long been utilized in the field of spectral analysis, and an ultra high sensitivity spectral analysis can be carried out that can detect the light absorption of even a single molecule (see Kitao Fujiwara, Keiichiro Fuwa and Takayosi Kobayasi, "A Laser-Induced Thermal Lens Effect and Its Application to Calorimetry", Chemistry, Kagaku-Dojin, Vol. 36, No. 6, pp. 432-438 (1981); Takehiko kitamori and Tsuguro Sawada, "Photo-Thermo Conversion Spectral Analysis Method", Bunseki, Japanese Society of Analytical Chemistry, March, 1994, pp. 178-187).

Moreover, Japanese Patent Application Laid-Open Publication No. 1985-14221 discloses, as a method of deflecting an optical path using variation of refractive index caused by the thermal lens effect or heat, a method of deflecting a light beam by creating a distribution of refractive index in a medium by providing heat using a heating resistor.

However, because, in all of the above methods, heat is produced using a heating resistor and a medium is heated using conduction, these methods have an intrinsic problem of diffusion of heat. That is, because of the diffusion of heat, a fine thermal gradient cannot be provided over a large area and a desired distribution of the refractive index cannot not be easily or reliably obtained. Furthermore, in actual practice, the fine processing of a heating resistor is limited, even when a photolithography technique used for semiconductor integrated circuits is employed, such that it is not possible to prevent the size of the device from increasing. When the size of the device increases, the optical system becomes larger and more complicated. Furthermore, because heat is produced using a heating resistor and the medium is heated by conduction of the heat, this invention has intrinsic disadvantages such as that the response is slow and the frequency for varying the refractive index cannot be increased.

Moreover, Japanese Patent Application Laid-Open Publication No. 1999-194373 discloses a deflecting device using an optical device, comprising at least the optical device comprising an photo-sensitive composition and intensity distribution adjusting means for irradiating the optical device with light in a wedge-shaped optical intensity distribution, wherein a distribution of refractive index is formed in the optical device by a control light beam and deflection of a signal light beam having a wavelength different from that of the control light beam is carried out by the distribution of the refractive index. Although this scheme is excellent in terms of controlling light using light, this scheme is constrained in that the angle of deflection must be within 30 degrees and, therefore, is problematic in that directions for switching optical paths cannot be freely set.

Then, the inventors filed a patent application describing an optical path switching method as described below which provides an optical path switching apparatus and an optical path switching method having no polarized-electromagnetic-wave dependence, for which angles and directions for switching optical paths can be set freely, with which optical intensity attenuation of a signal light beam is small, and which can be used in multiple connection. In this method of switching optical paths, which is disclosed in Japanese Patent Application Laid-Open Publication No. 2004-109892, a control light beam having a wavelength selected from a wavelength band that a light absorbing layer film absorbs and a signal light beam having a wavelength selected from a wavelength band that the light absorbing layer film does not absorb are respectively converged and irradiated on the light absorbing layer film in a thermal lens forming device containing at least the light absorbing layer film; arrangement is adjusted such that at least the control light beam is focused within the light absorbing layer film; and a thermal lens based on a distribution of the refractive index created reversibly caused by a temperature increase produced in an area of the light absorbing layer film that has absorbed the control light beam and the area surrounding the area is used. Thereby, a state where the converged signal light beam exits from the thermal lens forming device at an ordinary divergence angle in the case when the control light beam is not irradiated and no thermal lens is formed, and another state where the converged signal light beam exits from the thermal lens forming device at a divergence angle larger than the ordinary divergence angle in the case when the control light beam is irradiated and a thermal lens is formed are realized in response to the presence or absence of the irradiation of the control light beam; in the case where the control light beam is not irradiated and no thermal lens is formed, the signal light beam existing from the thermal lens forming device at the ordinary divergence angle is as is, or after changing the ordinary divergence angle using a light-receiving lens, directed to travel straight through a hole of a mirror provided with a hole to pass the signal light beam; but, when the control light beam is irradiated and a thermal lens is formed, the signal light beam exiting diverging from the thermal lens forming device at a divergence angle larger than the ordinary divergence angle is as is, or after changing the divergence angle of the divergence using a light-receiving lens, reflected using the mirror provided with the hole.

SUMMARY OF THE INVENTION

The present invention advantageously provides an optically controlled optical-path-switching-type optical signal transmitting apparatus and a method of switching optical paths for optical signals, that do not suffer from the problems associated with use of an electric circuit or mechanical elements, that operate at a high speed, and that have high durability and no dependence on polarized electromagnetic waves.

In order to attain the above advantage, an optically controlled optical-path-switching-type optical signal transmission apparatus of the present invention comprises a signal light beam light source for irradiating a signal light beam having one (1) or more wavelengths; a control light beam light source for irradiating a control light beam having two (2) or more wavelengths that are different from those of the signal light beam; two (2) or more light-absorbing layer films for transmitting the signal light beam and selectively absorbing respectively only one (1) specific wavelength of the control light beam; means for respectively converging and irradiating the control light beam and the signal light beam to each of the light-absorbing layer films; two (2) or more thermal lens forming devices for causing the converged signal light beam to exit maintaining the beam converged or for varying the angle of divergence of the signal light beam and for causing the signal beam to exit, in response to the presence or absence of irradiation of the one (1) specific wavelength of the control light beam, by using a thermal lens containing the light-absorbing layer films and based on a distribution of refractive index produced reversibly caused by temperature increase generated in an area of the light-absorbing layer film that has absorbed the one (1) specific wavelength of the control light beam and in the periphery thereof; and a mirror provided respectively after each of the thermal lens forming devices and having a hole and reflecting means, for passing the signal light beam having exited the thermal lens forming devices through the hole or deflecting the optical path of the signal light beam by reflecting the signal light beam by the reflecting means in response to the presence or absence of irradiation of the one (1) specific wavelength of the control light beam.

Another optically controlled optical-path-switching-type optical signal transmission apparatus of the present invention comprises a signal light beam light source for irradiating a signal light beam having one (1) or more wavelength(s); a control light beam light source for irradiating a control light beam having two (2) or more wavelengths that are different from those of the signal light beam; two (2) or more light-absorbing layer films for transmitting the signal light beam and selectively absorbing respectively only one (1) specific wavelength of the control light beam; means for respectively converging and irradiating the control light beam and the signal light beam to each of the light-absorbing layer films; and two (2) or more sets of optical path switching mechanism each comprising a combination of a thermal lens forming device and a mirror having a hole, wherein the thermal lens forming device includes the light-absorbing layer films and, by using a thermal lens based on a distribution of refractive index produced reversibly caused by temperature increase generated in an area of the light-absorbing layer film that has absorbed the one (1) specific wavelength of the control light beam and in the periphery thereof, causes the converged signal light beam to exit with an ordinary divergence angle when the one (1) specific wavelength of the control light beam has not been irradiated and no thermal lens has been formed, and causes the converged signal light beam to exit with a divergence angle larger than the ordinary divergence angle when the one (1) specific wavelength of the control light beam has been irradiated and a thermal lens has been formed, and changes the divergence angle of the signal light beam directed to exit in response to the presence or absence of irradiation of the one (1) specific wavelength of the control light beam, and wherein the mirror having a hole has the hole for passing either the signal light beam output from the thermal lens forming device with the ordinary divergence angle as is, or the signal light beam with the divergence angle varied by a light-receiving lens when the one (1) specific wavelength of the control light beam has not been irradiated and no thermal lens has been formed, and reflecting means for reflecting either the signal light beam output diverging from the thermal lens forming device with the divergence angle larger than the ordinary divergence angle as is, or the signal light beam with the divergence angle varied by the light-receiving lens when the one (1) specific wavelength of the control light beam has been irradiated and a thermal lens has been formed in the vicinity of an incidence surface of the light-absorbing layer film, and changes the optical paths.

A further optically controlled optical-path-switching-type optical signal transmission apparatus of the present invention comprises a signal light beam light source for irradiating a signal light beam having one (1) or more wavelength(s); a control light beam light source for irradiating a control light beam having two (2) or more wavelengths that are different from those of the signal light beam; two (2) or more light-absorbing layer films for transmitting the signal light beam and selectively absorbing respectively only one (1) specific wavelength of the control light beam; means for respectively converging and irradiating the control light beam and the signal light beam to each of the light-absorbing layer films; and two (2) or more sets of optical path switching mechanism each comprising a combination of a thermal lens forming device and a mirror having a hole, wherein the thermal lens forming device includes the light-absorbing layer films and, by using a thermal lens based on a distribution of refractive index produced reversibly caused by temperature increase generated in an area of the light-absorbing layer film that has absorbed the one (1) specific wavelength of the control light beam and in the periphery thereof, causes the converged signal light beam to exit as converged when the one (1) specific wavelength of the control light beam has been irradiated and a thermal lens has been formed, and causes the converged signal light beam to exit with an ordinary divergence angle when the control light beam has not been irradiated and no thermal lens has been formed, and changes the divergence angle of the signal light beam directed to exit in response to the presence or absence of irradiation of the one (1) specific wavelength of the control light beam, and wherein the mirror having a hole has the hole for passing the converged signal light beam output from the thermal lens forming device as converged when the one (1) specific wavelength of the control light beam has been irradiated and a thermal lens has been formed in the vicinity of an exiting surface of the light-absorbing layer film, and reflecting means for reflecting either the signal light beam output from the thermal lens forming device with the ordinary divergence angle as is, or the signal light beam that has passed through a light-receiving lens provided for changing the divergence angle when the one (1) specific wavelength of the control light beam has not been irradiated and no thermal lens has been formed, and changes the optical paths.

Still another optically controlled optical-path-switching-type optical signal transmission apparatus of the present invention comprises a signal light beam light source for irradiating a signal light beam having one (1) or more wavelength(s); a control light beam light source for irradiating a control light beam having two (2) or more wavelengths that are different from those of the signal light beam; two (2) or more light-absorbing layer films for transmitting the signal light beam and selectively absorbing respectively only one (1) specific wavelength of the control light beam; means for respectively converging and irradiating the control light beam and the signal light beam to each of the light-absorbing layer films; one (1) or more sets of first optical path switching mechanism each comprising a combination of a first thermal lens forming device and a first mirror having a hole; and one (1) or more sets of second optical path switching mechanism each comprising a combination of a second thermal lens forming device and a second mirror having a hole, wherein the first thermal lens forming device includes the light-absorbing layer films and, by using a thermal lens based on a distribution of refractive index produced reversibly caused by temperature increase generated in an area of the light-absorbing layer film that has absorbed the one (1) specific wavelength of the control light beam and in the periphery thereof, causes the converged signal light beam to exit with an ordinary divergence angle when the one (1) specific wavelength of the control light beam has not been irradiated and no thermal lens has been formed, and causes the converged signal light beam to exit with a divergence angle larger than the ordinary divergence angle when the one (1) specific wavelength of the control light beam has been irradiated and a thermal lens has been formed in the vicinity of an incidence surface of the light-absorbing layer film, and changes the divergence angle of the signal light beam directed to exit in response to the presence or absence of irradiation of the one (1) specific wavelength of the control light beam, wherein the first mirror having a hole has the hole for passing either the signal light beam output from the thermal lens forming device with the ordinary divergence angle as is, or the signal light beam with the divergence angle varied by a light-receiving lens when the one (1) specific wavelength of the control light beam has not been irradiated and no thermal lens has been formed, and reflecting means for reflecting either the signal light beam output diverging from the thermal lens forming device with the divergence angle larger than the ordinary divergence angle as is, or the signal light beam with the divergence angle varied by the light-receiving lens when the one (1) specific wavelength of the control light beam has been irradiated and a thermal lens has been formed in the vicinity of an incidence surface of the light-absorbing layer film, wherein the second thermal lens forming device contains the light-absorbing layer films and, by using a thermal lens based on a distribution of refractive index produced reversibly caused by temperature increase generated in an area of the light-absorbing layer film that has absorbed the one (1) specific wavelength of the control light beam and in the periphery thereof, causes the converged signal light beam to exit as converged when the one (1) specific wavelength of the control light beam has been irradiated and a thermal lens has been formed in the vicinity of an exiting surface of the light-absorbing layer film, and causes the converged signal light beam to exit with an ordinary divergence angle when the control light beam has not been irradiated and no thermal lens has been formed, the second thermal lens forming device changing the divergence angle of the signal light beam directed to exit in response to the presence or absence of irradiation of the one (1) specific wavelength of the control light beam, and wherein the second mirror having a hole has the hole for passing the converged signal light beam output from the thermal lens forming device as converged when the one (1) specific wavelength of the control light beam has been irradiated and a thermal lens has been formed in the vicinity of an exiting surface of the light-absorbing layer film, and reflecting means for reflecting either the signal light beam output from the thermal lens forming device with the ordinary divergence angle as is, or the signal light beam that has passed through the light-receiving lens provided for changing the divergence angle when the one (1) specific wavelength of the control light beam has not been irradiated and no thermal lens has been formed, the second mirror changing the optical paths.

In the optically controlled optical-path-switching-type optical signal transmission apparatus of the present invention, the two (2) or more sets of optical path switching mechanism may be connected in series directly through a space or through an optical-fiber-connection system.

In the optically controlled optical-path-switching-type optical signal transmission apparatus of the present invention, the three (3) or more sets of optical path switching mechanism may be connected in a multi-stage configuration directly through a space or through an optical-fiber-connection system, branching in each one (1) stage of the connection in two (2) directions of a direction for a light beam to travel straight through the hole of the mirror and a direction for a light beam to be reflected.

A method of switching optical paths for optical signals of the present invention comprises the steps of causing a signal light beam having one (1) or more wavelength(s) and a control light beam having two (2) or more wavelengths that are different from those of the signal light beam to travel substantially coaxial and in the same direction; converging and irradiating respectively the control light beam and the signal light beam to each of two (2) or more light-absorbing layer films that transmits the signal light beam and absorbs selectively only one specific wavelength of the control light beam; at each of two (2) or more thermal lens forming devices each containing the light-absorbing layer films, by using a thermal lens based on a distribution of refractive index produced reversibly caused by temperature increase generated in an area of the light-absorbing layer film that has absorbed the one (1) specific wavelength of the control light beam and in the periphery thereof, in response to the presence or absence of irradiation of the control light beam having the one (1) specific wavelength, causing the converged signal light beam to exit as converged or to exit varying the divergence angle thereof; and using a hole-provided mirror having a reflecting surface, in response to the presence or absence of irradiation of the control light beam of the one (1) specific wavelength, causing the signal light beam output from the thermal lens forming device to travel straight from the hole or changing the optical paths thereof by reflecting the signal light beam at the reflecting surface.

Another method of switching optical paths for optical signals of the present invention comprises the steps of causing a signal light beam having one (1) or more wavelength(s) and a control light beam having two (2) or more wavelengths that are different from those of the signal light beam to travel substantially coaxial and in the same direction; converging and irradiating respectively the control light beam and the signal light beam to each of two (2) or more light-absorbing layer films that transmits the signal light beam and absorbs selectively only one specific wavelength of the control light beam; at each of two (2) or more thermal lens forming devices each containing the light-absorbing layer films, by using a thermal lens based on a distribution of refractive index produced reversibly caused by temperature increase generated in an area of the light-absorbing layer film that has absorbed the one (1) specific wavelength of the control light beam and in the periphery thereof, causing the converged signal light beam to exit from the thermal lens forming device with an ordinary divergence angle when the one (1) specific wavelength of the control light beam has not been irradiated and no thermal lens has been formed in the vicinity of an incidence surface of the light-absorbing layer film, and causing the converged signal light beam to exit from the thermal lens forming device with a divergence angle larger than the ordinary divergence angle when the one (1) specific wavelength of the control light beam has been irradiated and a thermal lens has been formed, and causing the divergence angle of the signal light beam directed to exit to vary in response to the presence or absence of irradiation of the control light beam having the one (1) specific wavelength; passing through the hole of a hole-provided mirror either the signal light beam output from the thermal lens forming device with the ordinary divergence angle as is, or the signal light beam with the divergence angle varied by a light-receiving lens when the one (1) specific wavelength of the control light beam has not been irradiated and no thermal lens has been formed; and on the other hand, reflecting using a reflecting surface of the hole-provided mirror either the signal light beam output diverging from the thermal lens forming device with the divergence angle larger than the ordinary divergence angle as is, or the signal light beam with the divergence angle varied by a light-receiving lens when the one (1) specific wavelength of the control light beam has been irradiated and a thermal lens has been formed in the vicinity of an incidence surface of the light-absorbing layer film and, thereby, changing the optical paths.

A further method of switching optical paths for optical signals of the present invention comprises the steps of causing a signal light beam having one (1) or more wavelength(s) and a control light beam having two (2) or more wavelengths that are different from those of the signal light beam to travel substantially coaxial and in the same direction; converging and irradiating respectively the control light beam and the signal light beam to each of two (2) or more light-absorbing layer films that transmits the signal light beam and absorbs selectively only one specific wavelength of the control light beam; each of two (2) or more thermal lens forming devices each containing the light-absorbing layer films, by using a thermal lens based on a distribution of refractive index produced reversibly caused by temperature increase generated in an area of the light-absorbing layer film that has absorbed the one (1) specific wavelength of the control light beam and in the periphery thereof, causing the converged signal light beam to exit as converged when the one (1) specific wavelength of the control light beam has been irradiated and a thermal lens has been formed in the vicinity of an exiting surface of the light-absorbing layer film, and causing the converged signal light beam to exit with an ordinary divergence angle when the control light beam has not been irradiated and no thermal lens has been formed, and changing the divergence angle of the signal light beam directed to exit in response to the presence or absence of irradiation of the control light beam having the one (1) specific wavelength; causing the converged signal light beam output from the thermal lens forming device as converged to pass through the hole of the hole-provided mirror and to travel straight when the one (1) specific wavelength of the control light beam has been irradiated and a thermal lens has been formed in the vicinity of an exiting surface of the light-absorbing layer film; and changing the optical path by reflecting using a reflecting surface of the hole-provided mirror either the optical path of the signal light beam output from the thermal lens forming device with the ordinary divergence angle as is, or the signal light beam of which the divergence angle has been changed the light-receiving lens when the one (1) specific wavelength of the control light beam has not been irradiated and no thermal lens has been formed.

In the optically controlled optical-path-switching-type optical signal transmission apparatus of the present invention, among light beams having a plurality of wavelengths, a light beam having the longest wavelength may be set as the signal light beam and two (2) or more light beams having a wavelength shorter than that of the signal light beam may be set as the control light beam, the optical path switching mechanism for which the wavelength that the thermal lens forming device therein absorbs is the shortest is set as a first stage, and the optical path switching mechanisms in the latter stages are connected in increasing order of the wavelength absorbed in each of the thermal lens forming devices.

DESCRIPTION OF THE PREFERRED EMBODIMENT

[Thermal Lens Forming Device]

In the present invention, a device having a lamination film-type structure can be used as a thermal lens device and the following combinations, for example, can be listed as the structure of a lamination film.

(1) A light-absorbing layer film alone. However, this light-absorbing layer film may be any one of a single-layer film literally comprising only a light-absorbing film, or a lamination layer-type thin film having a two-layer structure such as a light-absorbing film/thermal lens forming layer, or a three-layer structure such as a light-absorbing film/thermal lens forming layer/light-absorbing layer. The following light-absorbing layer films (2) to (10) contain a structure same as that described above:

(2) Light-absorbing layer film/heat-insulating layer film.

(3) Heat-insulating layer film/light-absorbing layer film/heat-insulating layer film.

(4) Light-absorbing layer film/heat-conducting layer film.

(5) Heat-conducting layer film/light-absorbing layer film/heat-conducting layer film.

(6) Light-absorbing layer film/heat-insulating layer film/heat-conducting layer film.

(7) Heat-conducting layer film/light-absorbing layer film/heat-insulating layer film.

(8) Heat-conducting layer film/light-absorbing layer film/heat-insulating layer film/heat-conducting layer film.

(9) Heat-conducting layer film/heat-insulating layer film/light-absorbing layer film/heat-insulating layer film.

(10) Heat-conducting layer film/heat-insulating layer film/light-absorbing layer film/heat-insulating layer film/heat-conducting layer film.

(11) Refractive-index-distributed-type lens/(light-transmitting layer/) any one of thermal lens forming devices of above (1) to (10).

(12) Refractive-index-distributed-type lens/(light-transmitting layer/) any one of thermal lens forming devices of above (1) to (10)/(light-transmitting layer/) Refractive index-distributed-type lens.

The above "(light-transmitting layer/)" means to provide a light-transmitting layer when necessary. In addition, an anti-reflection film (AR coating film) may be provided on an entering surface and an exiting surface of a light beam when necessary.

Figure 11:
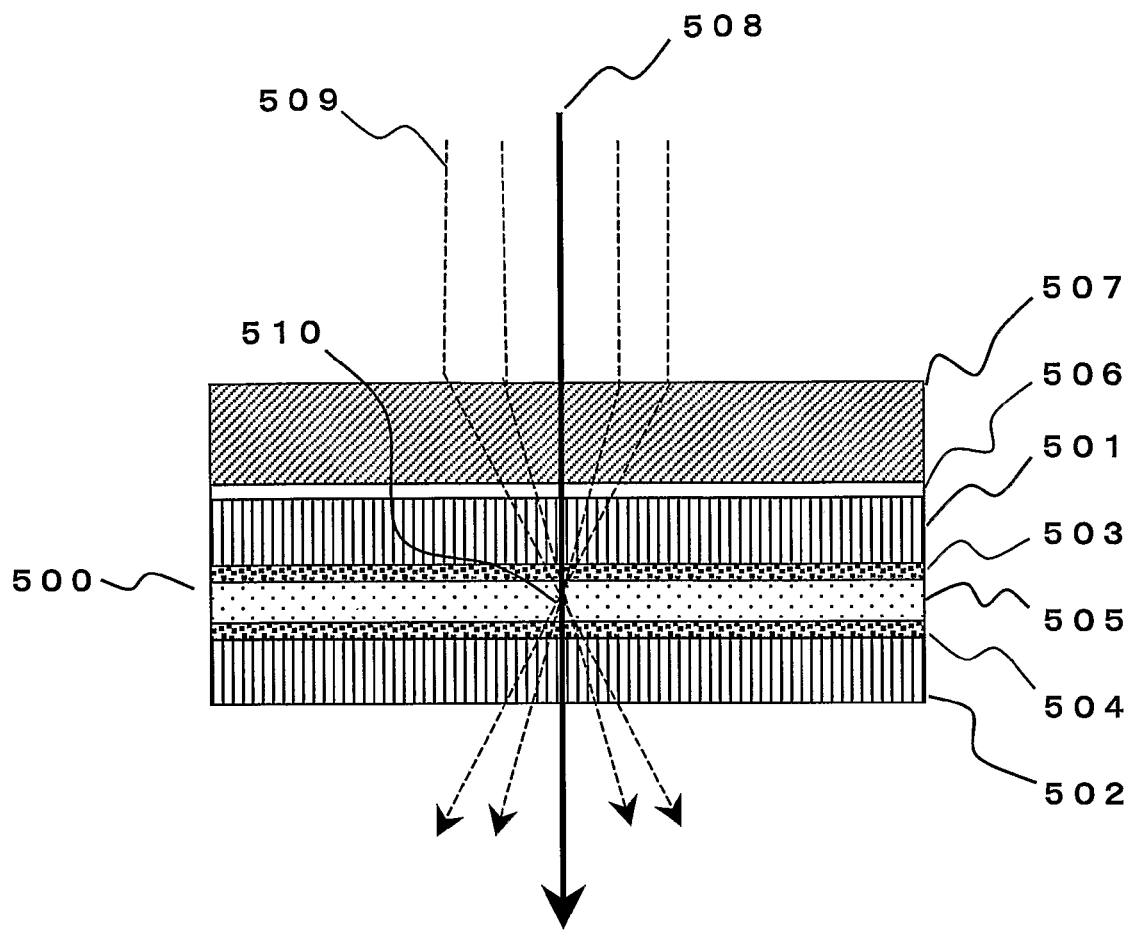
FIG. 11 is a cross-sectional view of an example configuration of a thermal lens forming device.

A cross-sectional view showing an example configuration of a thermal lens forming device is shown in FIG. 11. As exemplified in FIG. 11, a thermal lens forming device 500 may comprise, for example, a refractive-index-distributed-type lens 507, a light-transmitting layer 506, a heat-conducting layer film 501, a light-absorbing layer film 503/a thermal lens forming layer 505, a light-absorbing layer film 504, and a heat-conducting layer film 502, stacked in that order from the side through which a control light beam 509 and a signal light beam 508 enter the device. It should be noted that the light rays of the control light beam 509 shown in FIG. 11 are schematic and that refraction at each interface between the layers is not shown in the drawing.

Figure 12:
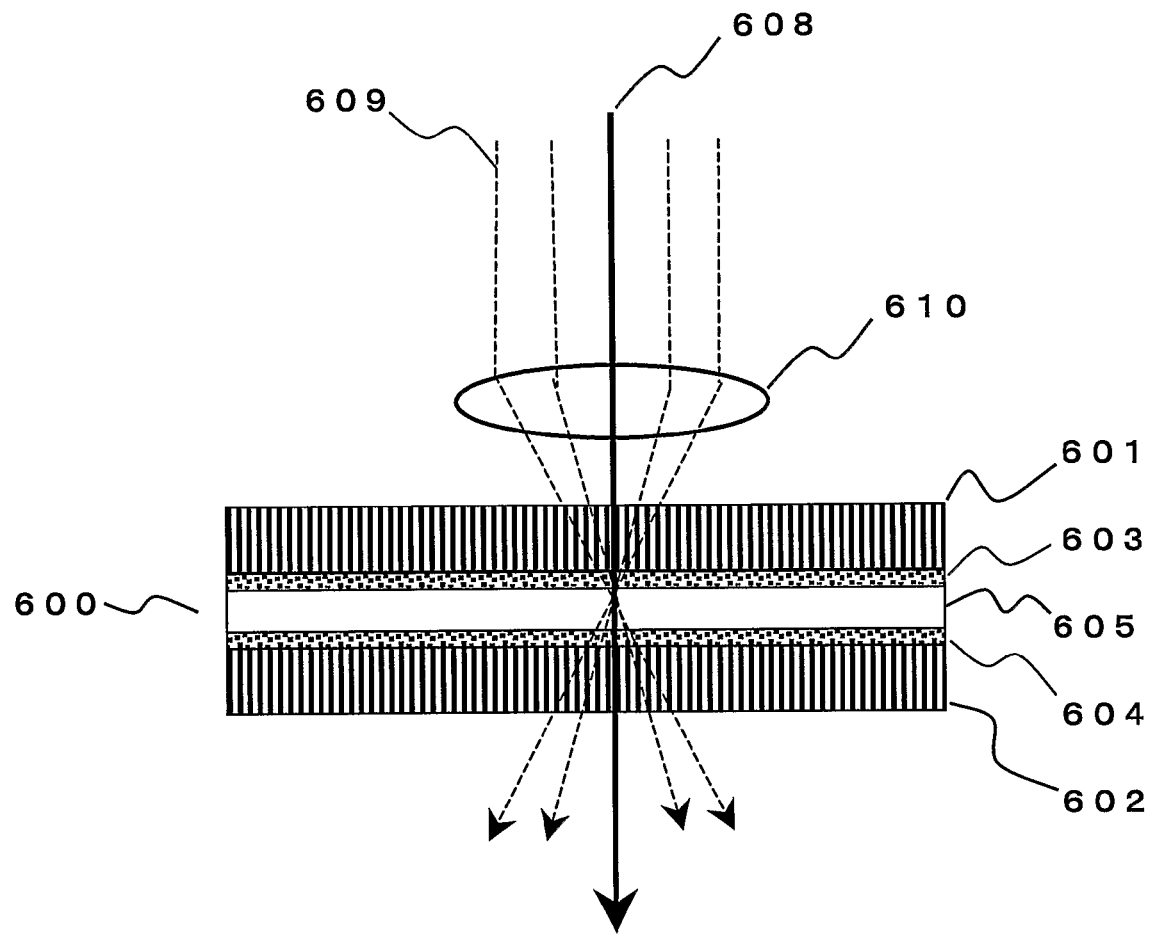
FIG. 12 is a cross-sectional view of an example configuration of a thermal lens forming device.

A cross-sectional view showing another example configuration of a thermal lens forming device is shown in FIG. 12. As exemplified in FIG. 12, a thermal lens forming device 600 comprises, for example, a heat-conducting layer film 601, a light-absorbing layer 603, thermal lens forming layer 605, a light-absorbing layer film 604, and a heat conducting layer film 602, stacked in that order from the side through which a control light beam 609 and a signal light beam 608 enter the device. When this configuration is employed, the control light beam 609 and the signal light beam 608 enter into the thermal lens forming device 600 after having first been condensed by an externally-provided condenser lens 610. Rays of the control light beam 609 shown in FIG. 12 are schematic and refraction at each interface between the layers is omitted.

Figure 21:
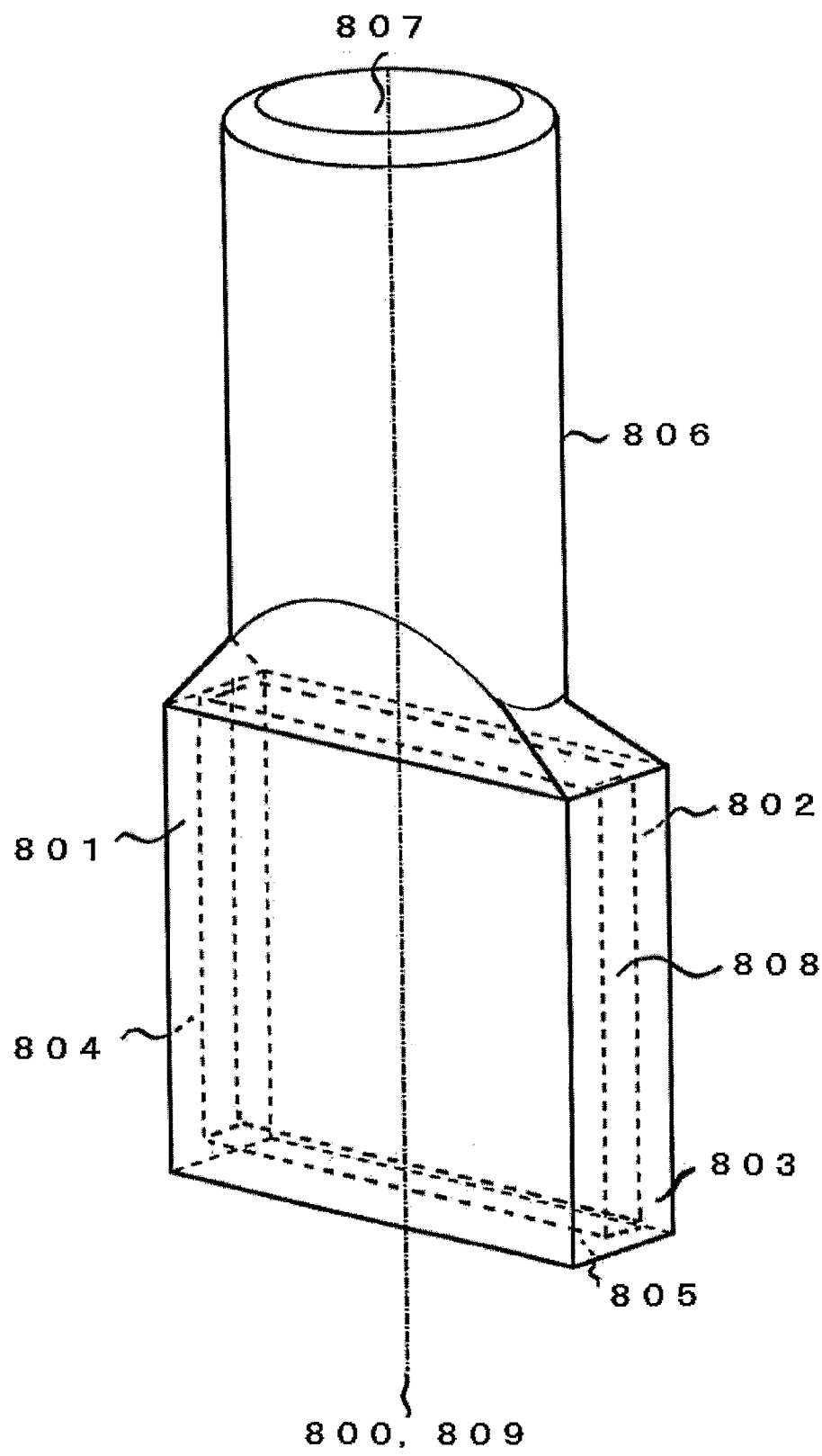
FIG. 21 is a schematic view exemplifying a pigment-solution-filling-type thermal lens forming device.

Furthermore, a schematic view exemplifying a pigment-solution-filling-type thermal lens forming device is shown in FIG. 21. As exemplified in FIG. 21, a pigment-solution-filling-type thermal lens forming device 800 is a device produced in a manner that a pigment solution working as a combined light-absorbing layer film and thermal lens forming layer is filled from an introducing inlet 807 of an introducing pipe 806 into a pigment solution filling unit 808 of an optical cell 809 surrounded by entering and exiting surface glass plates 801 and 802 working as heat-conducting layer films, side glass plates 803 and 804, and a bottom glass plate 805, and the introducing inlet 807 is closed. That is, this device 800 has a simple device structure such as heat-conducting layer film/light-absorbing layer film and combined light-absorbing layer film and thermal lens forming layer/heat-conducting layer film.

The light-absorbing layer film, the thermal lens forming layer, the heat-insulating layer film, the heat-conducting layer film, the light-transmitting layer, and materials and production methods of the refractive-index-distributed-type lens and film thicknesses of these films will be descried below.

The light-absorbing layer film, the thermal lens forming layer, the heat-insulating layer film, the heat-conducting layer film, the light-transmitting layer, and materials of the refractive-index-distributed-type lens used in the invention may contain known oxidation inhibitors, UV-absorbing agents, singlet oxygen quenchers, dispersion assistants, etc. as additives to the extent those additives do not influence those films, layers and materials in order to improve the processability thereof or improve stability and durability as an optical device.

[Materials of the Light-Absorbing Layer Film]

Various known materials may be used as the light-absorbing materials used for the light-absorbing layer film in the thermal lens forming device used in the invention.

Specifically examples of light-absorbing materials which may be preferably used for the light-absorbing layer film in the thermal lens forming device used in the invention include, for example, a single crystal of a compound semiconductor such as GaAs, GaAsP, GaAlAs, InP, InSb, InAs, PbTe, InGaAsP, ZnSe; materials obtained by dispersing fine particles of these compound semiconductor into a matrix material; a single crystal of a metal halide (for example, potassium bromide, sodium bromide, etc.) doped with ions of another metal; materials obtained by dispersing fine particles of these metal halides (for example, copper bromide, copper chloride, cobalt chloride, etc.) into a matrix material; a single crystal of cadmium chalcogenide such as CdS, CdSe, CdSeS, CdSeTe, etc. doped with ions of another metal such as copper, etc.; materials obtained by dispersing fine particles of these cadmium chalcogenide into a matrix material; a semiconductor single crystal thin film such as silicon, germanium, selenium, tellurium, etc.; a polycrystalline thin film or a porous thin film; materials obtained by dispersing fine particles of a semiconductor such as silicon, germanium, selenium, tellurium, etc. into a matrix material; a single crystal (generally called "laser crystal") corresponding to a jewel doped with ions of a metal, such as a ruby, an alexandrite, a garnet, a Nd:YAG, a sapphire, a Ti:sapphire, a Nd:YLF, etc.; a ferroelectric crystal such as lithium niobate ($LiNbO_3$), $LiB_3O_5$, $LiTaO_3$, $KTiOPO_4$, $KH_2PO_4$, $KNbO_3$, $BaB_2O_2$, etc. doped with ions of a metal (for example, iron ions); quartz glass, soda glass, boron silicate glass, other glasses, or the like, doped with ions of a metal (for example, neodymiumions, erbium ions, etc.); and, in addition, materials obtained by dissolving or dispersing a pigment into a matrix material; and an amorphous pigment aggregate.

Among the above-listed materials, those obtained by dissolving or dispersing a pigment into a matrix material are especially preferable because such materials offer a wide range for selecting the matrix material and the pigment, and because they are easy to process into a thermal lens forming device.

Specific examples of pigments that can be preferably used in the optically controlled optical-path-switching-type optical signal transmission apparatus and the optical signal optical path switching method of the invention include, for example, a xanthene-based pigment such as rhodamine-B, rhodamine-6G, eosin, floxin-B, etc.; an acridine-based pigment such as acridine orange, acridine red, etc.; an azo pigment such as ethyl red, methyl red, etc.; a porphyrin-based pigment; a phthalocyanine-based pigment; a naphthalocyanine-based pigment; a cyanine pigment such as 3,3'-diethylthiacarbocyanine iodide, 3,3'-diethyloxadicarbocyanine iodide, etc.; a triarylmethane-based pigment such as ethyl violet, Victoria blue-R, etc.; a naphthoquinone-based pigment; an anthraquinone-based pigment; a naphthalenetetracarboxydiimide-based pigment; a perylenetetracarboxydiimide-based pigment; etc.

In the optically controlled optical-path-switching-type optical signal transmission apparatus and the optical signal optical path switching method of the invention, any of the pigments may be used individually, or two or more pigments may be used in combination.

As a matrix material that can be used in the optically controlled optical-path-switching-type optical signal transmission apparatus and the optical signal optical path switching method of the invention, any material that satisfies both of the following conditions may be used:

(1) The material has a high transmittance in a wavelength region of the light used in the optically controlled optical-path-switching-type optical signal transmission apparatus and the optical signal optical path switching method of the invention; and (2) The material is able to solve or disperse with high stability the pigments or various fine particles that are used in the optically controlled optical-path-switching-type optical signal transmission apparatus and the optical signal optical path switching method of the invention.

Examples of acceptable inorganic solid-state matrix materials include, for example, a single crystal of a metal halide, a single crystal of a metal oxide, a single crystal of a metal chalcogenide, quartz glass, soda glass, boron silicate glass, and, in addition, a low-melting-point glass material produced in a generally-called sol-gel processing method.

Examples of acceptable inorganic liquid-state matrix materials include, for example, water, water glass (a thick water solution of alkaline silicate), hydrochloric acid, sulfuric acid, nitric acid, aquaregia, chlorsulfonic acid, methanesulfonic acid, and trifluoromethansulfonic acid. Examples of acceptable organic solvents include, specifically, alcohols such as methanol, ethanol, isopropyl alcohol, n-butanol, amyl alcohol, cyclohexanol, bnzyl alcohol; polyatomic alcohols such as ethylene glycol, diethylene glycol, glycerin, etc.; esters such as ethyl acetate, n-butyl acetate, amyl acetate, isopropyl acetate, etc.; ketones such as acetone, methylethylketone, methylisobutylketone, cyclohexanone, etc; ethers such as diethyl ether, dibutyl ether, methoxy ethanol, ethoxy ethanol, buthoxy ethanol, carbithol, etc.; cyclic ethers such as tetrahydrofuran, 1,4-dioxan, 1,3-dioxoran, etc.; hydrocarbon halides such as dichloromethan, chroloform, carbon tetrachloride, 1,2-dichloroethane, 1,1,2-trichloroethane, trichlene, bromoform, dibromomethane, diiodomethan, etc.; aromatic hydrocarbons such as benzene, toluene, xylene, chlorobenzene, o-dichlorobenzene, nitrobenzene, anisole, α-chloronaphthalene, etc.; aliphatic hydrocarbons such as n-pentane, n-hexane, n-heptane, cyclohexane, etc.; amides such as N, N-dimethylformamide, N, N-dimethylacetamide, hexamethylphosphorictriamide, etc.; cyclic amides such as N-methylpyrrolidone, etc.; urea derivatives such as tetramethylurea, 1,3-dimethyl-2-imidazolidinone, etc.; sulfoxides such as dimethylsulfoxide, etc.; ester carbonates such as propylene carbonate, etc; nitriles such as acetonitrile, propionitrile, benzonitrile, etc.; nitrogen-containing heterocyclic compounds such as pyridine, quinoline, etc.; amines such as triethylamine, triethanolamine, diethylaminoalcohol, aniline, etc.; organic acids such as chloracetic acid, trichloracetic acid, trifluoroacetic acid, acetic acid, etc.; and, in addition, such solvents as nitromethane, carbon disulfide, sulfolan, etc. A plurality of these solvents can be used also in combination.

Furthermore, as organic matrix materials, liquid-state, solid-state, glass-state, or rubber-state organic high-molecule materials can be used. Specific examples of those materials include resins such as polystyrene, poly(α-methylstyrene), polyindene, poly(4-methyl-1-pentene), polyvinylpyridine, polyvinylformal, polyvinylacetal, polyvinylbutiral, polyvinyl acetate, polyvinyl alcohol, polyvinyl chloride, polyvinylidene chloride, polyvinylmethyl ether, polyvinylethyl ether, polyvinylbezyl ether, polyvinylmethylketone, poly(N-vinylcarbazole), poly(N-vinylpyrrolidone), polymethylacrylate, polyethylacrylate, polyacrylic acid, polyacrylonitrile, polymethylmethacrylate, polyethylmethacrylate, polybutylmethacrylate, polybenzylmethacrylate, polycyclohexylmethacrylate, polymethacrylic acid, polymethacrylamide, polymethacrylonitrile, polyacetaldehyde, polychloral, polyethylene oxide, polypropylene oxide, polyethylene terephthalate, polycarbonates (bisphenols+carbonic acid), poly(diethyleneglycol/bisaryl carbonate), 6-nylon, 6,6-nylon, 12-nylon, 6,12-nylon, polyethylasparaginate, polyethylglutaminate, polylysine, polyproline, poly(γ-benzyl-L-glutamate), methylcellurose, ethylcellorose, bezylcellurose, hydroxyethylcellurose, hydroxypropylcellurose, acetylcellurose, cellurose triacetate, cellurose tributylate, alkyd resin (phthalic anhydride+glycerin), aliphatic acid-denatured alkyd resin (aliphatic acid+phthalic anhydride+glycerin), unsaturated polyester resin (maleic anhydride+phthalic anhydride+propyleneglycol), epoxy resin (bisphenol+epichlorhydrin), polyurethane resin, phenol resin, urea resin, melamine resin, xylene resin, toluene resin, guanamine resin, etc.; organic polysilanes such as poly(phenylmethylsilane), etc.; and organic polygermane and copolymers and condensation-copolymer thereof. Also acceptable are certain high-molecular compounds obtained by plasma-polymerizing a compound having no polymerizing property in the normal state, etc., such as carbon bisulfide, carbon tetrafluoride, ethylbenzene, per-fluorobenzene, per-fluorocyclohexanone or trimethylchlorosilane, etc. Furthermore, a residual radical of a pigment as a side chain of each monomer as a unit, or as a bridging radical of each copolymericmonomeras as a unit, or as a polymerization starting terminal is combined to any one of these organic high-molecular compounds can also be used as a matrix material. The residual radical of a pigment and a matrix material may form chemical bonding.

Known methods can be used for dissolving or dispersing the pigment into these matrix materials. For example, any of the below-described methods can be preferably employed.

After the pigment and the matrix material have been solved and mixed in a common solvent, the solvent is removed by evaporation; after the pigment is solved and mixed in a raw material solution of the inorganic matrix material produced in the sol-gel processing method, the matrix material is prepared; using a solvent when necessary, the pigment is solved or dispersed in a monomer of the organic high-molecular matrix material and, thereafter, the matrix material is prepared by polymerizing or condensation-polymerizing the monomer; and, a solution obtained by dissolving the pigment and the organic high-molecular matrix material in a common solvent is dropped into a solvent that does not dissolve both the pigment and the thermoplastic high-molecular matrix material, precipitants are filtered off, dried, and heat/melting processed. The aggregation of pigment molecules to form special associated bodies known as "H-associated bodies" and "J-associated bodies" by devising the combination and the processing method of the pigment and the matrix material is known, and pigment molecules in the matrix material can be used in a state where the pigment molecules may form either the aggregated state or the associated state.

Furthermore, known methods may be used in order to disperse the above-described various fine particles in these matrix materials. Examples of steps that may be preferably employed include that, after the fine particles have been dispersed in a solution of the matrix material or a solution of a precursor of the matrix material, the solvent is removed; using a solvent when necessary, the fine particles are dispersed and the matrix material is prepared by polymerizing or condensation-polymerizing the monomer; after metal salt such as, for example, cadmium perchlorate or gold chloride as a precursor of the fine particles has been melted or dispersed in the organic high-molecular matrix material, fine particles of cadmium sulfide are deposited in the matrix material by processing with hydrogen sulfide, or fine particles of gold are deposited in the matrix material by heat-processing; chemical vapor deposition and sputtering; and others.

In a case wherein the pigment can exist by itself as a thin film in an amorphous state that causes little optical dispersion, an amorphous film of the pigment can also be used as the light-absorbing layer film without using any matrix material.

Furthermore, in the case wherein the pigment can exist by itself as an aggregation of fine crystals that does not cause optical dispersion, a fine crystal aggregation of the pigment can also be used as the light-absorbing layer film without using any matrix material. As in the thermal lens forming device used in the invention, in a case wherein the pigment fine crystal aggregation as a light-absorbing layer film exists being laminated with a thermal lens forming layer (such as resin, etc.), a heat-conducting layer film (such as glass, etc.) and/or a heat-insulating layer film (such as resin, etc.), optical dispersion is not substantially caused when the particle diameter of the pigment fine crystal does not exceed ⅕ of the wavelength that is the smaller wavelength of that the signal light beam and that of the control light beam.

[Combination and Order of Material of the Light-Absorbing Layer Film, Wavelength Band of the Signal Light Beam and Wavelength Band of the Control Light Beam]

The material of the light-absorbing layer film, a wavelength band of the signal light beam and a wavelength band of the control light beam used in the optically controlled optical-path-switching-type optical signal transmission apparatus and the optical signal optical path switching method of the invention can be used by selecting a proper combination thereof according to the purpose of use, as a combination thereof.

As a specific procedure to make settings, for example, first, a wavelength or a wavelength band of the signal light beam may be determined according to the purpose of use and a combination of a material of the light-absorbing layer film and a wavelength of the control light beam optimal for controlling the determined wavelength or the determined wavelength band of the signal light beam may be selected. Alternatively, after a combination of wavelengths of the signal light beam and the control light beam have been determined according to the purpose of use, a material of the light-absorbing layer film suitable for the determined combination may be selected.

As a specific example of such a selection procedure, an example will be described wherein a near-infrared light beam having a wavelength of 850 nm, 1350 nm, or 1550 nm oscillated from a semiconductor laser and which can be modulated at an ultra-high speed on the order of gigahertz is used as the signal light beam, wherein this light beam is switched between optical paths by the control light beam of a plurality of visible light beam wavelength bands. As a light source of the control light beam, a continuous wave (CW) oscillation laser that can be turned on and off at a response speed less than sub-millisecond can be preferably used. Examples, listed in order of increasing wavelength, include a blue-violet or blue semiconductor laser light beam having a wavelength of 405 to 445 nm; a light beam obtained by converting a light beam having a wavelength of 1064 nm of a semiconductor-excited Nd: YAG laser into a green light beam of 532 nm by a second order non-linear optical device;

a red semiconductor laser light beam of 635 nm or 670 nm; and a near-infrared laser light beam of 780 nm or 800 nm. As a pigment that shows absorption in these wavelength bands for the control light beam and does not absorb a near infrared light beam of 850 nm or 1550 nm, for example, two (2) or more of such pigments can be selected and preferably used respectively as: for example, N,N'-bis(2, 5-di-tert-butylphenyl)-3,4,9, 10-perylenedicarboxyimide)

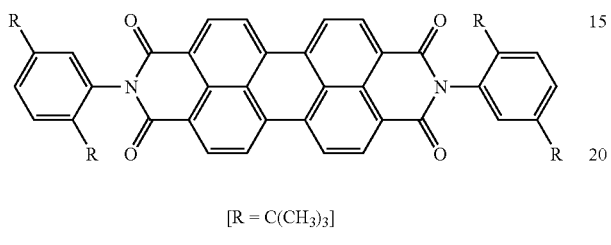

[1]

[R = C(CH₃)₃]

Copper(11)2,9,16,23-tetra-tert-butyl-29H, 31H-phthalocyanine [2],

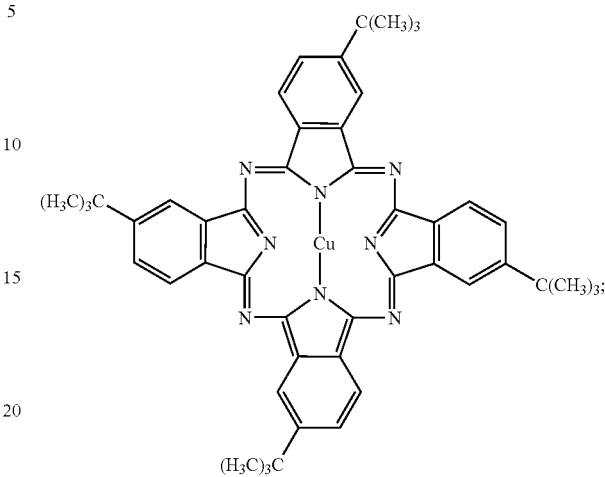

[2]

Vanadyl 2,11,20,29-tetra-tert-butyl-2,3-naphthalocyanine [3],

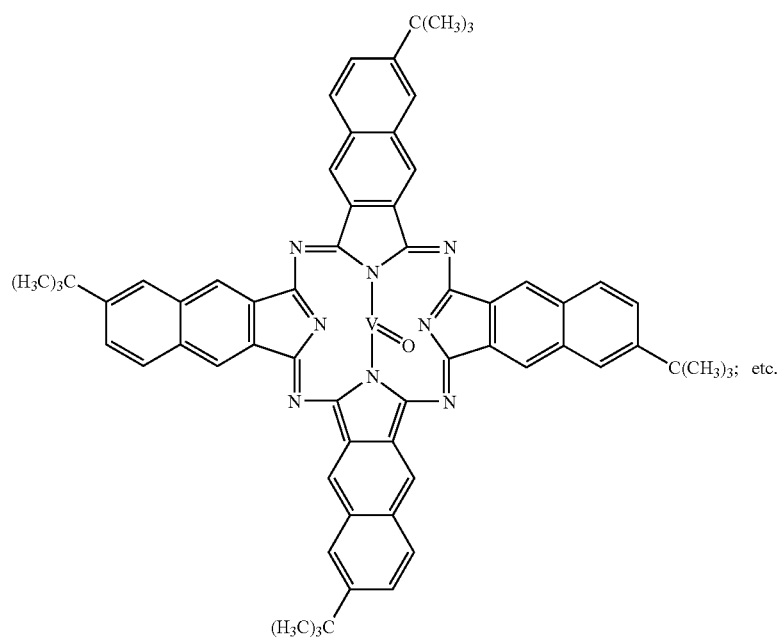

[3]

etc.

Figure 22:
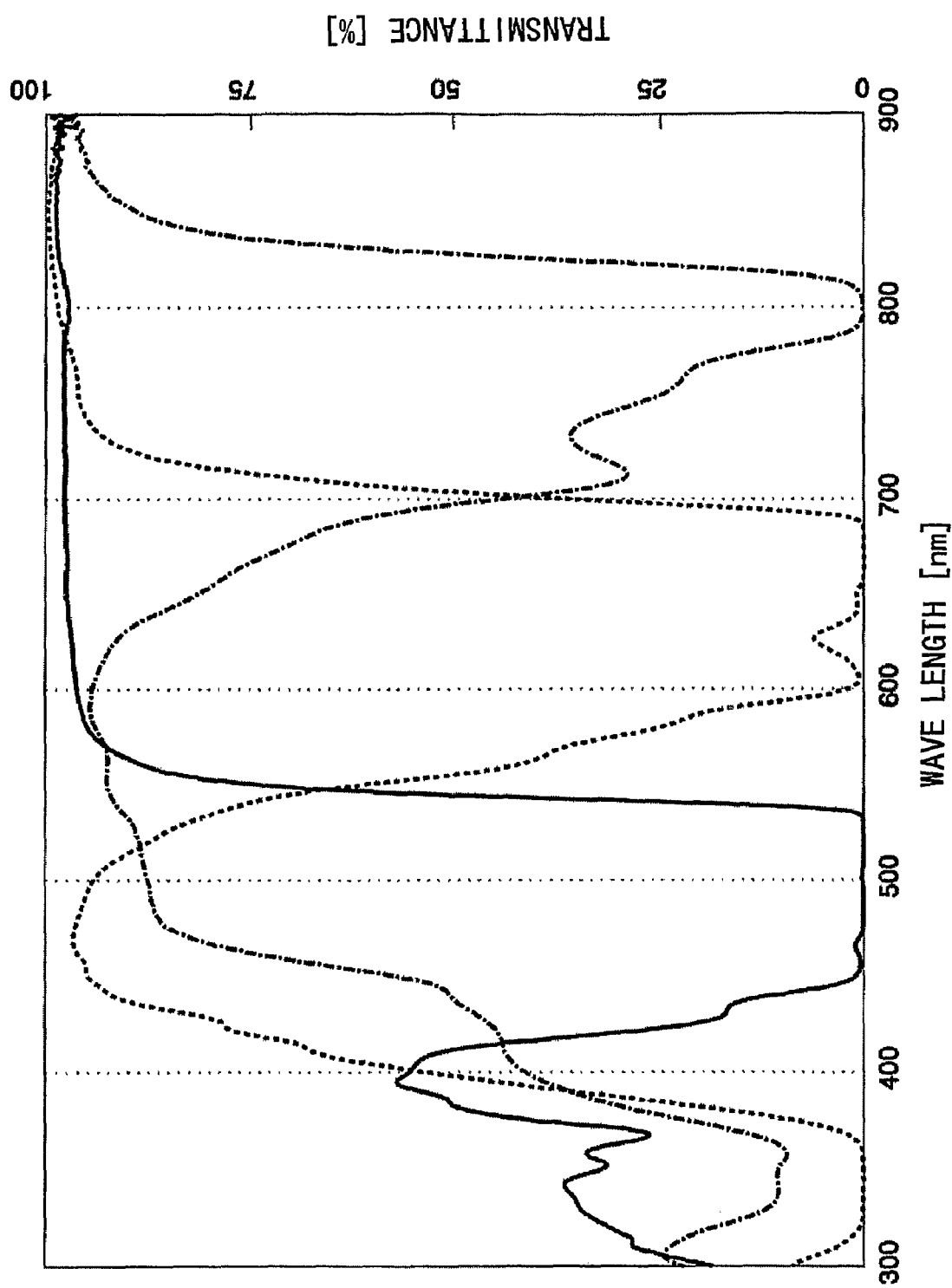
FIG. 22 shows transmittance spectra of solutions of pigments [1], [2], and [3], respectively.

Any one of these pigments has high light resistance and heat resistance and is especially preferable as the pigment for the light-absorbing layer film to form a thermal lens in the optically controlled optical-path-switching-type optical signal transmission apparatus and the optical signal optical path switching method of the invention. Transmittance spectra of tetrahydrofuran solutions of the pigments [1], [2], and [3] are shown in FIG. 22 by a solid line, a broken line, and a dotted dashed line, respectively. Although not shown in FIG. 22, these pigment solutions have a transmittance of 98% or higher in a near infrared region of 900 to 1550 nm.

Relationships between the oscillation frequency of the control light beam laser and the transmittance spectra of these pigments are as shown in Table 1.

TABLE 1

| Pigment | | Laser Oscillation Wavelength [nm] | | | | | | |
|---|---|---|---|---|---|---|---|---|
| | Number | 445 | 532 | 635 | 650 | 670 | 780 | 800 | 850 |
| Transmit- | [1] | 3.59 | 0.10 | 97.08 | 97.36 | 97.33 | 97.67 | 97.15 | 98.64 |
| tance | [2] | 93.64 | 81.67 | 2.32 | 0.78 | 0.00 | 97.23 | 98.37 | 99.63 |
| | [3] | 52.19 | 89.90 | 88.72 | 81.56 | 73.35 | 9.06 | 0.12 | 89.00 |

As can be seen from Table 1, the pigment[1] is preferable as a material of the light-absorbing layer film of the thermal lens forming device that absorbs the control light beam having a wavelength of 445 to 532 nm. Similarly, the pigment [2] is preferable as a material of the light-absorbing layer film responding to a wavelength of 635 to 670 nm, and the pigment [3] is preferable as a material of the light-absorbing layer film responding to a wavelength of 780 to 800 nm. These pigments can be used by dissolving the pigments in the above solvent and filling the solution in the optical cell, or by dissolving the pigments in the organic high-molecular material and sandwiching the solution between the heat-conducting layer films, or by forming the pigments in a film as a spin-coated film or a vapor-deposited film on the heat-conducting layer film.

When two or more of these pigments are selected and used, it is preferable to use optical path switching mechanisms containing thermal lens forming devices responding to the absorption wavelength bands of each pigment, connecting these mechanisms starting from the one for the smallest wavelength. That is, the absorption bands and non-absorption bands of each of the pigments can be overlapped efficiently and used by, for example, using the pigments in a two-stage configuration of the pigment [1] for an optical path switching mechanism in a first stage and the pigment [2] or the pigment [3] for a second stage, or in a three-stage configuration of the pigment [1] for the first stage, the pigment [2] for the second stage and the pigment [3] for a third stage.

[Composition of Material of Light-Absorbing Layer Film, Film Thickness of Light-Absorbing Layer Film in Light-Absorbing Layer Film and Film Thickness of Thermal Lens Forming Layer]

In the thermal lens forming device used in the optically controlled optical-path-switching-type optical signal transmission apparatus and the optical signal optical path switching method, the light-absorbing layer film may be a laminated-layer-type thin film having any one of a single-layer-film structure of "light-absorbing film" alone, or a two-layer structure of "light-absorbing film/thermal lens forming layer", or a three-layer structure of "light-absorbing film/thermal lens forming layer/light-absorbing film". It is preferable that the thickness of the whole light-absorbing layer film does not exceed a length that is twice as long as a confocal distance of the control light beam that has been converged. Furthermore, when a higher response speed is desired, it is preferable that the thickness of the light-absorbing layer film comprising the stacked-layer-type thin films does not exceed the confocal distance of the control light beam that has been converged.

Under these conditions, the composition of the material of the light-absorbing layer film and a thickness of the one (1) or two (2) light-absorbing films in the light-absorbing layer film can be set relative to the transmittance of the control light beam and the signal light beam transmitting the light-absorbing layer film as a combination of these items. For example, among the compositions of the material of the light-absorbing layer film, first, the density of at least a component that absorbs the control light beam or the signal light beam is determined and, then, the thickness of the (one (1) or two (2)) light-absorbing film(s) in the light-absorbing layer film may be set such that the transmittance of the control light beam and the signal light beam transmitting the thermal lens forming device is of a specific value. Alternatively, first, for example, the thickness of the one (1) or two (2) light-absorbing films in the light-absorbing layer film is set at a specific value in response to the necessity in the apparatus designing. Thereafter, the composition of the material of the light-absorbing layer film can be adjusted such that the transmittance of the control light beam and the signal light beam transmitting the thermal lens forming device becomes a specific value.

The values of the transmittance of the control light beam and the signal light beam transmitting the light-absorbing film, optimal for bringing out a thermal lens effect of a sufficient magnitude and at a high speed with as low power as possible from the thermal lens forming device used in the optically controlled optical-path-switching-type optical signal transmission apparatus and the optical signal optical path switching method of the invention, are respectively as described in the following.

In the thermal lens forming device used in the optically controlled optical-path-switching-type optical signal transmission apparatus and the optical signal optical path switching method of the invention, it is recommended that control of the density and the existing state of the light-absorbing component in the light-absorbing layer film and setting of the film thickness of the one (1) or two (2) light-absorbing films in the light-absorbing layer film are carried out such that the transmittance of the control light beam propagating the light-absorbing layer film in the thermal lens forming device becomes 90% to 0%.

On the other hand, when the control light beam is not irradiated, it is recommended that control of the density and the existing state of the light-absorbing component in the light-absorbing layer film and setting of the film thickness of the one (1) or two (2) light-absorbing films in the light-absorbing layer film be carried out such that the transmittance of the signal light beam propagating the light-absorbing layer film in the thermal lens forming device becomes 10% as the lower limit or higher and approaches unlimitedly 100% as the upper limit. The lower limit of the thickness of the thermal lens forming layer film in the light-absorbing layer film is selected according to the material of the thermal lens forming layer described as follows.

[Material of Thermal Lens Forming Layer and the Film Thickness Of Thermal Lens Forming Layer in the Fight-Absorbing Layer Film]

Although the single-layer light-absorbing film may itself function as the thermal lens forming layer, other materials may be assigned the functions of light absorption and lens formation, and the optimal materials selected may be employed by stacking the materials.

As the material of the thermal lens forming layer in the light-absorbing layer film, a liquid, liquid crystal, and solid material can be used. Especially, it is preferable that the thermal lens forming layer comprises an organic compound selected from a group consisting of an amorphous organic compound, an organic compound liquid, and a liquid crystal. However, in the case where the material of the thermal lens forming layer is liquid crystal or liquid, the thermal lens forming layer can be produced by, for example, forming the light-absorbing film and/or the heat-conducting layer film from a self-form-maintaining material, providing a cavity having the size corresponding to the thickness of the thermal lens forming layer, and injecting the thermal lens forming layer material in a fluid state. On the other hand, when the material of the thermal lens forming layer is a solid, the light-absorbing film may be produced by stacking the light-absorbing film on one (1) side or both sides of the thermal lens forming layer.

The material of the thermal lens forming layer may not be a single material and, for example, may be formed from a plurality of stacked solid layers, or may be formed from stacked solid and liquid layers.

The thickness of the thermal lens forming layer may be between several nanometers to 1 mm and, more preferably between several tens nanometers to several hundred μm, depending on the kind of the material used.

As described above, it is preferable that the total thickness of the light-absorbing layer film obtained by stacking the thermal lens forming layer and one (1) or two (2) light-absorbing films does not exceed twice the confocal distance of the control light beam that has been converged.

Although any of liquid, liquid crystal, and solid material can be used as the material of the thermal lens forming layer in the light-absorbing layer film, for any of these materials, the refractive index of the material should exhibit a high degree of temperature dependence.

The material property values of the temperature dependence of the refractive index of the typical organic compound liquids and water are described in literature [D. Solimini: J. Appl. Phys., vol. 37, 3314 (1966)]. The variation of refractive index with temperature for a light beam having the wavelength of 633 nm [unit: 1/K] is larger in alcohols such as methanol ($3.9 \times 10^{-4}$) than in water ($0.8 \times 10^{-4}$), and is much larger in non-hydrogen-bonding organic solvents such as cyclopentane ($5.7 \times 10^{-4}$), benzene ($6.4 \times 10^{-4}$), chloroform ($5.8 \times 10^{-4}$), carbon dichloride ($7.7 \times 10^{-4}$).

When liquid crystal is used as the material of the thermal lens forming layer in the light-absorbing layer film, any known liquid crystal can be used. Specifically, any of the following materials may be used as liquid crystal: various cholesterol derivatives; 4'-alkoxybenzylidene-4-cyanoanilines such as 4'-n-butoxybenzylidene-4-cyanoaniline and 4'-n-hexylbenzylidene-4-cyanoaniline; 4'-alkoxybenzylideneanilines such as 4'-ethoxybenzylidene-4-n-butylaniline, 4'-methoxybenzylideneaminoazobenzene, 4-(4'-methoxybenzyldene)aminobiphenyl, and 4-(4'-methoxybenzylidene) aminostilbene; 4'-cyanobenzylidene-4-alkoxyanilines such as 4'-cyanobenzylidene-4-n-butoxyaniline and 4'-cyanobenzylidene-4-n-hexyloxyaniline; carbonated esters such as 4'-n-butoxycarbonyloxybenzylidene-4-methoxyaniline and p-carboxyphenyl.n-amylcarbonate, n-heptyl.4-(4'-ethoxyphenoxycarbonyl)phenylcarbonate; 4-alkylbenzoic acid.4'-alkoxyphenyl esters such as 4-n-butylbenzoic acid.4'-ethoxyphenyl, 4-n-butylbenzoic acid.4'-octyloxyphenyl, 4-n-pentylbenzoic acid.4'-hexyloxyphenyl; azoxybenzene derivatives such as 4,4'-di-n-amyloxyazoxybenzene, 4,4'-di-n-nonyloxyazoxybenzene; 4-cyano-4'-alkylbiphenyls such as 4-cyano-4'-n-octylbiphenyl, 4-cyano-4'-n-dodecylbiphenyl: and ferroelectric liquid crystal such as (2S,3S)-3-methyl-2-chloropentanoic acid.4',4"-octyloxybiphenyl, 4'-(2-methylbutyl)biphenyl-4-carboxylic acid.4-hexyloxyphenyl, and 4'-octylbiphenyl-4-carboxylic acid.4 -(2-methylbutyl) phenyl.

When a solid material is used as the material of the thermal lens forming layer in the light-absorbing layer film, an amorphous organic compound that causes little optical dispersion and has high dependence on temperature of the refractive index thereof is especially preferable. Specifically, similarly to the matrix material described above, compounds known as optical resins can be preferably selected and used. Variation with temperature of the refractive index [unit: 1/K] of optical resins is $1.2 \times 10^{-4}$ for poly(methylmethacrylate), $1.4 \times 10^{-4}$ for polycarbonate, and $1.5 \times 10^{-4}$ for polystyrene, according to the Technical Information Association publication "Development and Properties of the Latest Optical Resins and Design and Forming Techniques of High-Precision Parts" [Technical Information Association (1993), p. 35]. These resins can be preferably used as the material of the thermal lens forming layer in the light-absorbing layer film.

The above organic solvents have an advantage that the temperature dependence of refractive index thereof is higher than that of the above optical resins. However, the organic solvents have a problem that the solvents boil when the increase in temperature resulting from irradiation with the control light beam heats to organic solvents to their respective boiling points (No such arises when a high-boiling point solvent is used). In contrast, an optical resin from which volatile impurities have been thoroughly removed, for example, polycarbonate, can be used under harsh conditions wherein the increase in temperature resulting from irradiation with the control light beam exceeds 250° C.

[Heat-Insulating Layer Film]

When a gas is used as the heat-insulating layer film, in addition to air, inert gases such as nitrogen, helium, neon, argon, etc. can be preferably used.

When a liquid is used as the heat-insulating layer film, any liquid can be used as long as the heat conductivity of the liquid is equal to that of the light-absorbing layer film or smaller than that of the light-absorbing layer film, the liquid transmits the control light beam and the signal light beam, and the liquid does not melt or corrode the material of the light-absorbing layer film. For example, liquid paraffin can be used when the light-absorbing layer film comprises polymethylmethacrylate containing a cyanine pigment.

When a solid is used as the heat-insulating layer film, any solid can be used as long the solid has a heat conductivity equal to that of the light-absorbing layer film (the light-absorbing film and the thermal lens forming layer) or smaller than that of the light-absorbing layer film, transmits the control light beam and the signal light beam and does not react with the material of the light-absorbing layer film and the heat-conducting layer film. For example, polymethylmethacrylate not containing any pigment [having the heat conductivity of 0.15 W/mK at 300K] can be used when the light-absorbing layer film comprises polymethylmethacrylate containing a cyanine pigment.

[Material of Heat-Conducting Layer Film]

A material having larger heat conductivity than that of the light-absorbing layer film is preferable as the material of the heat-conducting layer film, and any material can be used when the material transmits the control light beam and the signal light beam and does not react with the materials of the light-absorbing layer film and the heat-insulating layer film. Examples of usable materials having high heat-conductivity and small light absorption in wavelength bands in the visible spectrum include, for example, diamond [having a heat conductivity of 900 W/mK at 300K], sapphire [having a heat conductivity of 46 W/mK at 300K], a single quartz crystal [having a heat conductivity of 10.4 W/mK at 300K in a direction parallel to c-axis], quartz glass [having a heat conductivity of 1.38 W/mK at 300K], hard glass [having a heat conductivity of 1.10 W/mK at 300K], etc.

[Material of Light-Absorbing Layer]

In the thermal lens forming device used in the invention, as shown in FIG. 11, a refractive-index-distributed-type lens functioning as means for converging the control light beam may be provided stacked on the side through which the control light beam enters the light-transmitting layer and materials. For this lens, solid materials similar to those of the heat-insulating layer film and/or the heat-conducting layer film can be used. The light-transmitting layer is provided not only for improving the efficiency of transmission of the control light beam and the signal light beam, but also for adhering the refractive-index-distributed-type lens as an element constituting the thermal-lens forming device. Among UV-curing-type resins and electron-beam-curing-type resins, those having high light transmittance in the wavelength bands of the control light beam and the signal light beam can be especially preferably employed.

[Method of Producing Thermal Lens Forming Device]

A method of producing the thermal lens forming device used in the present invention can be selected in consideration of the configuration of the thermal lens forming device and the materials used, and any suitable known method can be used.

For example, when the material of the light absorbance used for the light-absorbing film in the thermal lens forming device is a single crystal as described above, the light-absorbing film can be produced by cutting and polishing process the single crystal.

In another example, when a thermal lens forming device having a "heat-conducting layer film/light-absorbing film/thermal lens forming layer/light-absorbing film/heat-conducting layer film" configuration for which the light-absorbing film comprising the matrix material containing a pigment is produced, and in which the thermal lens forming layer comprising an optical resin and optical glass as the heat-conducting layer film are combined, the light-absorbing film can be first produced on the heat-conducting layer film by any of the methods listed hereafter.

A method may be used of forming the light-absorbing film by coating a solution dissolving the pigment and the matrix material on a glass plate used as the heat-conducting layer film by a coating method such as an applying method, a blade coating method, a roll coating method, a spin-coating method, a dipping method, a spraying method, etc., or by printing the solution on the glass plate by a printing method such as planography, relief printing, intaglio printing, mimeograph, screen printing, transferring, etc. In conjunction with any of these methods, a method of producing an inorganic matrix material by the sol-gel method can also be utilized for forming the light-absorbing film.

Electrochemical film-forming techniques such as an electro-deposition method, an electrolytic polymerization method, a micelle electrolysis method (see, for example, Japanese Patent Application Laid-Open Publication No. 1988-243298), etc. can be used.

Furthermore, the Langmuir-Blodgett method that transfers a mono-molecular film formed on water can also be used.

As methods of utilizing reactions of polymerization or condensation-polymerization of a raw material monomer, in the case where the monomer is liquid, a casting method, a reaction-injection molding method, a plasma polymerization method, a photo-polymerization method, etc. are among methods that can be employed.

Additional applicable methods include a sublimation transfer method, a vapor-deposition method, a vacuum vapor-deposition method, an ion beam method, a sputtering method, a plasma polymerization method, a CVD method, an organic molecular beam vapor-deposition method, etc.

A method of producing a composite-type optical thin film (see, for example, Japanese Patent No. 2599569) can be utilized, wherein an organic optical material having two (2) or more components in a solution state or a dispersed liquid state is deposited on a substrate by spraying the material into a high-vacuum container from a spray nozzle provided for each component and is heat-processed.

The above-described methods of producing the solid light-absorbing film can also be preferably used in, for example, when the heat-insulating film comprising a solid organic high-molecular material.

Next, when the thermal lens forming layer is produced using the thermo-plastic optical resin, an element having a configuration of "heat-conducting layer film/light-absorbing film/thermal lens forming layer/light-absorbing film/heat-conducting layer film" can be produced for use as the thermal-lens forming device using a vacuum hot-pressing method (see, for example, Japanese Patent Application Laid-Open Publication No. 1992-99609) That is, the laminated-layer-type thin film device having the above configuration can be produced by sandwiching powder or a sheet of the thermoplastic optical resin by two (2) heat-conducting layer films (glass plates) having respectively a light-absorbing film formed on the surface thereof by the method described above, and heating and pressing these films and resin.

[Material and Method of Producing Refractive-Index-Distributed-Type Lens]

For the thermal lens forming device used in the invention, the refractive-index-distributed-type lens as means for converging the control light beam may be provided stacked on the side of the device through which the control light beam enters through the light-absorbing layer. However, known materials and methods can be used optionally as the material and the method of producing this refractive-index-distributed-type lens.

For example, the refractive-index-distributed-type lens of a refractive-index-distributed type can be produced with an organic high-molecular material utilizing osmosis/diffusion phenomena of monomer [M. Oikawa, K. Iga and T. Sanada, Jpn. J. Appl. Phys., 20 (1), L51-L54 (1981)]. That is, the refractive-index-distributed-type lens can be fabricated monolithically on a flat substrate by a monomer exchange technique. For example, methylmethacrylate as a low-refractive-index plastic (n=1.494) is diffused into a flat plastic substrate of polydiacrylisophthalate having a high refractive index from the circumference of a mask of a circular disk having a diameter of 3.6 mm.

Furthermore, the refractive-index-distributed-type lens of a refractive-index-distributed type can be fabricated from an inorganic glass material utilizing diffusion phenomenon of inorganic ion [M. Oikawa and K. Iga, Appl. Opt., 21 (6), pp. 1052-1056 (1982)]. That is, after a mask is set onto a glass substrate, a circular window having a diameter of approximately 100 μm is provided to the mask by a photolithography technique, the substrate with the mask is dipped in melted salt, and a distribution of refractive index is formed by ion exchange, and a lens having, for example, a diameter of 0.9 mm, a focal distance of 2 mm and a numerical aperture NA=0.23 can be formed by facilitating ion exchange by applying an electric field for several hours during the dipping process.

[Optical Cell]

The optical cell used in the pigment-solution-filling-type thermal lens forming device has a function of holding the pigment solution and another function of effectively providing a shape to the pigment solution and causing the pigment solution to work as a combined light-absorbing layer film and thermal lens forming layer and, furthermore, has another function of receiving the converged and irradiated signal light beam and the control light beam and causing the signal light beam and the control light beam to propagate to the above-described light-responding composition, and yet another function of causing the diverging signal light beam to propagate and exit after transmitting the light-responding composition.

The shape of the optical cell used in the pigment-solution-filling-type thermal lens forming device can be roughly classified into an "outer shape" and an "inner shape".

As the outer shape of the optical cell, a plate shape, a 000000cuboidal shape, a columnar shape, a semi-cylindrical shape, a quadrangular-prism shape, a triangular-prism shape, etc. is used according to the configuration of the optically controlled optical-path-switching-type optical signal transmission apparatus of the invention.

The inner shape of the optical cell is, i.e., the shape of a pigment solution filling unit and effectively gives a shape to the pigment solution. Specifically, the inner shape of the optical cell can be properly selected from, for example, a thin-film shape, a thick-film shape, a plate shape, a cuboidal shape, a columnar shape, a semi-cylindrical shape, a quadrangular-prism shape, a triangular-prism shape, a convex-lens shape, a concave-lens shape, etc. according to the configuration of the optically controlled optical-path-switching-type optical signal transmission apparatus of the invention.

As the configuration and the material of the optical cell, any combination of configurations and materials that satisfies the following conditions can be used as desired:

(1) the outer shape and the inner shape described above are precisely maintained under actual use conditions;

(2) the material is inert to a pigment solution;

(3) variations of composition resulting from emanation, permeation, or osmosis of the components constituting the pigment solution are prevented; and (4) the pigment solution is prevented from degrading due to contact with gases or liquids such as oxygen, water, etc. present in the environment during use.

As specific examples of materials of the optical cell, materials that can be preferably used regardless of the kind of the pigment include various optical glass such as soda glass, boron silicate glass; quartz glass; sapphire, etc. When the solvent of the pigment solution is water or alcohol, plastics such as poly(methyl methacrylate), polystyrene, polycarbonate, etc. can also be used.

However, among the conditions described above, the function of preventing variation of the composition and degradation of the pigment solution may be exerted only within the range of the designed life as the thermal lens forming device.

An optical cell having an integrated configuration incorporating other optical elements, i.e., the condenser lens, the light-receiving lens, the wavelength selecting and transmitting filter, etc. into the optical cell can be employed.

[Calculation of Beam Waist Diameter]

In order to effectively utilize the thermal lens effect in the optically controlled optical-path-switching-type optical signal transmission apparatus and the optical signal optical path switching method of the invention, it is preferable that the shape and the size of the beam cross section of the signal light beam and the control light beam are set respectively such that the magnitude of the beam cross-sectional area of the signal light beam in the area having the highest photon density in the vicinity of a focal point (the point on which light is concentrated), i.e., the beam waist, does not exceed the magnitude of the beam cross-sectional area of the control light beam at the beam waist.

Now, a case wherein the distribution of amplitudes of the electric field of the beam cross section in the direction of traveling, i.e., the energy distribution of the light flux is the Gaussian distribution, will be described. In the following description, although an example wherein a condenser lens (refractive-index-distributed-type lens) is used as beam converging means will be described, the same description can be applied even when the converging means is a concave mirror or a refractive-index-dispersed-type lens.

Figure 14:
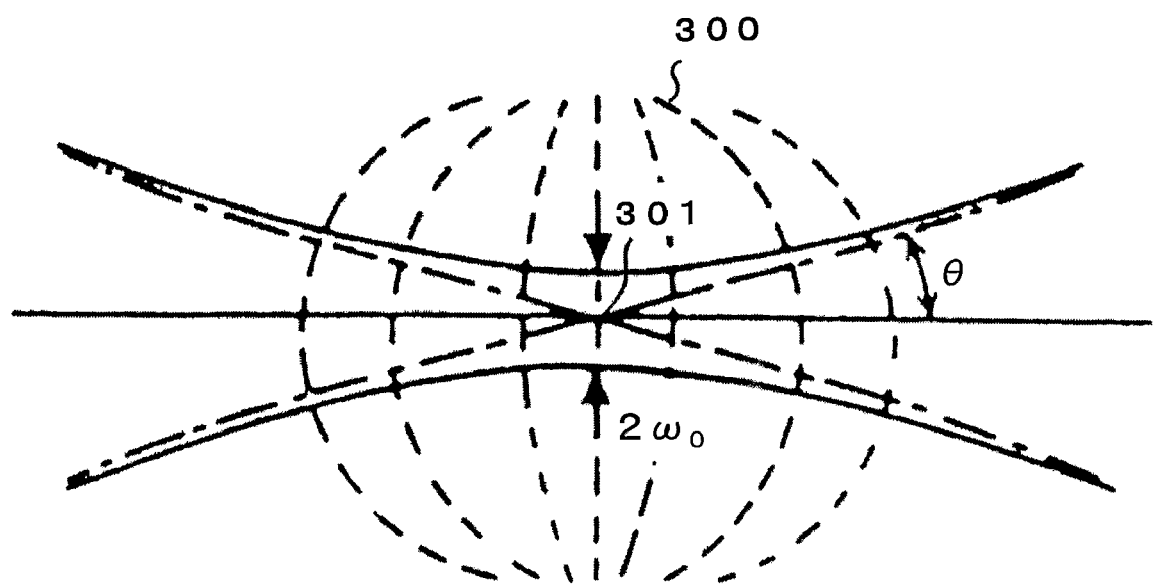
FIG. 14 is a schematic view showing the vicinity of a focal point of a Gaussian beam converged by a condenser lens, etc.

A view of a light beam flux and wave fronts 300 in the vicinity of a focal point 301 when a Gaussian beam is converged at a divergence angle of 2θ by a condenser lens 31, etc. of FIG. 1 is shown in FIG. 14. Here, the position at which the diameter 2ω of the Gaussian beam having a wavelength λ reaches its minimum value is referred to as the beam waist, and the beam waist diameter is hereinafter represented by $2\omega_0$. $2\omega_0$ does not become zero (0) and has a finite value because of the diffraction effect of light. The definition of beam radiuses ω and $\omega_0$ is that these lengths are obtained by measuring distances from the beam center to the position at which energy becomes $1/e^2$ (e is the base of the natural logarithm) relative to the energy at the beam central portion of the Gaussian beam, and the beam diameter is represented by 2ω or $2\omega_0$. Obviously, the photon density is highest at the center of the beam waist.

For a Gaussian beam, a beam divergence angle θ at a position sufficiently far away from the beam waist thereof is correlated with the wavelength λ thereof and the beam waist radius $\omega_0$ by the following Equation [4].

$$\Pi \cdot \theta \cdot \omega_0 \approx \lambda \tag{4}$$

Here, Π is the ratio of the circumference of a circle to the diameter thereof.

When the above Equation [4] is used under the condition that is sufficiently far away from the beam waist, the beam waist radius $\omega_0$ of the beam waist created by concentrating the light beam using a condenser lens can be calculated from the beam radius ω of the light beam entering into the condenser lens and the numerical aperture and the focal distance of the condenser lens.

Furthermore, the beam waist diameter $2\omega_0$ in the case where a parallel Gaussian beam (wavelength λ) having a beam radius ω is converged by a condenser lens having an effective aperture radius "a" and a numerical aperture NA can be generally represented by the following Equation [5].

$$2\omega_0 \approx k \cdot \lambda / NA \tag{5}$$

Here, because a coefficient k can not be solved algebraically, the coefficient k can be determined by carrying out numerical analytical calculation of the optical intensity distribution on a lens imaging plane.

When the numerical analytical calculation is carried out changing the ratio of the beam radius ω entering the condenser lens and the effective aperture radius a of the condenser lens, the value of the coefficient k in the Equation [5] can be obtained as follows.

When $a/\omega=1, k\approx0.92$;

When $a/\omega=2, k\approx1.3$;

When $a/\omega=3, k\approx1.9$; and

When $a/\omega=4, k\approx3$.

That is, as the beam radius ω becomes smaller than the effective aperture radius a of the condenser lens, the beam waist radius $\omega_0$ becomes larger.

For example, when a signal light beam having a wavelength of 780 nm is converged using a lens having a numerical aperture of 0.25 and an effective aperture radius of approximately 5 mm as a condenser lens, and the beam radius ω of a beam entering the condenser lens is 5 mm, then a/ω is approximately one (1) and the beam waist radius $\omega_0$ is calculated to be 1.4 μm. Similarly, when ω is 1.25 mm, then a/ω is approximately four (4) and $\omega_0$ is calculated to be 4.7 μm. Similarly, when the control light beam having a wavelength of 633 nm is converged, if the beam radius ω is 5 mm, then, a/ω is approximately one (1) and the beam waist radius $\omega_0$ is 1.2 μm; if ω is 1.25 mm, then, a/ω is approximately four (4) and $\omega_0$ is 3.8 μm.

As can be clearly seen from the above examples of calculations, in order to minimize the cross-sectional area of a light beam at the area having the highest photon density in the vicinity of a focal point of a condenser lens, i.e., the beam waist, the beam diameter may be expanded (beam expanding) until the intensity distribution of the light beam entering the condenser lens becomes almost that of a plane wave. Furthermore, it is understood that the beam waist diameter becomes smaller as the wavelength of the light becomes shorter when the beam diameters of the beams entering the condenser lens are the same.

As described above, in order to effectively utilize the thermal lens effect in the optically controlled optical-path-switching-type optical signal transmission apparatus and the optical signal optical path switching method of the invention, it is preferable that the shape and the size of the beam cross section of the signal light beam and the control light beam are set respectively such that the magnitude of the beam cross-sectional area of the signal light beam in the area having the highest photon density in the vicinity of a beam waist does not exceed the magnitude of the beam cross-sectional area of the control light beam at the beam waist. In a case wherein Gaussian beams are used as both the signal light beam and the control light beam, it can be ensured that the magnitude of the beam cross-sectional area of the signal light beam in the area having the highest photon density in the vicinity of the beam waist will not to exceed the magnitude of the beam cross-sectional area of the control light beam at the beam waist thereof by adjusting the beam diameters of the signal light beam and the control light beam in the state where these light beams are parallel beams respectively before being converged by converging means such as a condenser lens, etc., in response to the wavelengths of these beams, by expanding the beam when necessary, according to the above description and above equations for calculation. As means for expanding a light beam, known means such as, for example, a Keplerian optical system comprising two (2) convex lenses may be used.

[Calculation of Confocal Distance Zc]

In general, a converged Gaussian light beam can be approximated as a parallel light beam in the vicinity of the beam waist of the light flux converged by converging means such as a convex lens, i.e., a section between the confocal distances Zc sandwiching a focal point. The confocal distance Zc can be represented by Equation [6] that uses the ratio of the circumference of a circle to the diameter thereof Π, the beam waist radius $\omega_0$, and the wavelength λ.

$$Zc = \Pi \omega_0^2 / \lambda \tag{6}$$

By substituting the Equation [5] for ω of the Equation [6], an Equation [7] is obtained.

$$Zc \approx \Pi (k/NA)^2 \lambda / 4 \tag{7}$$

For example, when a signal light beam having a wavelength of 780 nm is converged using a lens having a numerical aperture of 0.25 and an effective aperture radius of approximately 5 mm as a condenser lens, if the beam radius ω of the light beam entering the condenser lens is 5 mm, then, a/ω is approximately one (1), the beam waist radius $\omega_0$ is 1.4 μm and the confocal distance Zc is calculated to be 8.3 μm and, if ω 1.25 mm, then, a/ω is approximately four (4), $\omega_0$ is 4.7 μm and the confocal distance Zc is calculated to be 88 μm. Similarly, when the control light beam having a wavelength of 633 nm is converged, if the beam radius ω is 5 mm, then, a/ω is approximately one (1), the beam waist radius $\omega_0$ is 1.2 μm and the confocal distance Zc is calculated to be 6.7 μm and, if ω is 1.25 mm, then, a/ω is approximately four (4), $\omega_0$ is 3.8 μm and the confocal distance Zc is calculated to be 71 μm.

[Numerical Aperture of Condenser Lens and Light-Receiving Lens]

In the optically controlled optical-path-switching-type optical signal transmission apparatus and the optical signal optical path switching method of the present invention, the signal light beam and the control light beam are converged by the condenser lens and irradiated such that these light beams focus in the thermal lens forming device. However, when the light beams exiting from the thermal lens forming device at a divergence angle larger than the ordinary divergence angle are received by a light-receiving lens and are collimated into parallel light beams, it is preferable that the numerical aperture (hereinafter, referred to as "NA") of the light-receiving lens beset at an NA larger than the NA of the condenser lens. In addition, it is preferable that the NA of the light receiving lens equals to or exceeds an NA twice as large as the NA of the condenser lens. However, when the effective aperture radius a is larger than the beam radius ω of the beam entering the condenser lens (i.e., a/ω>1), the substantial numerical aperture of the condenser lens is smaller than the numerical aperture of the condenser lens. Therefore, it is preferable that the numerical aperture of the light-receiving lens is set to be larger than the substantial numerical aperture of the condenser lens but the numerical aperture of the condenser lens and to be equal to or larger than a numerical aperture twice as large as the substantial numerical aperture of the condenser lens. By setting the NA of the light-receiving lens to be equal or larger than an NA twice as large as the NA of the condenser lens, the signal light beam can be received without any loss even when the beam diameter of the signal light beam is expanded to a diameter equal to or exceeding a diameter twice as large as the diameter thereof at the time when the signal light beam enters the thermal lens forming device.

[Optical Film Thickness of Light-Absorbing Layer Film]

Experimental results determined by producing samples while varying the thickness of the thermal lens forming device without changing the thickness of the one (1) or two (2) light-absorbing films constituting the light-absorbing layer film and conducting experiments for a plurality of thermal lens forming devices having different thickness and a constant optical density revealed the optical response speed of the thermal lens effect was sufficiently high when the a distance twice as large as the confocal distance Zc calculated as described above was set as the upper limit of the film thickness of the light-absorbing layer film.

As to the lower limit of the film thickness of the light-absorbing layer film, it is preferable that the light-absorbing layer film be made as thin as possible while preserving the thermal lens effect.

[Film Thickness of Heat-Insulating Layer Film]

Optimal values for the film thickness of the heat-insulating layer film (the lower limit value and the upper limit value) are those that maximize the magnitude or the speed of the optical response. These values can be determined experimentally according to the configuration of the thermal lens forming device, the material and the thickness of the light-absorbing layer film, the material of the heat-insulating layer film, the material and the thickness of the heat-conducting layer film, etc. For example, in a case wherein, using the ordinary boron silicate glass as the heat-conducting layer film, polycarbonate as the material of the heat-insulating layer film and the thermal lens forming layer, and a vapor-deposited film of platinaphthalocyanine as the light-absorbing film, a thermal lens forming device is produced, that has a configuration of glass (heat-conducting layer film having a film thickness of 150 μm)/polycarbonate resin layer (heat-insulating layer)/platinaphthalocyanine-vapor-deposited film (light-absorbing film having a film thickness of 0.2 μm)/polycarbonate resin layer (thermal lens forming layer having a thickness of 20 μm)/platinaphthalocyanine-vapor-deposited film (light-absorbing film having a film thickness of 0.2 μm/polycarbonate resin layer (heat-insulating layer)/glass (heat-conducting layer film having a thickness of 150 μm), the thickness of the heat-insulating layer film is preferably from 5 nm to 5 μm and, more preferably, is 50 nm to 500 nm.

[Film Thickness of Heat-Conducting Layer Film]

Optimal values for the thickness of the heat-conducting layer film (in this case, the lower limit value) are values that maximize the magnitude or the speed of the optical response. Such values can be determined experimentally according to the configuration of the thermal lens forming device, the material and the thickness of the light-absorbing layer film, the material and the thickness of the heat-insulating layer, the material of the heat-conducting layer film, etc. For example, in the case where, using the ordinary boron silicate glass as the heat-conducting layer film, polycarbonate as the material of the heat-insulating layer film and the thermal lens forming layer, and a vapor-deposited film of platinaphthalocyanine as the light-absorbing film, a thermal lens forming device is produced, that has a configuration of glass (heat-conducting layer film having a film thickness of 150 μm)/polycarbonate resin layer (heat-insulating layer)/platinaphthalocyanine-vapor-deposited film (light-absorbing film having a film thickness of 0.2 μm)/polycarbonate resin layer (thermal lens forming layer having a thickness of 20 μm)/platinaphthalocyanine-vapor-deposited film (light-absorbing film having a film thickness of 0.2 μm/polycarbonate resin layer (heat-insulating layer)/glass (heat-conducting layer film having a thickness of 150 μm) the lower limit of the thickness of the heat-conducting layer film is preferably 10 μm and, more preferably, 100 μm. The upper limit of the thickness of the heat-conducting layer film in terms of the magnitude or the speed of the optical response is not especially constrained. However, it is necessary to design this thickness matching this thickness with the types, focal distances and working distances of the condenser lens and the light-receiving lens used.

EXAMPLES

Now, the preferred embodiment of the invention will be described in detail using specific example configurations.

Example 1

Figure 1A:
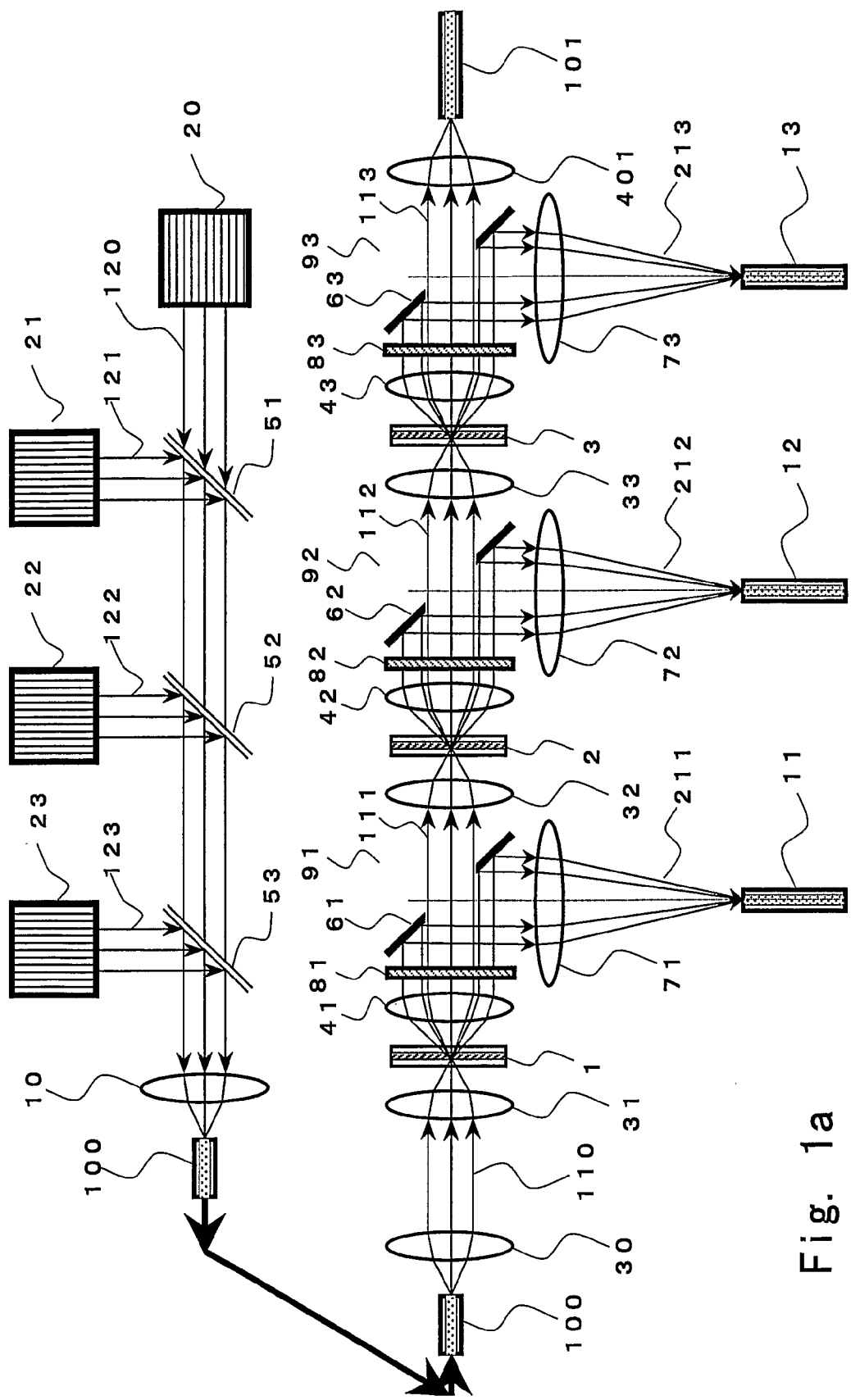
FIG. 1a is a schematic view of the configuration of an optically controlled optical-path-switching-type optical signal transmitting apparatus depicted with an optical path switching mechanism as in Example 1.

A schematic view of the configuration of an optically controlled optical-path-switching-type optical signal transmitting apparatus of Example 1 is shown in FIG. 1a. The optically controlled optical-path-switching-type optical signal transmitting apparatus of FIG. 1a exemplifies one (1) light source 20 for a signal light beam; three (3) light sources 21, 22, and 23 for control light beams having wavelengths that differ from each other and from the wavelength of the signal light beam 120; dichroic mirrors 51, 52, and 53 for aligning all the optical axes of and causing the signal light beam 120 and three (3) control light beams 121, 122, and 123 to propagate coaxially in the same direction; a condenser lens 10 for combining and causing the signal light beam 120 and the three (3) control light beams 121, 122, and 123 to enter an optic fiber 100; the optical fiber 100 for propagating the signal light beam 120 and the three control light beams 121, 122, and 123 together; a collimating lens 30 for returning the signal light beam 120 and the three (3) control light beams 121, 122, and 123 output from the optical fiber 100 back to substantially parallel beams; and optical path switching mechanisms 91, 92, and 93 connected in series in a three (3)-stage configuration and comprising thermal lens injected-light-beam condenser lenses (31, 32, and 33), thermal lens forming devices (1, 2, and 3), thermal lens exiting light receiving lens (41, 42, and 43), wavelength selecting and transmitting filters (81, 82, and 83) and hole-provided mirrors (61, 62, and 63). Straight-traveling signal light beams 111 and 112 output from the optical path switching mechanisms 91 and 92 are spatially combined and enter thermal lens incidence light beam condenser lenses 32 and 33 of the optical path switching mechanisms 91 and 92 of each of the latter stages. Then, a straight-traveling signal light beam 113 output from the optical path switching mechanism 93 of the third stage is condensed by a condenser lens 401 for the straight-traveling signal light beams and enters an optical fiber 101 for the straight-traveling signal light beams. Signal light beams 211, 212, and 213 for which the optical paths have been switched, exiting from the optical path switching mechanisms 91, 92, and 93, respectively, are condensed by respective exiting signal light beam condenser lenses 71, 72, and 73, provided after the switching of the optical paths thereof and respectively enter exiting signal light beam optical fibers 11, 12, and 13, which are in turn provided after the point of switching of the optical paths. Here, ordinary single-mode quartz optical fibers (10 to 100 m long) are used as the optical fibers 11, 12, 13, 100, and 101. Instead of the single-mode quartz optical fibers, multi-mode quartz optical fibers, SI-type plastic optical fibers, GI-type plastic optical fibers, etc. can be used. These may be selected according to the transmittance/transmission distance properties of the control light beams and the signal light beams.

The number of connected stages of the optical path switching mechanisms corresponds to the number of light sources of signal light beams having wavelengths different from each other. However, the number of stages that can be connected is calculated from the transmittance of a signal light beam per one (1) stage of the optical path switching mechanism, the initial intensity of a signal light beam entering the optically controlled optical-path-switching-type optical signal transmission apparatus, and the final necessary signal light beam intensity. For example, when the transmittance per one (1) stage of the optical path switching mechanism is 85% (attenuation of 0.7 dB as the signal intensity), the integrated transmittance in the case of four (4) stages connected in series is 52.2% (attenuation of 2.8 dB, ditto).

Figure 1B:
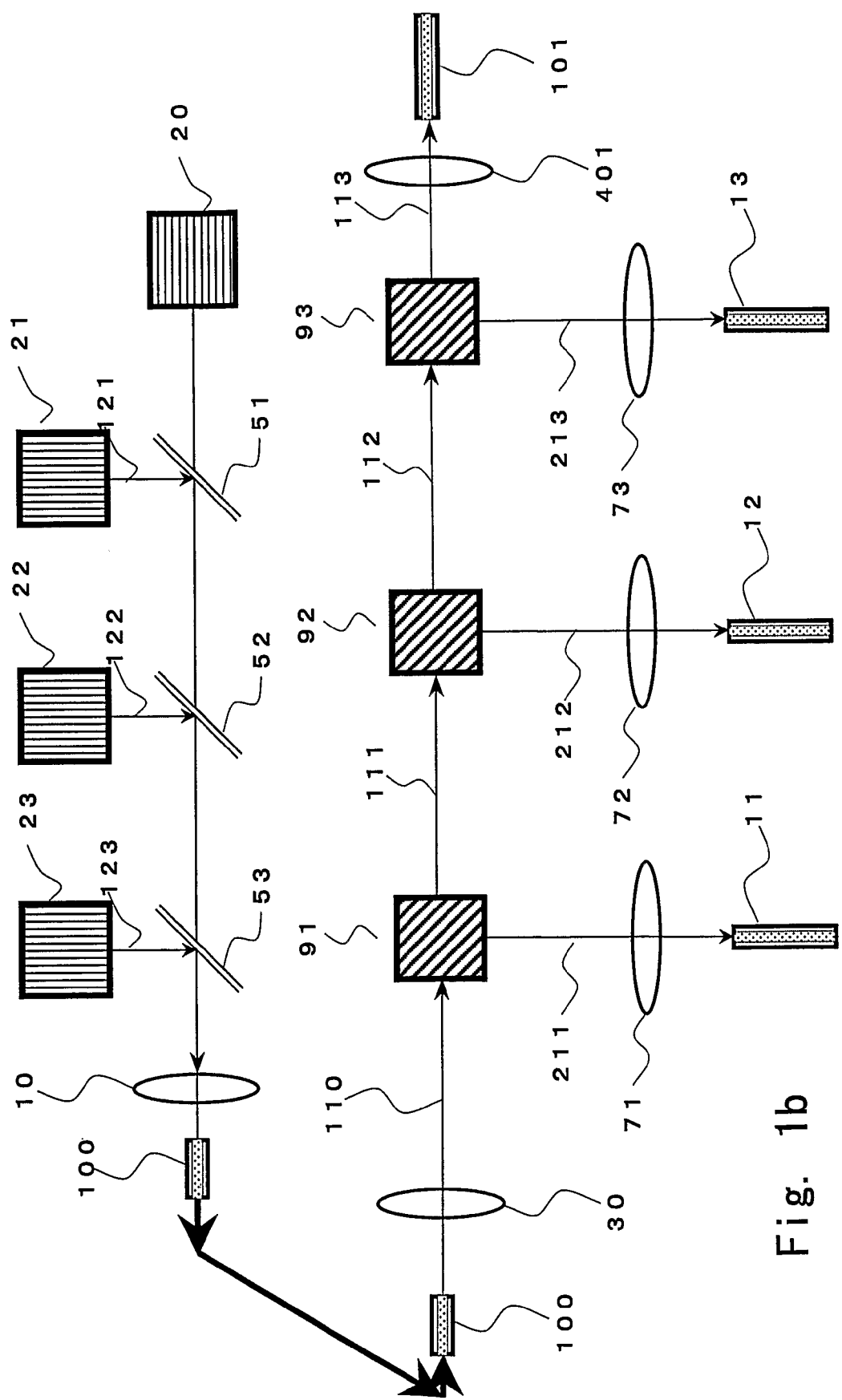
FIG. 1b is a schematic view of the configuration of the optically controlled optical-path-switching-type optical signal transmitting apparatus shown in FIG. 1, depicted with a schematically depicted optical path switching mechanism as in Example 1 by abbreviation.
Figure 2A:
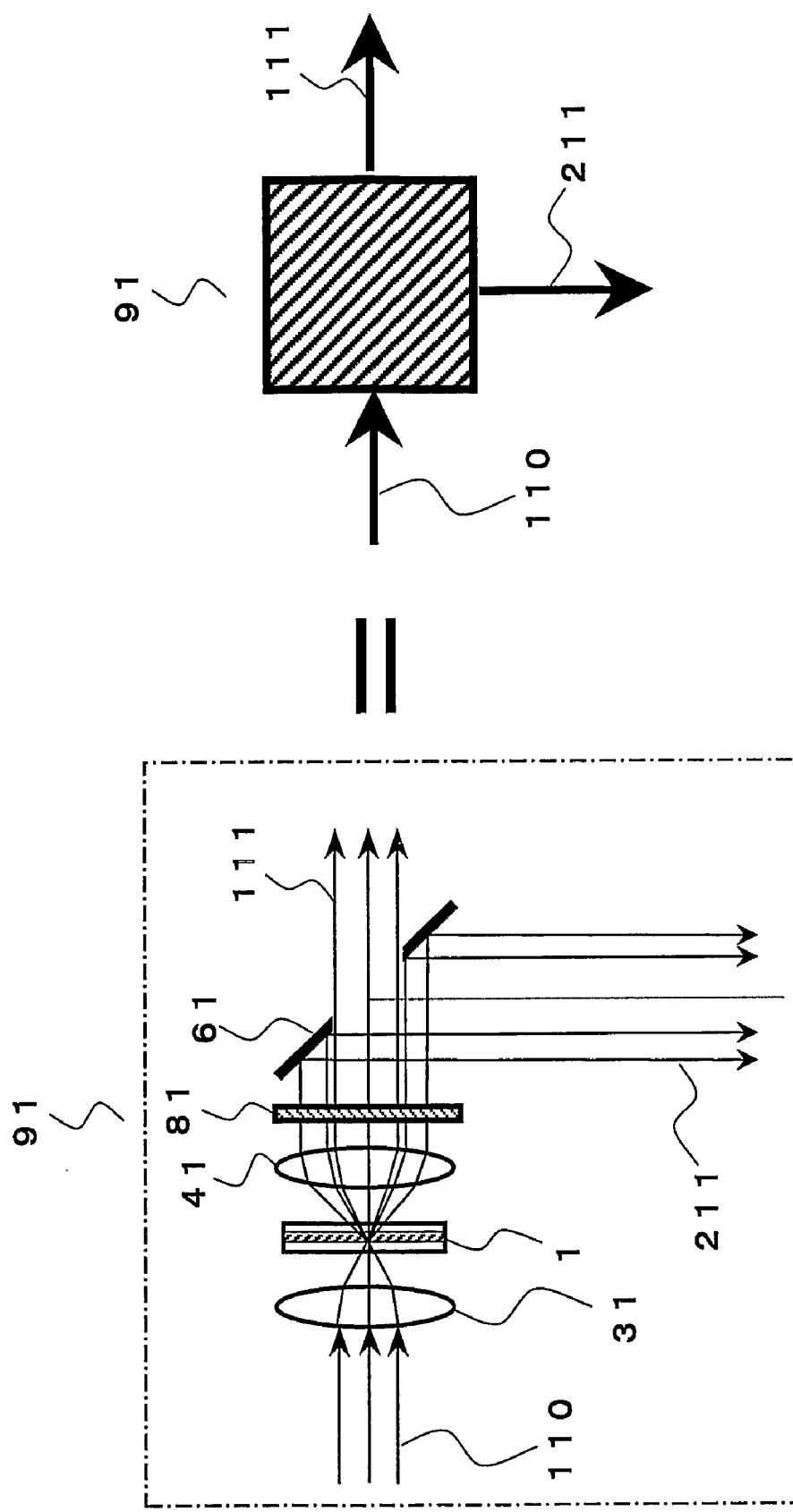
FIG. 2a is a simplified representation of the configuration of an optical path switching mechanism of a space-coupling type.
Figure 8A:
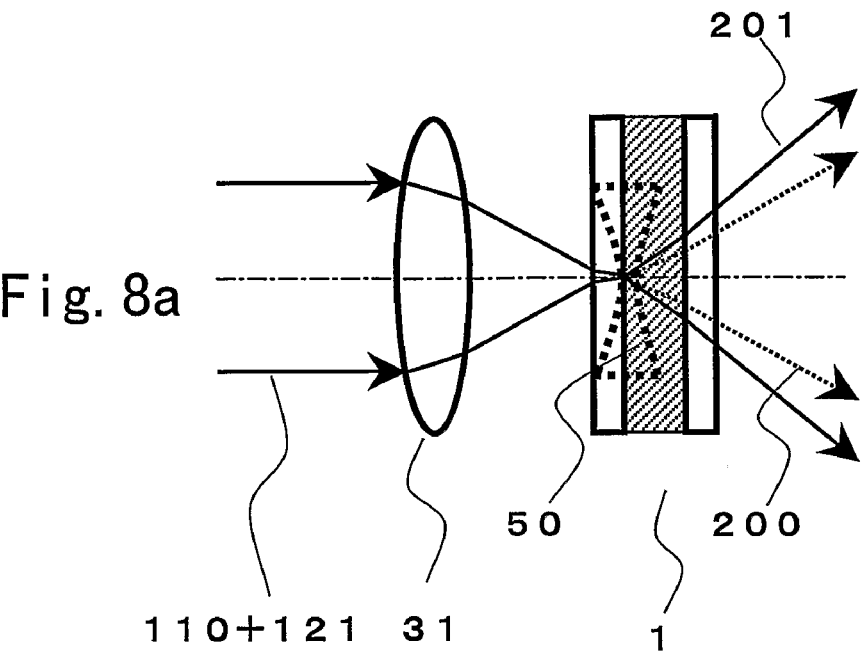
FIG. 8(a) shows the path of a light beam when a thermal lens is formed when the position of the beam waist is adjusted such that the beam waist is positioned in the vicinity of the beam-entering side of a light absorbing layer film.
Figure 8B:
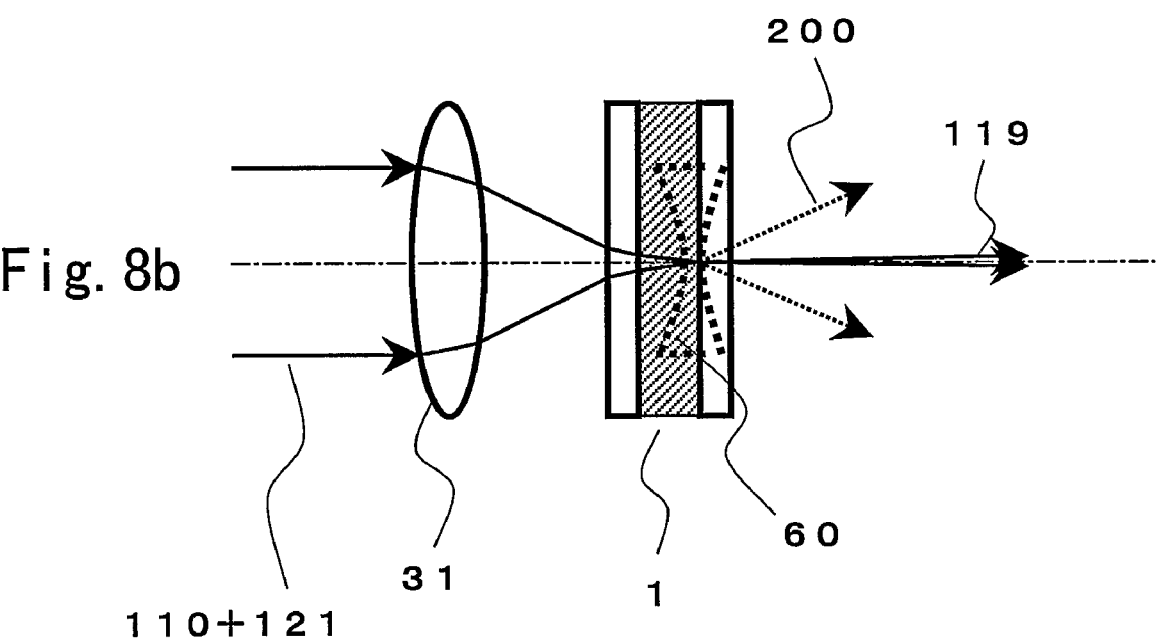
FIG. 8(b) shows the path of a light beam when a thermal lens is formed when the position of the beam waist is adjusted such that the beam waist is positioned in the vicinity of the beam-exiting side of a light absorbing layer film.
Figure 9A:
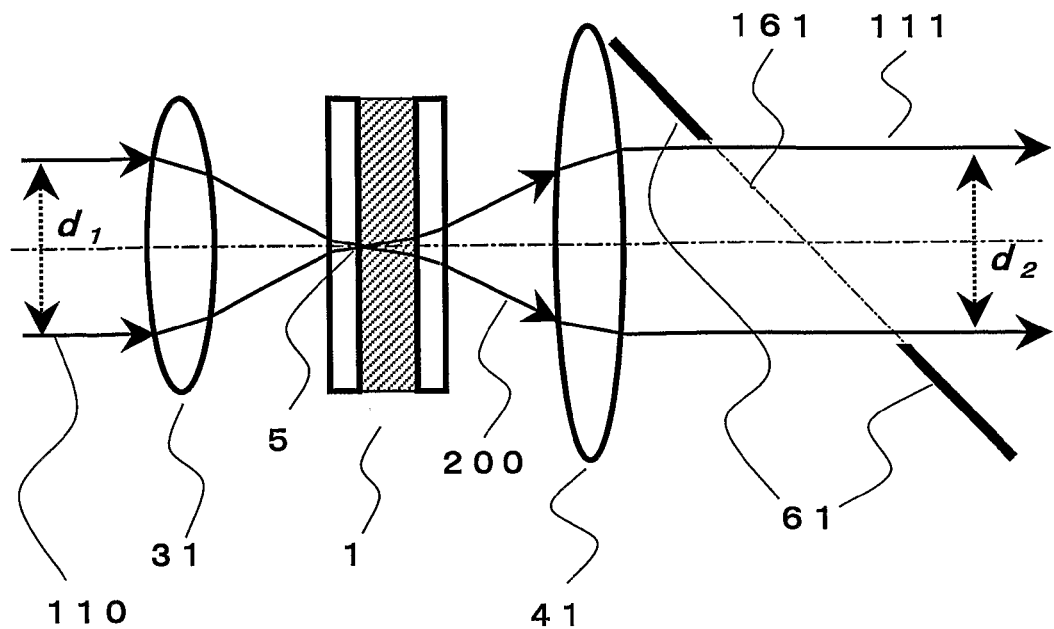
FIG. 9(a) is a schematic view illustrating the principle of the switching of optical paths when the position of the beam waist is adjusted such that the beam waist is positioned in the vicinity of the beam-entering side of a light absorbing layer film.
Figure 9B:
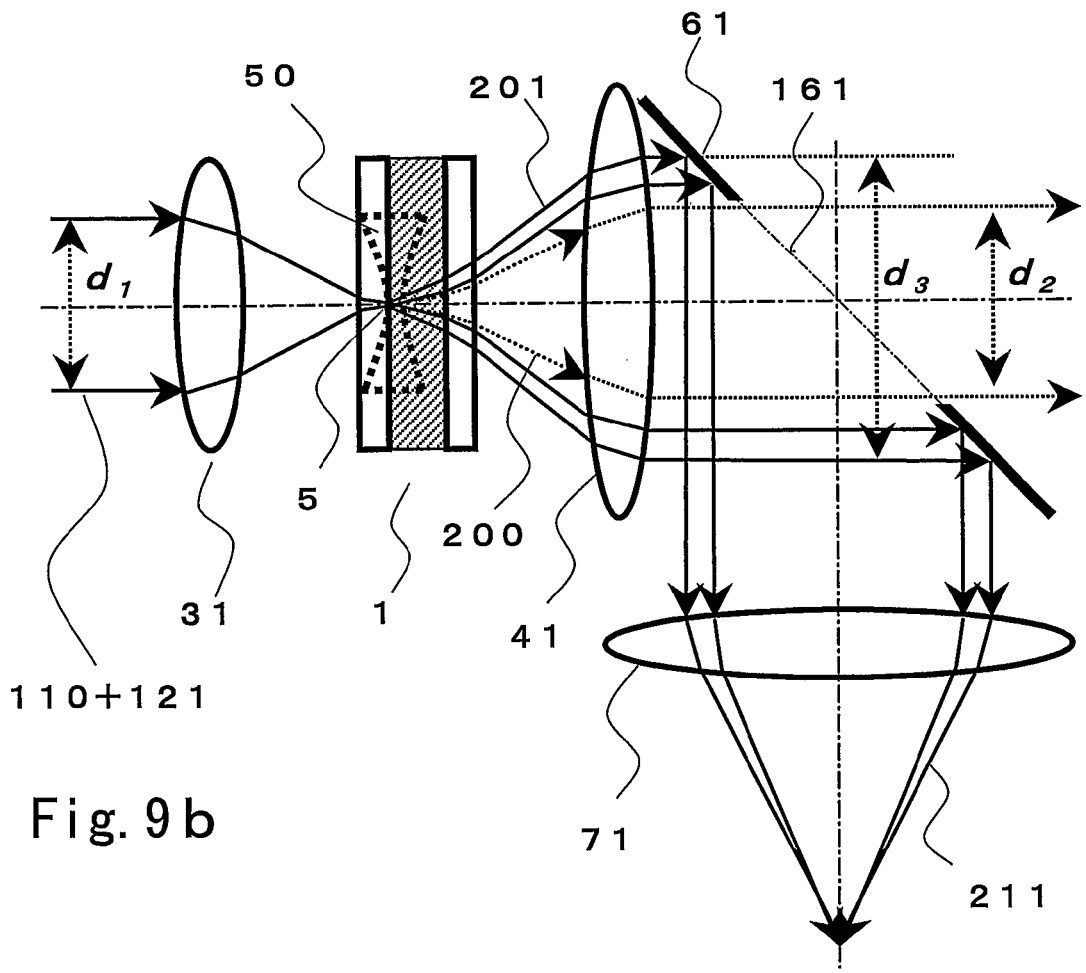
FIG. 9(b) is a schematic view illustrating the principle of the switching of optical paths when the position of the beam waist is adjusted such that the beam waist is positioned in the vicinity of the beam-entering side of a light absorbing layer film.
Figure 10A:
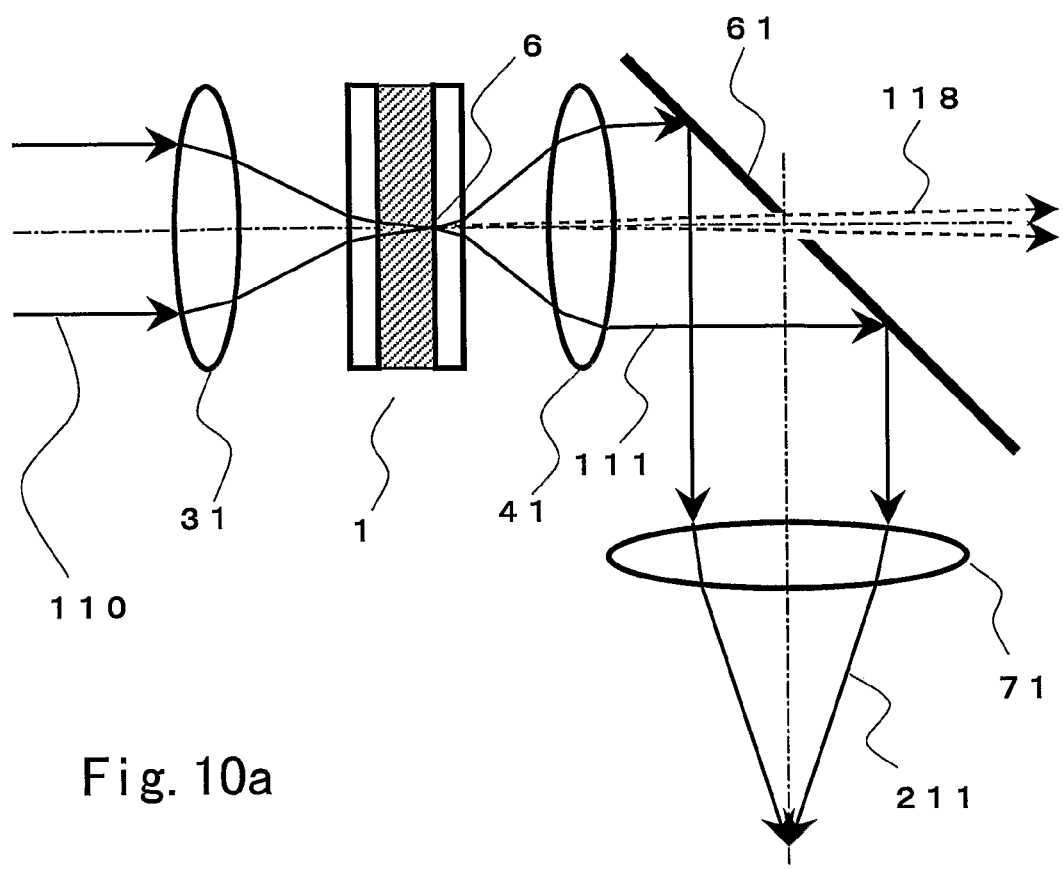
FIG. 10(a) is a schematic view illustrating the principle of the switching of optical paths when the position of the beam waist is adjusted such that the beam waist is positioned in the vicinity of the beam-exiting side of a light absorbing layer film.
Figure 10B:
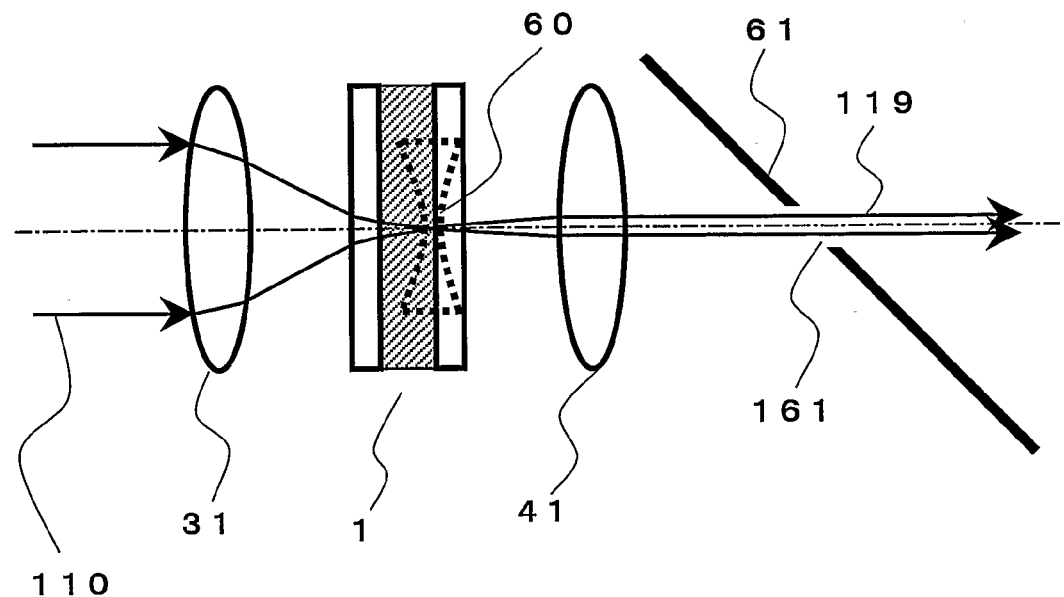
FIG. 10(b) is a schematic view illustrating the principle of the switching of optical paths when the position of the beam waist is adjusted such that the beam waist is positioned in the vicinity of the beam-exiting side of a light absorbing layer film.

Next, detailed description will be presented using an example of the three (3)-stage configuration connected in series shown in FIG. 1a. Segmentary views extracting the portions showing the condenser lens 31 and a thermal lens forming device 1 of the FIG. 1a are shown in FIG. 7 and FIG. 8. In addition, segmentary views added with the light-receiving lens 41 and the hole-provided mirror 61, etc. are shown in FIG. 9 and FIG. 10. Furthermore, to avoid a complex view showing the configuration of an apparatus provided with three (3) or more optical path switching mechanisms, in the case where the optical path switching mechanisms 91, 92. and 93 are connected as a spatially-connected type as shown in FIG. 1a, a schematic view of the configuration of the optical path switching mechanisms of the spatially-connected type (a diagram on the left in FIG. 2a) is partially symbolized and represented as in a diagram on the right in FIG. 2a. That is, for example, the optically controlled optical-path-switching-type optical signal transmission apparatus of FIG. 1a is represented by a schematic configuration diagram that is partially symbolized as FIG. 1b. Because FIG. 1a and FIG. 1b are schematic configuration diagrams having identical contents except that the way of representation is different, hereinafter, these views are simply referred to as FIG. 1, when FIG. 1a and FIG. 1b need not need be distinguished.

Figure 3:
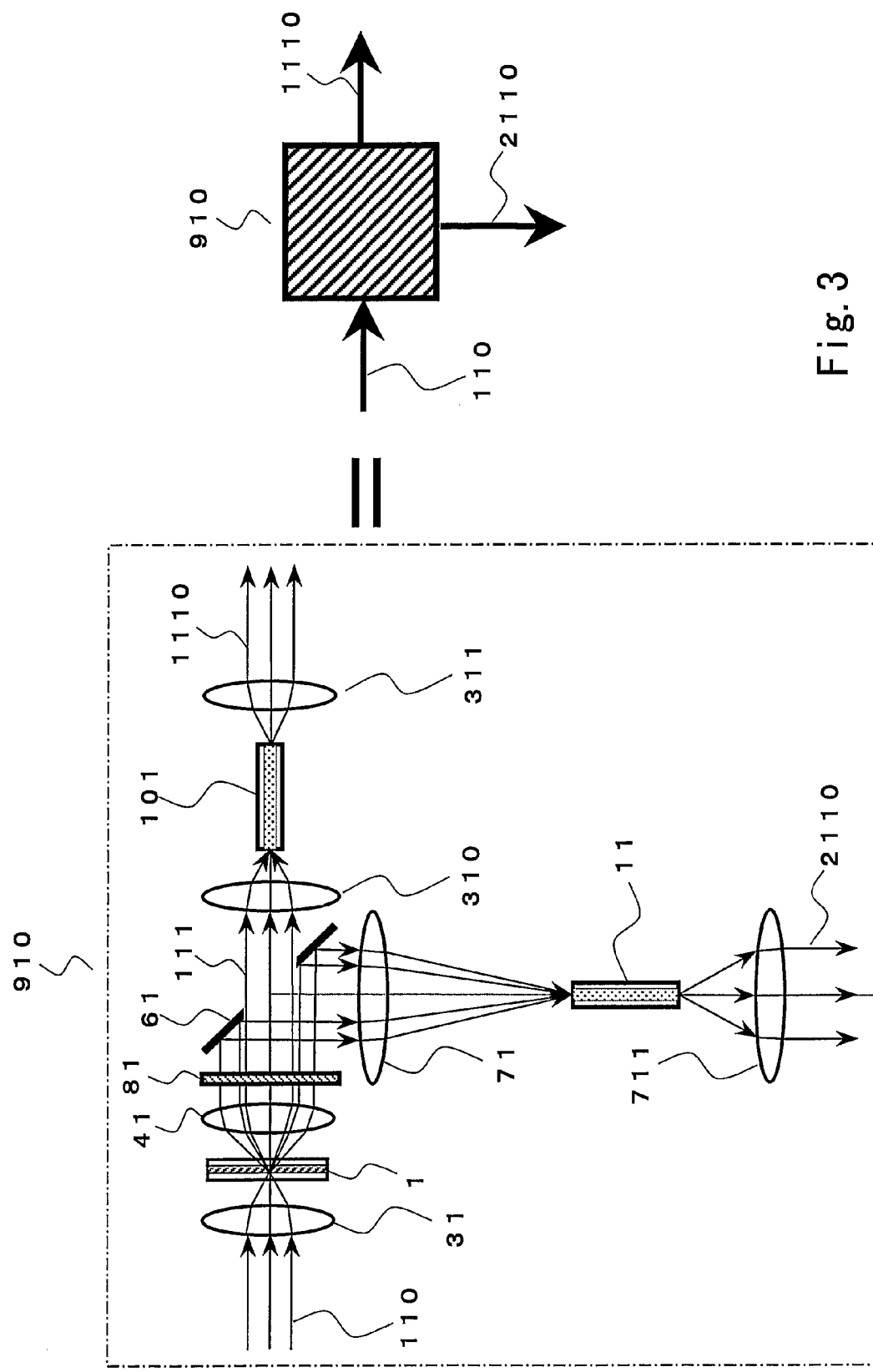
FIG. 3 is a simplified schematic representation of the configuration of an optical path switching mechanism of an optical-fiber-coupling type.

Furthermore, two (2) or more optical path switching mechanisms can be connected as an optical-fiber-connected type. However, in such a case, the mechanisms are represented as in FIG. 3 omitting the schematic view of the configuration of the optical path switching mechanisms of the optical-fiber-connected type.

Although the thermal lens forming device 1 is depicted as a device having a three (3)-layer configuration of "the heat-conducting layer film 501/the light-absorbing layer film 503/the heat-conducting layer film 502" in FIG. 1a to FIG. 3 and FIG. 7 to FIG. 10, the configuration is not thus limited.

In the example, as the thermal lens forming devices 1, 2, and 3, the pigment-solution-filling-type thermal lens forming devices 800 (FIG. 21) filled respectively with solutions of each of the above-described pigments [1], [2] and [3] are used. As the solvent for dissolving the pigments, o-dichlorobenzene thoroughly dehydrated and degassed is used. Optical cells 809 having the same shape are used for the thermal lens forming devices 1, 2, and 3, and the thickness of the pigment solution filling unit 808 thereof, i.e., the spacing between the entering and exiting surface glass plates 801 and 802 may be, for example, 200 μm. AR coating is applied on the outer surface of the entering and exiting surface glass plates 801 and 802 of the optical cell 809. In addition, the introducing inlet 807 of the optical cell 809 is melted and sealed after a filling and a degassing process for the pigment solution have been carried out. The concentration of the pigment solutions is adjusted between 0.2 to 2 weight percent and is adjusted for each of the pigments [1], [2], and [3], such that the transmittance for 532 nm, 670 nm, and 800 nm is, respectively, 0.0 to 0.2%, and the transmittance for the signal light beam having a wavelength of 850 nm is 85 to 99%.

In this example, an entering signal light beam 110 from the optical fiber 100 is adapted to be approximately a parallel light beam having a beam radius of 5.0 mm by the collimating lens 30.

In this example, although an example planar-illumination-type semiconductor laser that can be modulated at 2.5 GHz and has an oscillation wavelength of 850 nm is used as the light source 20 of the signal light beam 120, a semiconductor laser beam that has oscillation wavelengths of 1350 nm and 1550 nm and can be modulated at an ultra high speed may also be used. In addition, these signal light beams having a plurality of wavelengths may be used simultaneously. In the example, a second order harmonic of a semiconductor-excited Nd:YAG laser having an oscillation frequency of 532 nm, semiconductor lasers having respectively wavelengths of 670 nm and 800 nm are respectively used as the control light beam light sources 21, 22, and 23 for irradiating the control light beams 121, 122, and 123 to cause each of the thermal lens forming devices 1, 2, and 3 to form a thermal lens, and switching of the signal light beam paths is carried out by turning on and off of the control light beams. The control light beams 121, 122, and 123 are beam-shaped and used such that any one of the beams becomes a parallel light beam having a beam radius of 4.5 mm. The laser power of the control light beam light source is 2 to 10 mW before any one of the condenser lenses 31, 32, and 33.

The control light beams 121, 122, and 123 and the signal light beams 110, 111, and 112 are respectively converged by the common condenser lenses 31, 32, and 33 and are irradiated to the thermal lens forming devices 1, 2, and 3. To cause the beam waist of each of the control light beams and the signal light beams to overlap each other in the thermal lens forming devices, the signal light beam and the control light beam are adjusted using the dichroic mirrors 51, 52, and 53 such that the signal light beams and the control light beams are on the same optical axis and parallel to each other before those beams enter the optical fiber 100. By performing this step, the thermal lens effect formed by the light absorption at the position of the beam waist of the control light beams can be utilized efficiently for deflecting the traveling direction of the signal light beams.

A light beam of which the optical intensity distribution is a Gaussian distribution is used for each of the signal light beams and the three (3) control light beams. When a laser light beam as this is condensed by a lens, the optical intensity distribution at the beam waist (light-condensed point; focal point) becomes a Gaussian distribution. When laser light beams having wavelengths in wavelength bands that are absorbed by the light-absorbing film are used as the control light beams, are irradiated to the thermal lens forming device containing the light-absorbing film through the condenser lens, and are converged in the light-absorbing layer film containing the thermal lens forming layer, the light-absorbing film absorbs the laser light and the temperature of the thermal lens forming layer is increased, which decreases the refractive index of that layer. When a light beam having Gaussian-distributed optical intensity as described above is irradiated, the central portion of the Gaussian distribution that has strong optical intensity is converged and the area being irradiated with the light beam becomes the center of light absorption and, in this area, the temperature becomes highest and the refractive index becomes lowest. The light absorption changes into heat from the central portion of the light absorption toward the outer circumference and, furthermore, the refractive index of the light-absorbing layer film containing the thermal lens forming layer is varied spherically from the center of the light absorption toward the exterior due to the heat conveyed to the periphery, and a distribution of refractive index having low refractive index at the center of the light absorption and higher refractive index toward the exterior is created. Then, this distribution functions as a concave lens. That is, a light beam has a higher velocity at a position having a lower refractive index than at a position having a higher refractive index and, therefore, the light velocity at the time when a light beam passes through the area irradiated with the central portion of the Gaussian distribution, that has high optical intensity is higher than the light velocity at the time when the light beam passes through the area irradiated with the peripheral portion of the Gaussian distribution, that has low optical intensity. Therefore, the light beam is deflected toward the area irradiated with the peripheral portion of the Gaussian distribution that has low optical intensity. This operation is locally the same as that of a convex lens in the atmosphere. In practice, the control light beam is condensed by the condenser lens 31, etc. and is irradiated into the light-absorbing layer film containing the thermal lens forming layer. Then, light absorption occurs multiply in the traveling direction of the converged light beam and the light flux of the traveling control light beam itself is also deformed by the thermal lens formed multiply. Therefore, the thermal lens effect that is observed here is different from the effect caused by a single concave lens as described later.

In this example, the signal light beams which have passed through the thermal lens forming devices 1, 2, and 3 are collimated into approximately parallel light beams by the light-receiving lenses 41, 42, and 43. The numerical aperture (hereinafter, referred to as the "NA") of these light-receiving lenses is set to be larger than the NA of the condenser lenses. In this example, 0.25 is employed as the NA of the condenser lenses and 0.55 is employed as the NA of the light-receiving lenses. It is preferable that the NA of the light-receiving lenses is equal to or more than an NA twice as large as the NA of the condenser lenses. When this relation has been satisfied, the combination of the NAs of the condenser lenses and the collimating lens is not limited to this example. By setting the NA of the light-receiving lenses to be equal to or more than an NA twice as large as the NA of the condenser lenses, the light beams can be received without any loss even when the beam diameter of the signal light beams is expanded to a diameter equal to or more than twice as large as the diameter thereof at the time when the signal light beams enter the thermal lens forming device. In this example, the focal distances of the condenser lenses and the light-receiving lenses are set to be same and a diameter of approximately 10 mm is employed as the effective diameter of the condenser lenses.

The signal light beams collimated by the light-receiving lenses 41, 42, and 43 are directed to the hole-provided mirrors 61, 62, and 63. As described later in detail, switching of the paths of the signal light beams is enabled by providing these mirrors with holes.

When the control light beams having a wavelength in a absorption band of the light-absorbing layer film and the signal light beams having a wavelength in a transmission band are irradiated simultaneously such that these light beams focus at a position 5 close to the entering surface of the light-absorbing layer film of the thermal lens forming device 1 as shown in FIG. 7(*a*), the signal light beams exit with a divergence angle larger than that of ordinary exiting light beams 200 as exiting light beams 201 being spread such that the cross section of the light beam spreads in a ring-like shape, due to a thermal lens 50 formed at a position close to the entering surface by the control light beams as shown in FIG. 8(*a*). On the other hand, when those light beams are irradiated simultaneously such that the light beams focus at a position 6 close to the exiting surface of the light-absorbing layer film of the thermal lens forming device as shown in FIG. 7(*b*), the signal light beams exit as converged exiting light beams 119 by a thermal lens 60 formed at a position close to the exiting surface by the control light beams as shown in FIG. 8(*b*). In either of the examples illustrated in FIG. 7(*a*) or FIG. 7(*b*), when the control light beams are not irradiated, the signal light beams are not influenced by the thermal lens 50 or 60, and only the signal light beams exit as the exiting light beams 200 with the ordinary divergence angle as indicated by the dotted lines in FIG. 8(*a*) and FIG. 8(*b*).

Figure 13:
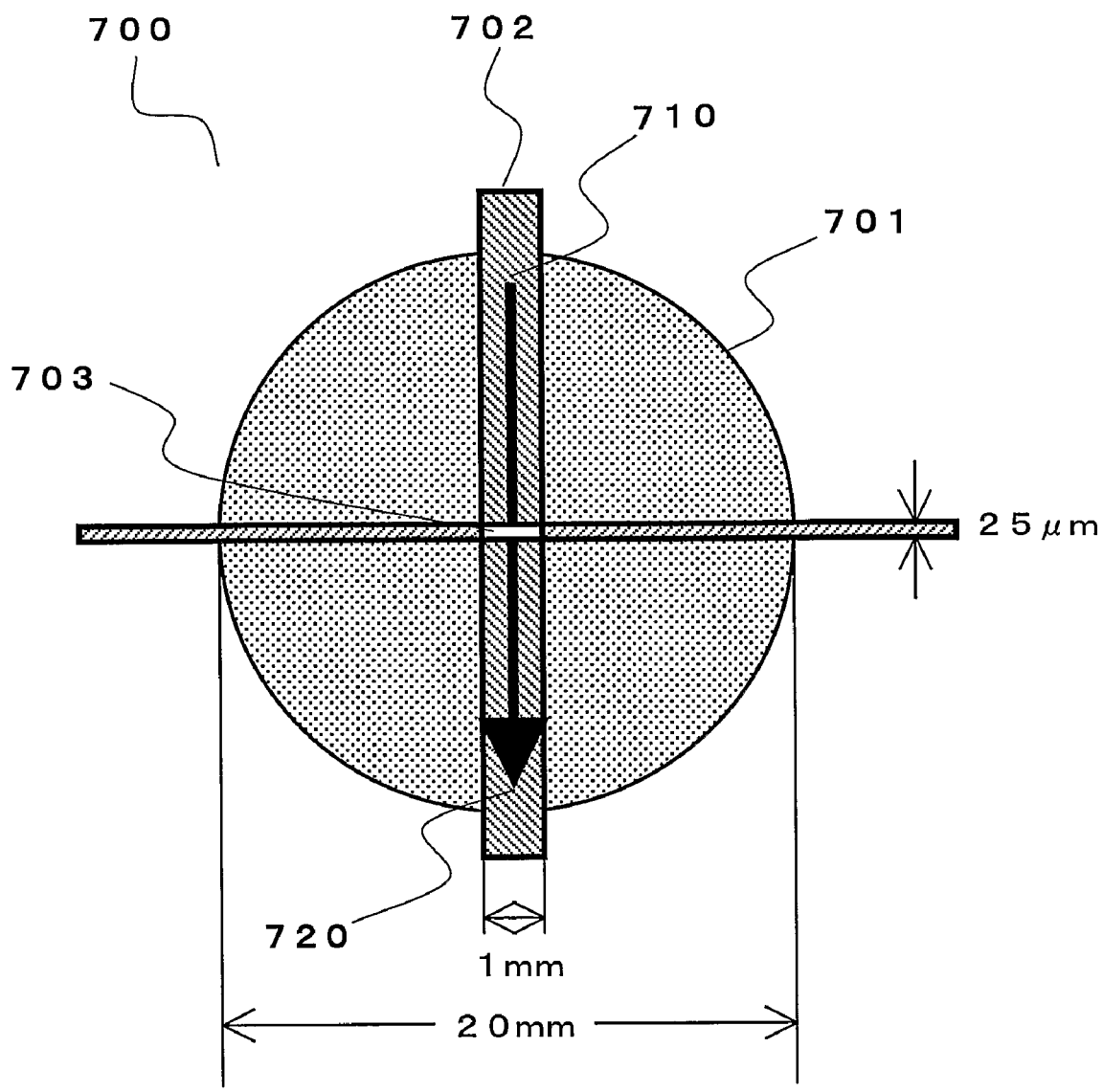
FIG. 13 shows the relationship between a slit and a light beam used in optical intensity distribution measurement on a cross-sectional plane of a signal light beam.
Figure 18:
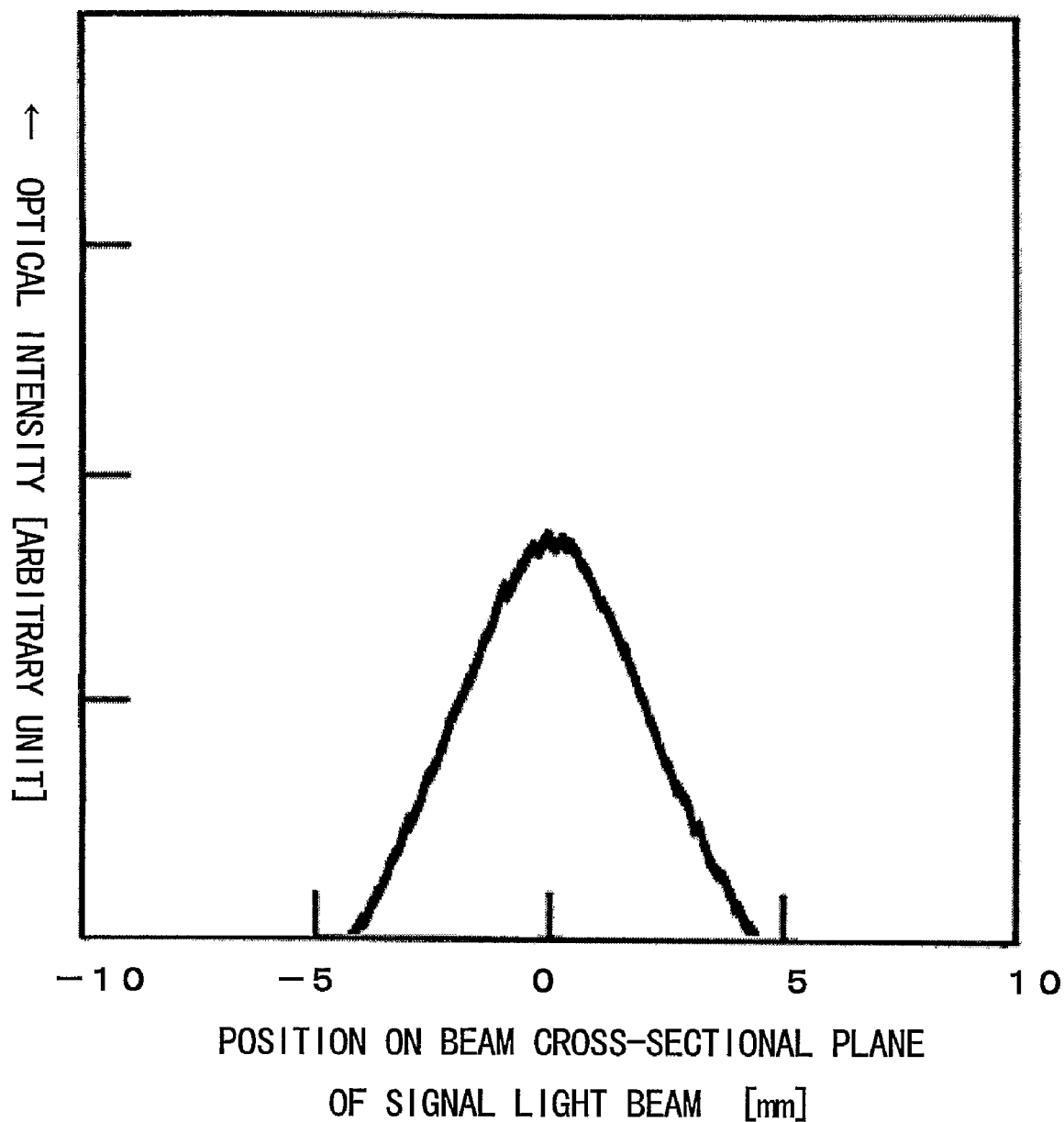
FIG. 18 shows an optical intensity distribution on a cross-sectional plane of a signal light beam.
Figure 19:
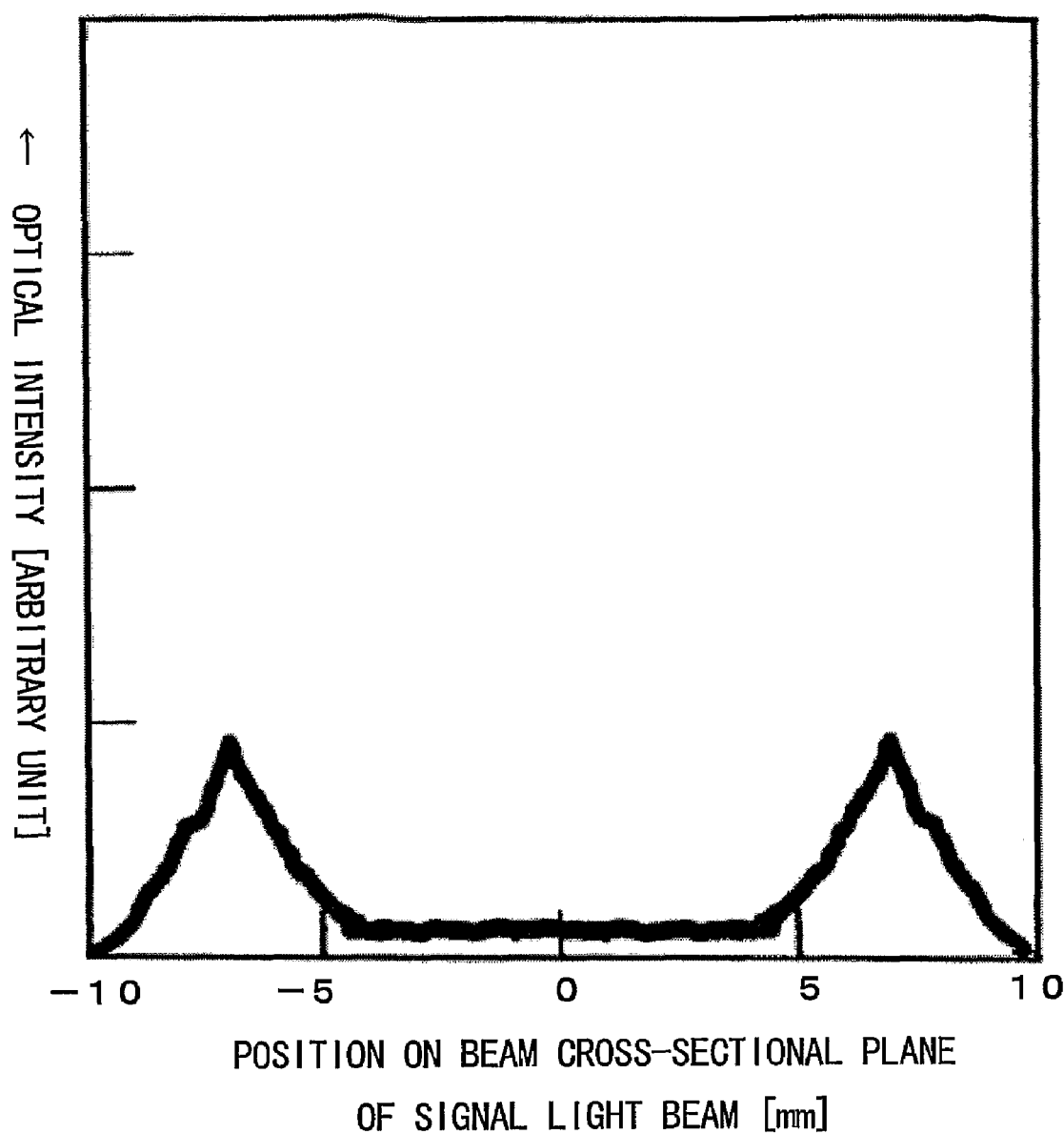
FIG. 19 shows an optical intensity distribution on a cross-sectional plane of a signal light beam.
Figure 20:
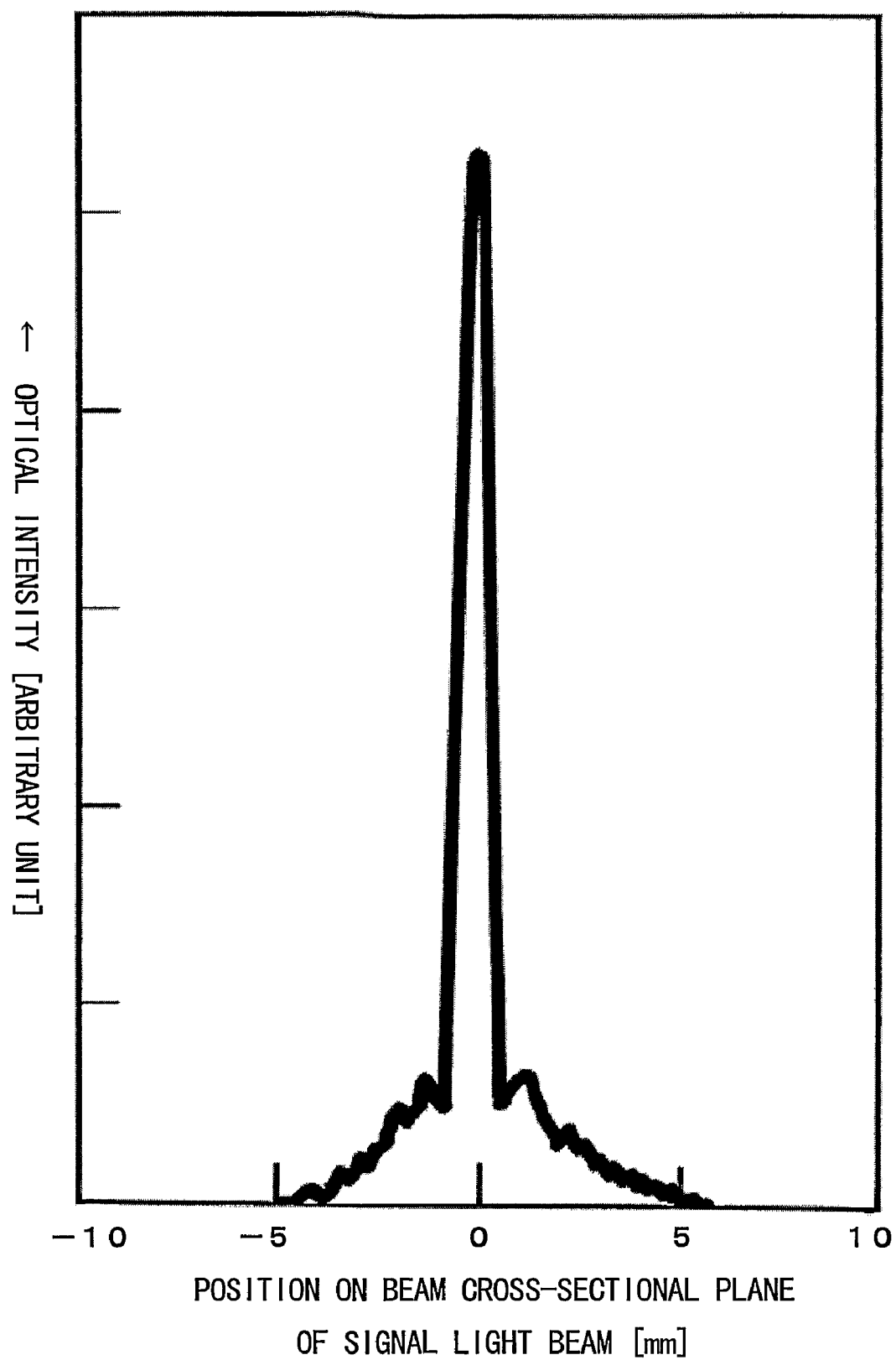
FIG. 20 shows an optical intensity distribution on a cross-sectional plane of a signal light beam.

In order to study the thermal lens effect as described above, the difference in the intensity distribution in the beam cross-sectional plane of the signal light beams corresponding to the presence or absence of the thermal lens effect and the difference in the position of the light-condensed point was measured. That is., in an apparatus of which the overview is shown in FIG. 1 or FIG. 9, the numerical aperture of the light-receiving lens 41 was set at 0.55 and the numerical aperture of the condenser lens 31 was set at 0.25; an optical intensity distribution measuring device 700 was provided of which the overview is shown in FIG. 13, instead of the hole-provided mirror 61; all of the signal light beams having passed through the thermal lens forming device 1 were received by the light-receiving lens 41 and were channeled to enter the light-receiving unit 701 (having an effective diameter of 20 mm) of the optical intensity distribution measuring device 700 as parallel light beams; and the optical intensity distribution of the beam cross-sectional plane of the signal light beams was measured. The measured results are shown in FIG. 18, FIG. 19, and FIG. 20. Here, as shown in FIG. 13, the optical intensity distribution measuring device is a device that is provided with a first slit 702 having a width of 1 mm to the light-receiving unit 701 (having an effective diameter of 20 mm), moves a second slit 703 having a width of 25 μm at a constant velocity in a direction of the length of the first slit, i.e., a direction from a point 710 to a point 720 and measures the intensity of a light beam having passed through a rectangular window of a size of 1 mm×25 μm formed by the two (2) slits, corresponding to the moved position of the window. In order to measure the optical intensity corresponding to the moved position of the window, for example, output of a detector receiving the light beam having passed through the window may be recorded on a storage oscilloscope synchronized with the moving velocity of the second slit 703. FIG. 18 to FIG. 20 show the optical intensity distribution on a light beam cross-sectional planes of the signal light recorded on a storage oscilloscope as described above. In these figures, the abscissa (the position in the light beam cross-sectional plane) corresponds to a position represented by coordinates relative to the center of the light-receiving unit 701 defined as zero (0) and to the direction from the center to the point 710 that is the negative direction and to the point 720 that is the positive direction, while the ordinate represents optical intensity.

FIG. 18 corresponds to the case of FIG. 9(*a*) and shows an optical intensity distribution on the beam cross-sectional plane of the signal light beams in a case where the control light beams do not enter the thermal lens forming device 1, but only the signal light beams enter the device 1. The optical intensity distribution shown here is a distribution in which the intensity at the center is relatively strong, and becomes weaker as closer to the circumference, thereby approximating a Gaussian distribution. Therefore, when the hole-provided mirror 61 having a hole 161 of sufficient size is installed as shown in FIG. 9(*a*), all of the signal light beams 111 can pass through the hole 161 of the hole-provided mirror. Here, representing the beam diameter of the signal light beams entering the condenser lens 31 (having the focal distance of $f_1$) as parallel light beams as $d_1$ and the beam diameter of the signal light beam 111 converted into a parallel beam by the light-receiving lens 41 (having the focal distance of $f_2$) as $d_2$:

$$f_1 : f_2 = d_1 : d_2 \quad [8]$$

and, therefore, $d_2$ can be obtained by the following equation.

$$d_2 = (f_2/f_1) \times d_1 \quad [9]$$

In this Example 1, the hole-provided mirror 61 is installed at an angle of 45 degrees against the optical axis of the signal light beams. The cross section of the signal light beams passing through the hole 161 is circular. Therefore, the shape of the hole 161 needs to be an ellipse having the minor axis $D_1$ and the major axis $D_2$, and $D_1$ and $D_2$ are related as defined in the following Equation [10].

$$D_2 = D_1 \times \sqrt{2} \quad [10]$$

Here, the minor axis $D_1$ of the elliptic hole 161 of the hole-provided mirror 61 may be made larger than the beam diameter $d_2$ of the signal light beams 111 obtained from Equation [9]. However, when $D_1$ is too large, a portion of the signal light beams expanded in a ring-like shape due to the irradiation of the control light beam will passes through the hole 161. That is, the optimal value of $D_1$ is a value 1.01 to 1.2 times and, more preferably, 1.02 to 1.1 times $d_2$.

In this Example 1, the focal distance $f_1$ of the condenser lens 31 and the focal distance $f_2$ of the light-receiving lens 41 are equal. Therefore, the beam diameter $d_1$ of the signal light beam 110 entering the condenser lens 31 and the beam diameter $d_2$ of the signal light beam 111 that has been adjusted to be a parallel light beam by the condenser lens are equal and are 10 mm as descried above. Therefore, the minor axis $D_1$ of the elliptic hole 161 of the hole-provided mirror 61 in Example 1 is preferably 10.1 mm to 12 mm and, more preferably, 10.2 to 11 mm and, in practice, is determined as 10.5 mm. $D_2$ is determined as 14.8 mm using Equation [7]. As to the size of the mirror, a mirror having a size (50×50 mm) that can reflect a beam having a diameter of 30 mm by 45 degrees is used.

FIG. 19 shows the optical intensity distribution on a beam cross-sectional plane of the signal light beam when a focal point (light-condensed point) is set at the point 5 (on the entering side of the light beam) close to the condenser lens 31 of the thermal lens forming device and the control light beam is irradiated. The optical intensity distribution in this case is one in which the optical intensity is weakest in the central portion and becomes stronger in a ring-like pattern extending out towards the circumference. The optical intensity in the central portion on the cross-sectional plane of the signal light beam is reduced depending on the optical intensity of the control light beam and the relationship between the positions of the thermal lens forming device 1 and the focal point, and approaches zero (0) as the optical intensity of the control light beam is increased. The position at which the optical intensity of the signal light beam becomes maximum is a value (a diameter of approximately 15 mm) that is larger than the original beam diameter.

Utilization of the thermal lens effect corresponding to FIG. 20 will be described in conjunction with Example 2.

Summarizing the above, in an optical configuration of FIG. 8(*a*), corresponding to the presence or absence of the irradiation of the control light beam, the optical intensity distribution on the beam cross-sectional plane of the signal light beam that has passed through the thermal lens forming device is switched between the ring-shape distribution (a case wherein the control light beam is irradiated) of FIG. 19 and the Gaussian distribution (a case wherein the control light beam is not irradiated) of FIG. 18, and each of these distributions are picked up separately by the hole-provided mirror having a shape adapted to the shape of the optical intensity distribution on the beam cross-sectional plane of the signal light beam and, whereby switching of the optical paths of the signal light beam is enabled.

In this Example 1, the hole-provided mirror 61 is installed at an angle of 45 degrees against the optical axis of the signal light beam. The mirror surface of the hole-provided mirror 61 is a dielectric multi-layer film produced on a glass surface by a sputtering method and is adjusted such that the reflectivity thereof becomes maximum at the wavelength of the signal light beam. The hole 161 portion of the hole-provided mirror 61 is produced by forming an elliptic hole through a glass plate inclining at an angle of 45 degrees. Alternatively, rather than forming a hole, no elliptic reflecting film may be attached, but, because the glass surface which reflects light by several percent and may therefore causes attenuation and cross-talk for the signal light beam, it is preferable that a hole be formed. In order to prevent stray light caused by optical dispersion, etc., it is preferable that the inner surface of the hole be processed so as not to cause a reflection. Furthermore, the reflecting film is not limited to a dielectric multi-layer film and any material that reflects the control light beams and the signal light beams, such as gold, silver, etc. may be used.

As shown in FIG. 1, by the switching of the optical paths, the signal light beams (switching signal light beams) 211, 212, and 213 picked up by deflecting the direction by 90 degrees from the original traveling direction of the signal light beams are directed to enter the optical fibers 11, 12, and 13 by condensing the signal light beams by the condenser lenses 71, 72, and 73.

When all of the light sources 21, 22, and 23 of the control light beams are turned off, the signal light beams are not subject to the thermal lens effect and exit as the signal light beams 111, 112, and 113. The exiting signal light beam 113 are directed to enter the optical fiber 101 by the condensing of the signal light beam 113 by the condenser lens 401.

The light beams may be directed to enter optical detectors, etc. instead of the optical fibers 11, 12, 13, and 101; be converted into electric signals; and be picked up.

Here, as long as the transmittance of the control light beam in the thermal lens forming devices 1, 2, and 3 is not zero (0) %, the amount of the control light beam corresponding to the transmittance is transmitted through and exits from the thermal lens forming devices 1, 2, and 3. In order to prevent this amount of the control light beam from entering the thermal lens forming devices, etc. in the latter stages and causing malfunction or cross-talk, it is necessary to make the transmittance of each of the control light beams in the thermal lens forming devices 1, 2, and 3 approach 0% limitlessly. Furthermore, it is preferable to provide the wavelength selecting and transmitting filters 81, 82, and 83 after the thermal lens forming devices 1, 2 and 3 or after the condenser lenses 41, 42, and 43. As these wavelength selecting and transmitting filters, any known filters may be used that completely block light in the wavelength band of each of the control light beams while that can transmit efficiently light in the wavelength band of the signal light beams and that of the control light beams for the optical path switching mechanisms in the latter stages. For example, plastic or glass colored by a pigment, glass provided with a dielectric multi-layer film on the surface thereof, etc. can be used. A thin film comprising such a material for the wavelength selecting and transmitting filter may be formed on the surface of the condenser lenses 41, 42, and 43 by a coating method, a sputtering method, etc. and may be directed to exert the function as the wavelength selecting and transmitting filter.

The optically controlled optical-path-switching-type optical signal transmission apparatus in the present example is an optical path switching mechanisms that respectively comprise the condenser lens, the thermal lens forming device, the light-receiving lens and the hole-provided mirror, and are connected in series in a three (3)-stage configuration. Therefore, when all of the control light beams are turned off, the signal light beams travel straight and enter the optical fiber 101 and, on the contrary, the optical paths are switched and the signal light beam 211 exits to the optical fiber 11 when the control light beam 21 is turned on, the signal light beam 212 exits to the optical fiber 12 when the control light beam 21 is turned off and the control light beam 22 is turned on, and the signal light beam 213 exits to the optical fiber 13 when the control light beams 21 and 22 are turned off and the control light beam 23 is turned on. The examples that follow will be described using an example in which a plurality of control light beams is turned on.

Using the optically controlled optical-path-switching-type optical signal transmission apparatus of Example 1, in order to measure the optical response speed of the optical path switching mechanism in the first stage, a continuous light beam was used as the signal light beam while a square-wave intermittent light beam at a frequency of several Hz to 100 kHz and a duty ratio of 1:1 was irradiated as the control light beam 121, and magnitudes of the intensity amplitudes of the signal light beam for which the optical paths had been switched were compared.

Figure 15:
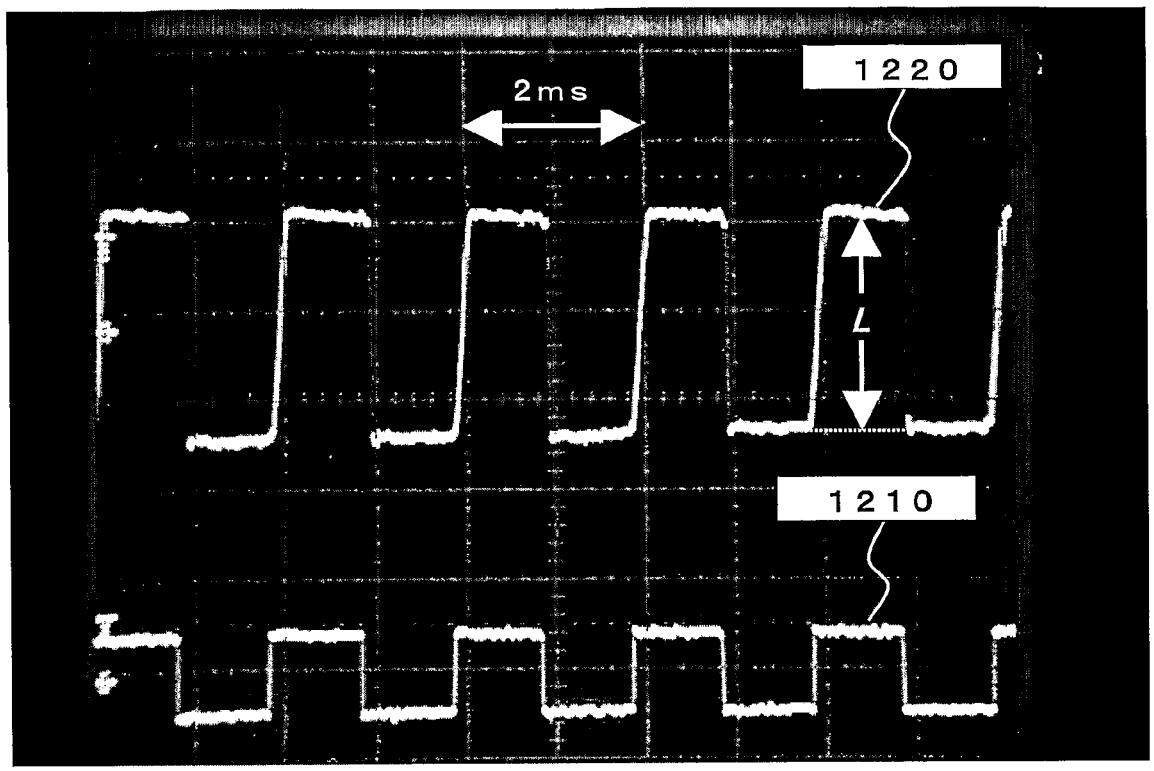
FIG. 15 shows the waveforms of a control light beam and a signal light beam observed on an oscilloscope.
Figure 16:
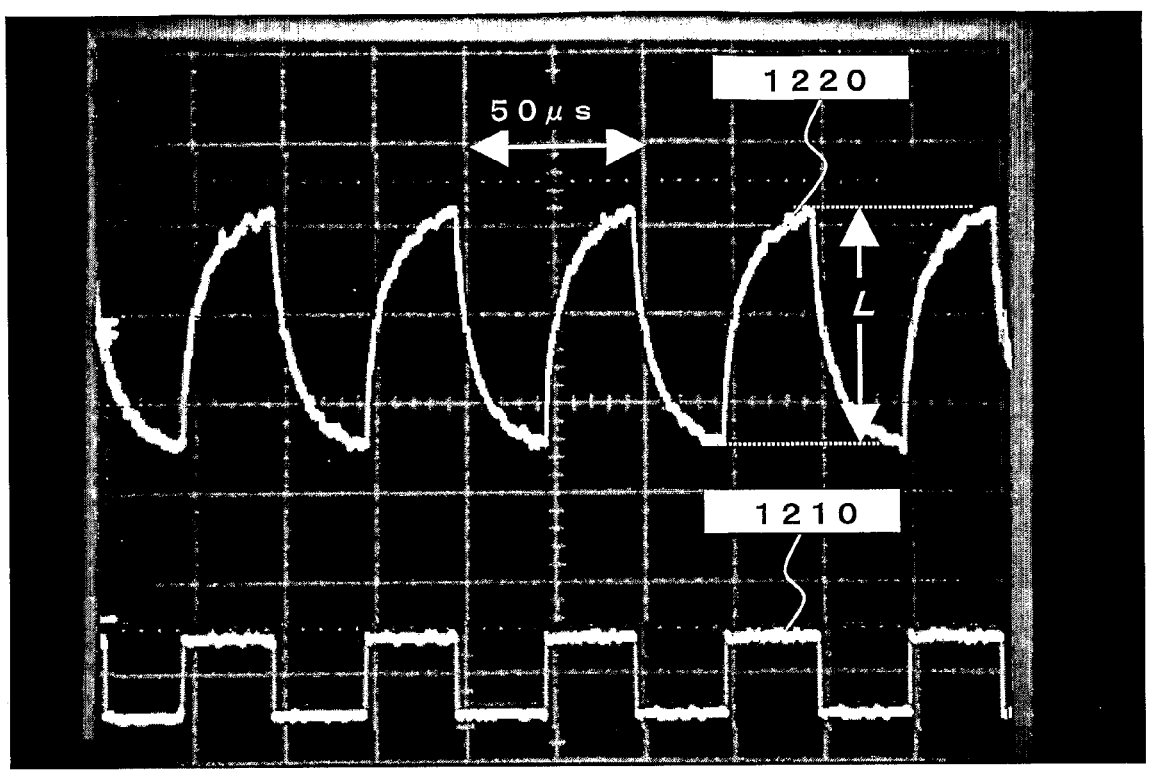
FIG. 16 shows waveforms of a control light beam and a signal light beam observed on an oscilloscope.
Figure 17:
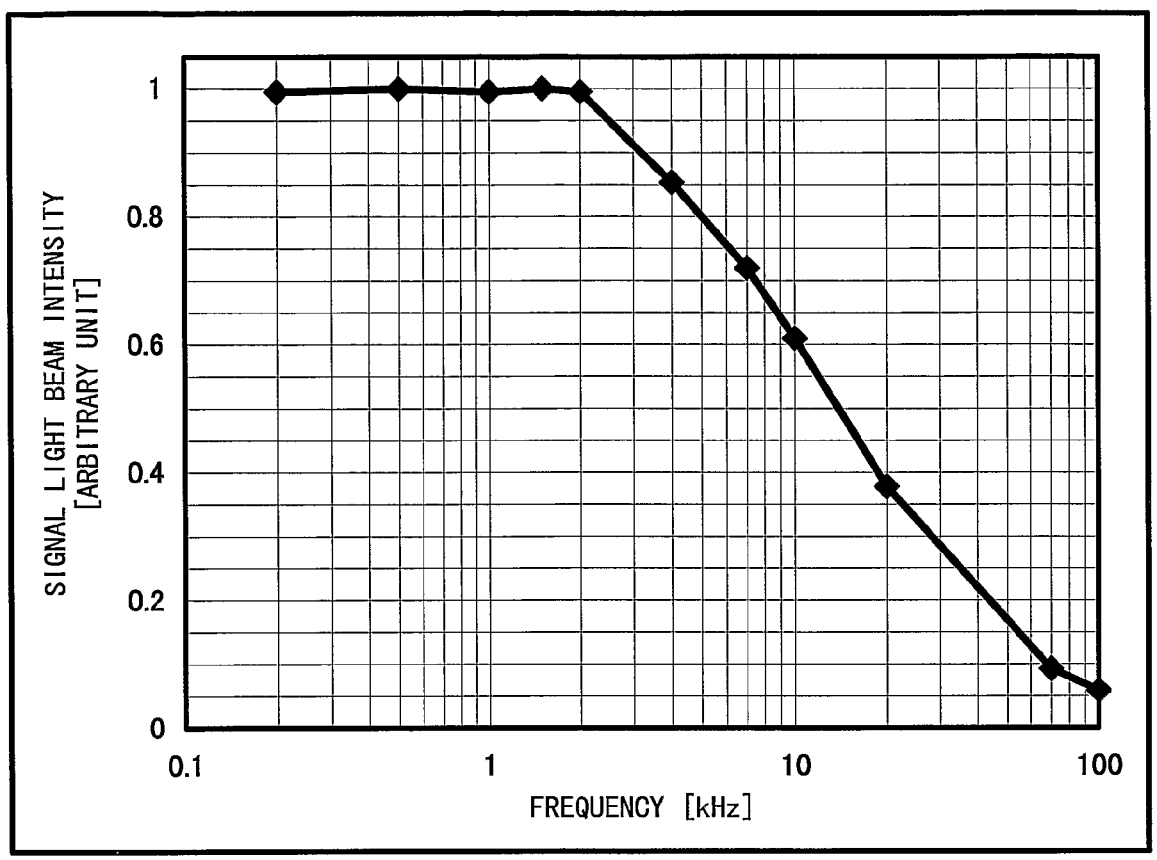
FIG. 17 shows the relationship between a frequency for turning on and off the control light beam and the intensity (amplitude) of the signal light beam for which optical paths have been switched.

A waveform 1210 of the control light beam measured on an oscilloscope by guiding the control light beam 121 from the light source 21 for the control light beam shown in FIG. 1, to an optical detector, and a waveform 1220 of the signal light beam measured on the oscilloscope by guiding the signal light beam 211 for which the optical paths have been switched corresponding to the turning on and off of the control light beam 121 are shown in FIG. 15 and FIG. 16. The scale of the axis of the ordinate of FIG. 16 is three (3) times that of FIG. 16. The frequency of the square wave that turned on and off the control light beam 121 was set at 200 Hz to 100 kHz, and the results of measuring the amplitude L of the waveform 1220 of the signal light beam corresponding to the turning on and off of the signal light beam in that case are shown in FIG. 17.

The frequency of the square wave that turned on and off the control light beam 121 (FIG. 1) was 500 Hz in FIG. 15 and, assuming that the amplitude L of the waveform 1220 of the signal light beam corresponding to the turning on and off of the signal light beam in this case was one (1) as a reference, the amplitude L was approximately one (1) for the frequency range 0.2 to 2 kHz of the square wave that turned on and off the control light beam 121 (FIG. 1). That is, it was confirmed that complete optical path switching was possible in 500 μsec. This is a high-speed response twice or more as fast as the speed of an optical switch (the response speed is in the order of millisecond) using a thermo-photo effect using an electric heater.

As an example for the case where the frequency is further increased, the waveform 1220 of the signal light beam at a frequency of 20 kHz is shown in FIG. 16. As can be seen from FIG. 16, when the control light beam has been turned off before the switching of the optical paths by the thermal lens effect is completed, the waveform of the signal light beam becomes a saw-tooth shape and the amplitude L becomes smaller. That is, when the response speed of the thermal lens effect is exceeded, the switching of the optical paths is incomplete, and the paths of a portion of the signal light beam are not switched and the portion travels straight.

Measurement the same as the optical response speed measurement carried out for the optical path switching mechanism in the first stage described as above was carried out for the second-stage and the third-stage optical path switching mechanisms with each of the signal light beams 122 and 123 being turned on and off, and a response speed equal to that of the first stage was measured.

In order to measure the durability of the optically controlled optical-path-switching-type optical signal transmission apparatus of Example 1, a continuous light beam was used as the signal light beam while square-wave intermittent light beams at a frequency of 1 kHz and a duty ratio of 1:1 were irradiated as the control light beams 121, 122, and 123. The intensity amplitudes overtime of the signal light beam for which the optical paths had been switched were compared. As a result, the intensity amplitude of the signal light beam was not attenuated even after ten thousand hours of continuous operation respectively.

In order to verify the polarized-wave dependence of the optically controlled optical-path-switching-type optical signal transmission apparatus of Example 1, one (1) polarizing device was inserted in the signal light beam and the control light beam and an experiment was conducted in which the polarization angle was varied. However, the polarized-wave dependence was not recognized at all.

In order to check the cross-talk property of and between the exiting straight-traveling light beam and the optical-path-switched light beam of the optically controlled optical-path-switching-type optical signal transmission apparatus of Example 1, the optical intensity of the exiting light beam from the optical fibers 101, 11, 12, and 13 was compared respectively for the cases where all of the control light beams were turned off, where only the light source 21 for the control light beam was turned on, where only the light source 22 for the control light beam was turned on and where only the light source 23 of the control light beam was turned on. It was found that the leaking light (cross-talk) intensity to the exiting light beam intensity of interest was 2000 to 8000:1 (−33 to 39 dB) and was very weak.

Example 2

FIG. 20 shows an example of the optical intensity distribution on a beam cross-sectional plane of the signal light beam, corresponding to the case of the optical configuration as shown in FIG. 8(*b*) and FIG. 10(*b*), and shows an optical intensity distribution on a beam cross-sectional plane of the signal light beam in the case where a focal point (light-condensed point) is set at the point 6 (on the exiting side of the light beam) close to the light-receiving lens 41 of the thermal lens forming device shown in FIG. 7(*b*) and the control light beam is irradiated. In such a case, the optical intensity in the central portion is stronger than the optical intensity in the central portion in the case where the control light beam is not irradiated (FIG. 18). In such a case, the optical intensity in the central portion of the cross-sectional plane of the signal light beam depends on the control light beams and the relation between the positions of the thermal lens forming device 1 and the focal point 6, and reaches optical intensity several times as strong as the optical intensity in the case where the control light beams are not irradiated.

Therefore, when the hole-provided mirror 61 is provided in a configuration such as the present example, the majority of signal light beam passes through the hole 161 of the hole-provided mirror 61. Here, when the size of the hole 161 of the hole-provided mirror 61 (and 62 and 63) is optimized (in the case of Example 2, the diameter is 2 mm), the portion of the signal light beam that is reflected by the hole-provided mirror 61 can be substantially reduced to zero (0). However, even when the size of the hole 161 of the hole-provided mirror 61 is optimized, in the case where the control light beams are not irradiated (FIG. 9(*a*) and FIG. 8), the central portion of the signal light beam as shown in FIG. 10(*a*) is not prevented from passing through the hole 161 as a leaked signal light beam 118. That is, in the optically controlled optical-path-switching-type optical signal transmission apparatus of Example 2, when the optical intensity distribution on the beam cross-sectional plane of the signal light beam is the Gaussian distribution or is close to the Gaussian distribution, the leaked signal light beam 118 (cross-talk) of a certain amount is necessarily generated to the signal light beam 211 of FIG. 10(*a*).

Figure 2B:
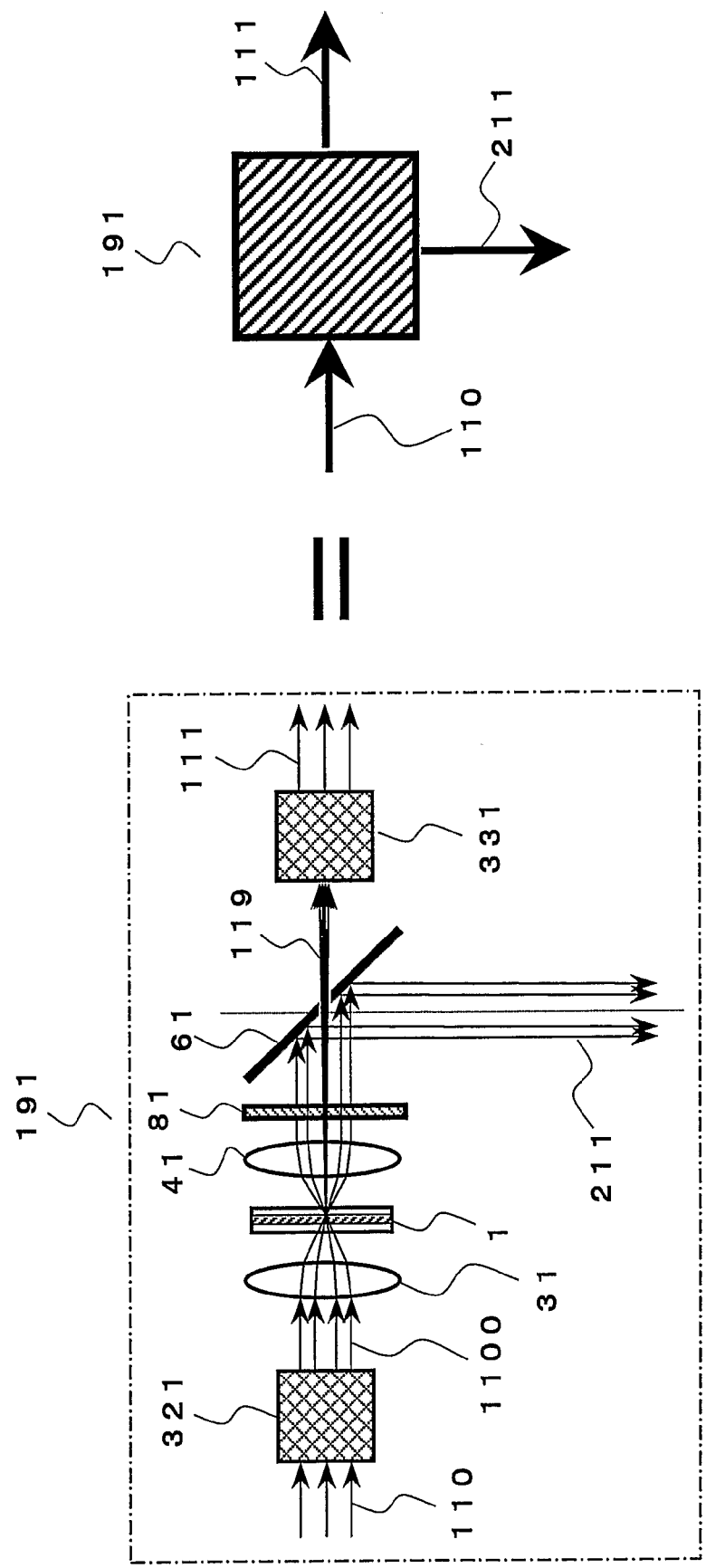
FIG. 2b is a simplified schematic representation of the configuration of an optical path switching mechanism of a space-coupling type.

Therefore, by varying the optical intensity distribution on the beam cross-sectional plane entering the thermal lens forming device, such a leaking signal light beam can be reduced to substantially zero (0). That is, it is easy that, after the signal light beam 110 output from the optical fiber 100 has been shaped using the collimating lens 30, to vary the optical intensity distribution on the cross-sectional plane of the signal light beam to a ring-shaped distribution corresponding to FIG. 19 using a beam-cross-section shaping-into-ring lens group 321 comprising a circular-cone-prism-type lens, etc., as shown in FIG. 1 and FIG. 2*b*. After the signal light beam 110 having such an optical intensity distribution on the cross-sectional plane thereof has been converged using condenser lens 31 such that the signal light beam 110 passes through the focal point position 6 (FIG. 10(*a*)) and the signal light beam 110 has passed through the thermal lens forming device 1, the signal light beam 110 is restored to a parallel light beam by the light receiving lens 41. Then, the optical intensity distribution of the beam cross-sectional plane of the signal light beam 110 has a ring-like shape in which the intensity near the periphery thereof is stronger, while that in the central portion as corresponding to FIG. 19 is substantially zero (0). Therefore, when the hole-provided mirror 61 is installed, leakage of the signal light beam passing through the hole 161 can be substantially eliminated. Even when the optical intensity distribution on the beam cross-sectional plane of the signal light beam assumes such a ring-like shape, the optical intensity distribution on the beam cross-sectional plane of the signal light beam becomes a sharp-beam shape and the signal light beam passes through the hole 161 of the hole-provided mirror 61 as a converged straight-traveling signal light beam 119 when the thermal lens 60 is transiently formed by irradiating the control light beam as shown in FIG. 9(*b*).

In an optical configuration as exemplified in FIG. 10, by adjusting the focal points of the control light beam and the signal light beam to be provided at the position 6 close to the exiting side of the thermal lens forming device, and furthermore ensuring that the optical intensity distribution on the beam cross-sectional plane of the signal light beam has a ring-like shape, the optical path of the signal light beam can be switched by 90 degrees from the original traveling direction thereof when the control light beam is not irradiated, and the signal light beam can be directed to exit. Similarly, the signal light beam can be made to travel straight when the control light beam is irradiated.

The optically controlled optical-path-switching-type optical signal transmission apparatus of Example 2 is an apparatus that replaces the optical path switching mechanisms 91, 92, and 93 of Example 1 (FIG. 1) with an optical path switching mechanism 191 as exemplified in FIG. 2*b*, in which the focal points (light-condensed point) of the signal light beam and the control light beam are set at the position 6 (on the exiting side of the light beams) close to the light-receiving lens 41 of the thermal lens forming device 1, and in which the hole 161 of the hole-provided mirror 61 is smaller than that of Example 1, i.e., the diameter thereof is 2 mm. In such a case, in order to set the focal points (light-condensed point) of the signal light beam and the control light beam at the position 6 (on the exiting side of the light beams) close to the light-receiving lens 41 of the thermal lens forming device 1, it is preferable that the transmittance of the control light beam in the light-absorbing layer film of the thermal lens forming device is 1 to 5%. When the optical intensity distribution on a beam cross-sectional plane of the signal light beam 110 entering the optical path switching mechanism 191 is a Gaussian distribution, or a distribution similar to the Gaussian distribution and not a ring-like shape, it is preferable to shape the optical intensity distribution on a beam cross-sectional plane of the signal light beam into a ring-like shape using the beam-cross-section shaping-into-ring lens group 321 comprising a circular-cone-prism-type lens, etc. Furthermore, in the case where the signal light beams and the control light beams are simultaneously irradiated, because the converged straight-traveling signal light beam 119 exiting the thermal lens 60 formed by the optical absorption of the control light beams has a small beam diameter, the beam waist thereof becomes rather large as described above when the signal light beam 119 is condensed in the latter stages. In order to avoid this, it is preferable to cause the converged straight-traveling signal light beam 119 to exit as the signal light beam 111 by expanding the radius of the signal light beam 119 to 5 mm that is equal to the radius of the entering signal light beam 110 using the beam expander 331.

Figure 4:
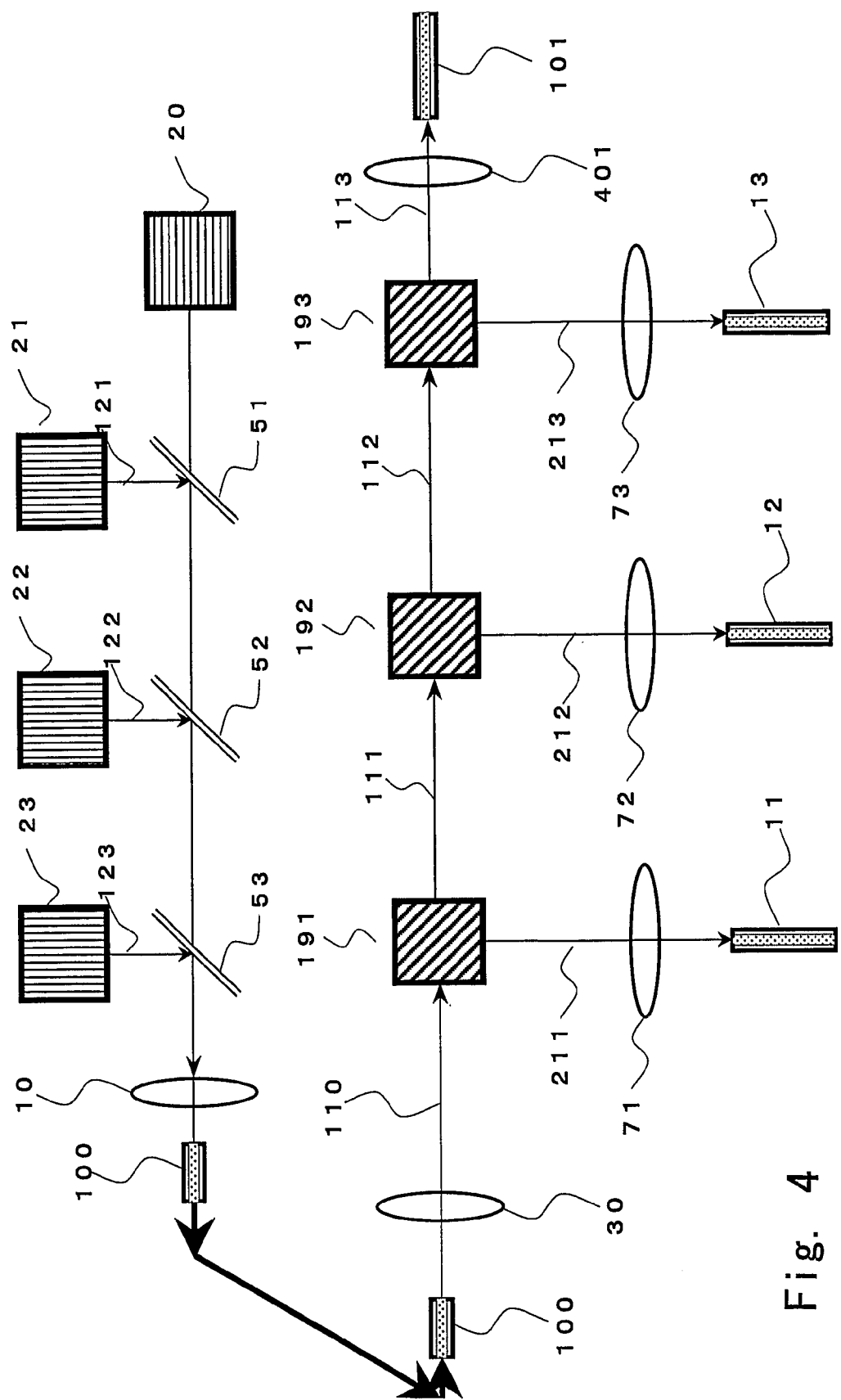
FIG. 4 shows a simplified schematic representation of the configuration of an optically controlled optical-path-switching-type optical signal transmitting apparatus of Example 2.

The relationship between combinations of turning on and off of the control light beams 121, 122, and 123, and the switching of the optical paths of the optically controlled optical-path-switching-type optical signal transmission apparatus of Example 2 will next be described. When at least the control light beam 121 is turned off, the signal light beam 110 is reflected by the reflecting surface of the hole-provided mirror 61, exits as an optical-path-switched signal light beam 211, and is condensed by the condenser lens 71 and enters the optical fiber 11. When the control light beam 121 is turned on, after passing through the hole 161 of the hole-provided mirror 61 as the converged straight-traveling signal light beam 119, the signal light beam 110 is expanded to a light beam having a beam diameter equal to that of the entering signal light beam 110 by the beam expander 331, and enters the optical path switching mechanism 192 (FIG. 4) in the second stage. When the control light beam 121 is turned on and the control light beam 122 is turned off, the signal light beam 111 exits as an optical-path-switched light beam 212 and enters the optical fiber 12. When the control light beams 121 and 122 are simultaneously turned on, the signal light beam travels straight and enters the optical path switching mechanism 193 (FIG. 4) in the third stage as the signal light beam 112, and when the control light beams 121 and 122 are simultaneously turned on and the control light beam 123 is turned off, the signal light beam enters the optical fiber 13 as the optical-path-switched light beam 213. When the control light beams 121, 122, and 123 are all turned on, the signal light beam 110 finally exits as the straight-traveling signal light beam 113, is condensed by the condenser lens 401 and enter the optical fiber 101.

In order to measure the optical response speed of the optically controlled optical-path-switching-type optical signal transmission apparatus of Example 2, a continuous light beam was used as the signal light beam while a square-wave intermittent light beam at a frequency of several Hz to 100 kHz and a duty ratio of 1:1 was irradiated as the control light beam 121, and magnitudes of the intensity amplitudes of the signal light beam for which the optical paths had been switched were compared. As a result, the intensity amplitude was not varied up to 2 kHz relative to the intensity amplitude of the signal light beam at 1 Hz and, when the frequency was further increased, the intensity amplitude was gradually attenuated and, at 10 kHz, was attenuated to one half of the original magnitude thereof. That is, it was confirmed that complete optical path switching was possible in 500 μsec. This is a high-speed response twice or more the speed of an optical switch using a thermo-photo effect using an electric heater. When the control light beams 122 and 123 were turned on and off similarly, a response speed similar to that of the case where the control light beam 121 was turned on and off was also observed.

In order to measure the durability of the optically controlled optical-path-switching-type optical signal transmission apparatus of Example 2, a continuous light beam was used as the signal light beam while square-wave intermittent light beams at a frequency of 1 kHz and a duty ratio of 1:1 were irradiated respectively as the control light beams 121, 122 and 123, and the intensity amplitudes over time of the signal light beam for which the optical paths had been switched were compared. As a result, the intensity amplitude of the signal light beam was not attenuated, even after ten thousand hours of continuous operation.

In order to check the cross-talk property of and between the exiting straight-traveling light beam and the optical-path-switched light beam of the optically controlled optical-path-switching-type optical signal transmission apparatus of Example 2, the optical intensity of the exiting light beam from the optical fibers 101, 11, 12, and 13 was compared respectively for the cases where all of the control light beams were turned off, where only the light beam 121 was turned on, where only the light beams 121 and 122 were turned on and where the control light beams 121, 122, and 123 were all turned on. Then, the leaking light (cross-talk) intensity to the exiting light beam intensity of interest was 1000 to 2000:1 (−30 to 33 dB) and was very weak.

Example 3

The installation angle (45 degrees against the optical axis of the signal light beam 110) of the hole-provided mirror 61 in Example 1 is changed and, by determining the shape (the length of the major axis against that of the minor axis) of the elliptic hole 161 from calculation using trigonometric functions based on the installation angle, the angle of the optical path switching against the optical axis of the signal light beam 110 can be changed freely within a range from approximately 5 to 175 degrees. Installation angles of the hole-provided mirrors 62 and 63 in the second stage and the latter stages can similarly be changed.

Furthermore, by rotating the installation position of the hole-provided mirror 61 using the optical axis of the signal light beam 110 as a rotation axis and moving the position of the condenser lens 71, etc. the direction of the switching of the optical paths relative to the optical axis of the signal light beam 110 can be freely changed within a range from 0 to 360 degrees. Installation positions of the hole-provided mirrors 62 and 63 in the second stage and the latter stages can also be changed similarly.

Example 4

Figure 5:
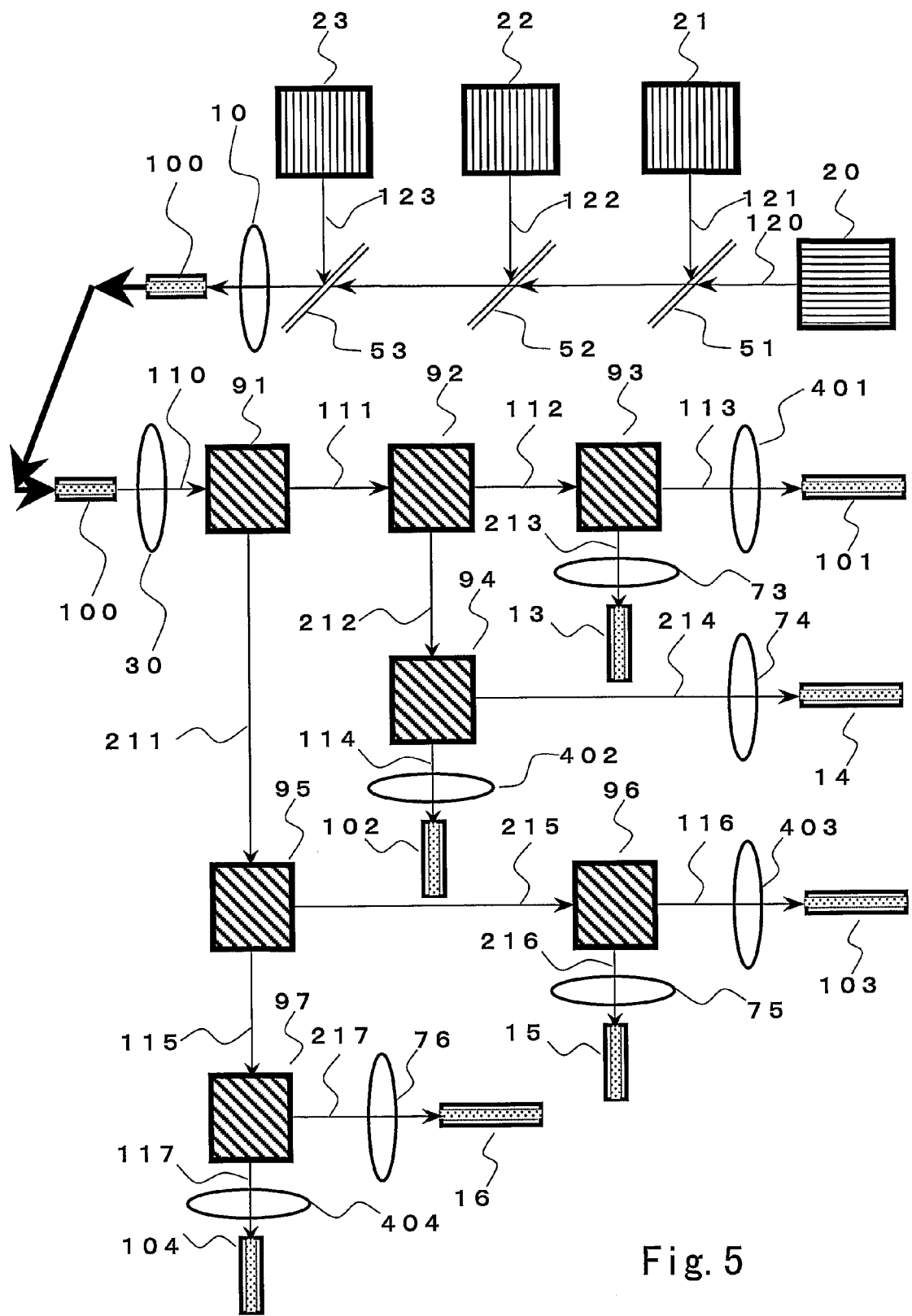
FIG. 5 shows a simplified schematic representation of the configuration of an optically controlled optical-path-switching-type optical signal transmitting apparatus of Example 4.

FIG. 5 shows a schematic view of the configuration of an optically controlled optical-path-switching-type optical signal transmitting apparatus of Example 4. In FIG. 5, the light source 20 for a signal light beam, the light sources 21, 22 and 23 for control light beams, the dichroic mirrors 51, 52 and 53, the condenser lens 10, the optical fiber 100 and the collimating lens 30 are same as those of the case for Example 1.

The optically controlled optical-path-switching-type optical signal transmitting apparatus of FIG. 5 is an apparatus that switches the optical paths of the signal light beam 120 among the eight (8) directions of the optical fibers 101, 102, 103, 104, 13, 14, 15, and 16 as the destination, using a total of seven (7) optical path switching mechanisms formed by adding and connecting in the spatial connecting scheme, one (1) optical path switching mechanism to/with the optical path switching mechanism 92 in the second stage of the Example 1 and three (3) optical path switching mechanisms to/with the latter stage of the optical path switching mechanism 91 in the first stage, with the combinations of simultaneous turning on and off of all of the three (3) types of the control light beams. That is, in terms of the principle, in general, assuming n to be an integer of two (2) or larger, switching of optical paths in $2^n$ directions is enabled by connecting $2^n-1$ optical path switching mechanisms with combinations of states of turning on and off of n types of control light beams. In practice, the number of practical combination stages is determined by the combinations of transmittances of the signal light beam per one (1) stage of the optical path switching mechanism. When the transmittance of the "straight-traveling signal light beam" of which the optical path cannot be switched by the optical path switching mechanism is 85% (attenuation of 0.7 dB as the signal intensity) and the attenuation factor of the "switched signal light beam" of which the optical path has been switched is 80% (attenuation of 1.0 dB as the signal intensity), the total transmittance in the case where the signal light beam travels straight throughout the optical path thereof is 61.4% (attenuation of 2.1 dB ditto), the total transmittance in the case where the optical path has been switched in all of the three (3) stages is 51.2% (attenuation of 2.9 dB ditto). The combinations of the simultaneous turning on and off of the three (3) types of control light beams 121, 122 and 123 and the destinations of the exiting signal light beams are summarized and shown in Table 2.

TABLE 2

|  | Control Light Beam | | | Destination of Exiting Light Beam |
| --- | --- | --- | --- | --- |
|  | 121 | 122 | 123 |  |
| Combination of ON and OFF of the Control Light Beams | off | off | Off | 101 |
|  | off | off | On | 13 |
|  | off | on | Off | 14 |
|  | off | on | On | 102 |
|  | on | on | Off | 104 |
|  | on | on | On | 16 |
|  | on | off | Off | 15 |
|  | on | off | On | 103 |

As the thermal lens forming device of the optical path switching mechanism 91 in the first stage, similarly to the case of Example 1, a pigment-solution-filling-type thermal lens forming device filled with a solution of the pigment [1] that absorbs the signal light beam 121 having a wavelength of 532 nm was used. The wavelength transmittance property was also set to be same as that in the case of Example 1.

As the thermal lens forming devices of the optical path switching mechanisms 92 (that spatially couples with the straight-traveling light beam 111 from the optical path switching mechanism 91) and 95 (that spatially couples with the switched light beam 211 from the optical path switching mechanism 91) in the second stage, in either case, similarly to the case of Example 1, a pigment-solution-filling-type thermal lens forming device filled with a solution of the pigment [2] that absorbs the signal light beam 122 having a wavelength of 670 nm was used. The wavelength transmittance property thereof will be described later.

As the thermal lens forming devices of the optical path switching mechanisms 93 (that spatially couples with the straight-traveling light beam 112 from the optical path switching mechanism 92), 94 (that spatially couples with the switched light beam 212 from the optical path switching mechanism 92), 96 (that spatially couples with the switched light beam 215 from the optical path switching mechanism 95), and 97 (that spatially couples with the straight-traveling light beam 115 from the optical path switching mechanism 95) in the third stage, in any of those cases, similarly to the case of Example 1, a pigment-solution-filling-type thermal lens forming device filled with a solution of the pigment [3] that absorbs the signal light beam 123 having a wavelength of 800 nm was used. The wavelength transmittance property thereof will be described later.

Figure 7A:
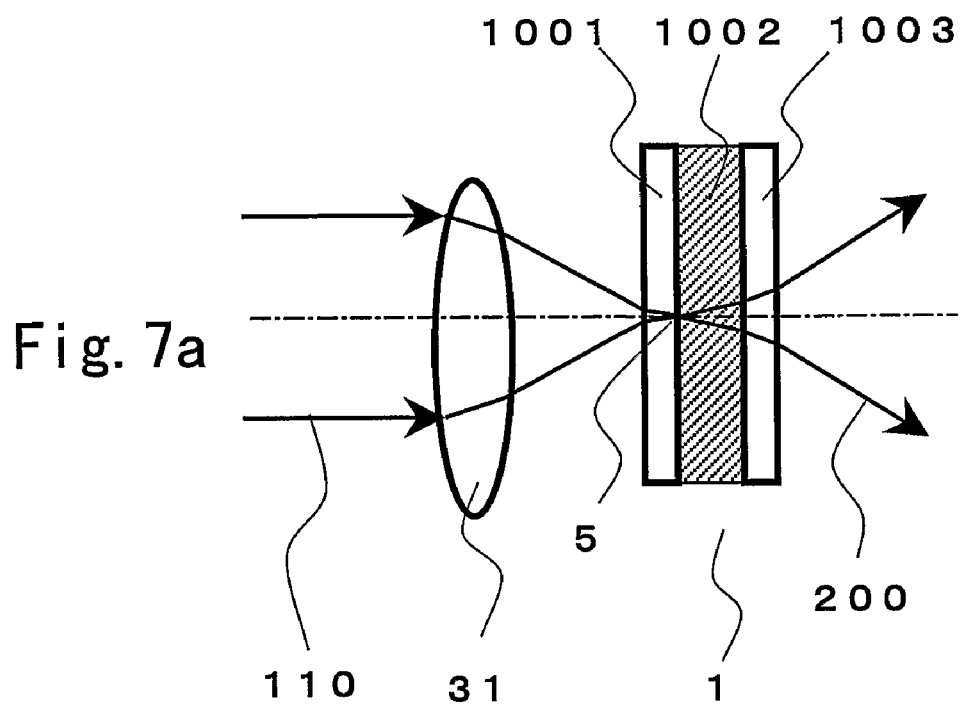
FIG. 7(a) shows an example path of a light beam in an example where no thermal-lens is formed.

Here, in the optical path switching mechanisms 92, 93, and 97 in the latter stages that couple with the straight-traveling light beam from the optical path switching mechanism in the previous stage, similarly to the case of the optical path switching mechanisms in Example 1, the signal light beams and the control light beams were adjusted such that these beams focus at a position corresponding to the position 5 of FIG. 7(a) and FIG. 9, i.e., a position near to the entering surface of the light-absorbing layer films of the thermal lens devices and, furthermore, the sizes of the hole 161, etc. of the hole-provided mirror 61, etc. were set to be equal to those in the case of Example 1. As a result, the traveling-straight light beam from the optical path switching mechanism in the previous stage can be efficiently directed to travel straight or switched by the optical path switching mechanisms in the latter stages. In the optical path switching mechanisms 92, 93, and 97, the transmittance of each of the control light beams were adjusted to be 0.0 to 0.2% and the transmittance of the signal light beam having a wavelength of 850 nm was adjusted to be 85 to 99%.

Figure 7B:
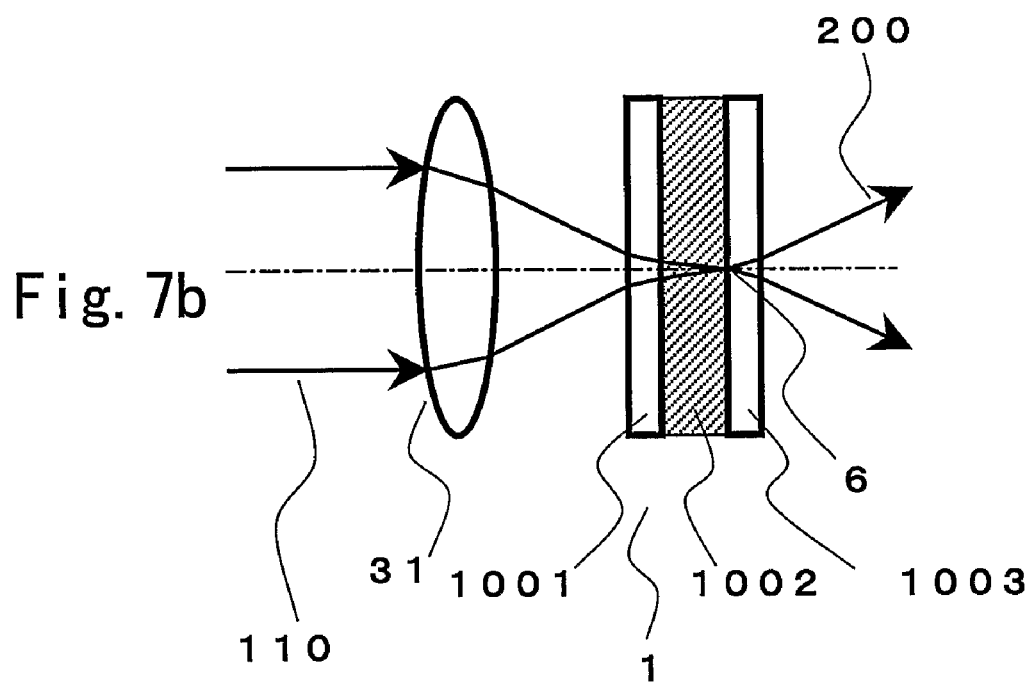
FIG. 7(b) shows another example path of a light beam in an example where no thermal-lens is formed.

On the other hand, in the optical path switching mechanisms 94, 95, and 96 that couple with the optical-path-switched light beam (the light beam having the ring-shaped cross section) from the optical path switching mechanism in the previous stage, similarly to the case of the optical path switching mechanism 191 in Example 2, the signal light beams and the control light beams were adjusted such that these beams focus at a position corresponding to the position 6 of FIG. 7(b) and FIG. 10, i.e., a position close to the exiting surface of the light-absorbing layer films of the thermal lens devices and, furthermore, the sizes of the hole 161, etc. of the hole-provided mirror 61, etc. were set to be equal to those in the case of Example 2. However, the beam-cross-section shaping-into-ring lens group 321 (FIG. 2b) in the optical path switching mechanism 191 was not provided because the optical-path-switched ring-shaped signal light beams 212, 211, and 215 were spatially coupled respectively and entered the optical path switching mechanisms 94, 95, and 96 from the optical path switching mechanism in the previous stage, maintaining the ring-like shapes. On the other hand, the beam expander 331 (FIG. 2b) for expanding the beam diameter of the converged straight-traveling signal light beam 119 was provided respectively to the optical path switching mechanisms 94, 95, and 96.

As a result, the optical-path-switched light beam having a ring-shaped cross section from the optical path switching mechanism in the previous stage can be efficiently directed to travel straight or switched by the optical path switching mechanisms in the latter stages. In the optical path switching mechanisms 94, 95 and 96, the transmittance of each of the control light beams were adjusted to be 1.0 to 5.0% and the transmittance of the signal light beam having a wavelength of 850 nm was adjusted to be 85 to 99%.

The straight-traveling light beams 113, 114, 116 and 117 output from the optical path switching mechanism in the third stage (the final stage) are respectively condensed by condenser lenses 401, 402, 403 and 404 and enter respectively to the exiting signal light beam optical fibers 101, 102, 103 and 104. The optical-path-switched light beams 213, 214, 216 and 217 also exiting are respectively condensed by condenser lenses 73, 74, 75 and 76 and enter respectively exiting signal light beam optical fibers 13, 14, 15 and 16. The specifications of these optical fibers are same as that in the case of Example 1.

For the optically controlled optical-path-switching-type optical signal transmission apparatus of Example 4, the optical response speeds of the optical path switching mechanisms in the first to third stages were measured in a manner same as that in the case of Example 1 and the same result was obtained.

The durability of the optically controlled optical-path-switching-type optical signal transmission apparatus of Example 4 was measured in a manner same as that in the case of Example 1 and, for any of these optical path switching mechanisms, the intensity amplitude of the signal light beam was not attenuated even after ten thousand hours of continuous operation respectively and high durability was verified.

In order to verify the polarized-wave dependence of the optically controlled optical-path-switching-type optical signal transmission apparatus of Example 4, one (1) polarizing device was inserted into each of the signal light beam and the control light beam and an experiment was conducted in which the polarization angle was varied. In the measured results, no polarized-wave dependence whatsoever was found.

In order to verify the cross-talk property of the eight (8) exiting signal light beams of the optically controlled optical-path-switching-type optical signal transmission apparatus of Example 4, the optical intensity of the exiting light beams from the optical fibers 13, 14, 15, 16, 101, 102, 103, and 104 was compared respectively for the cases of the eight (8) combinations of the turning on and off of the control light beams shown in Table 2. Then, the leaking light (cross-talk) intensity to the exiting light beam intensity of interest was a very weak 1000 to 8000:1 (−30 to 39 dB).

Example 5

Figure 6:
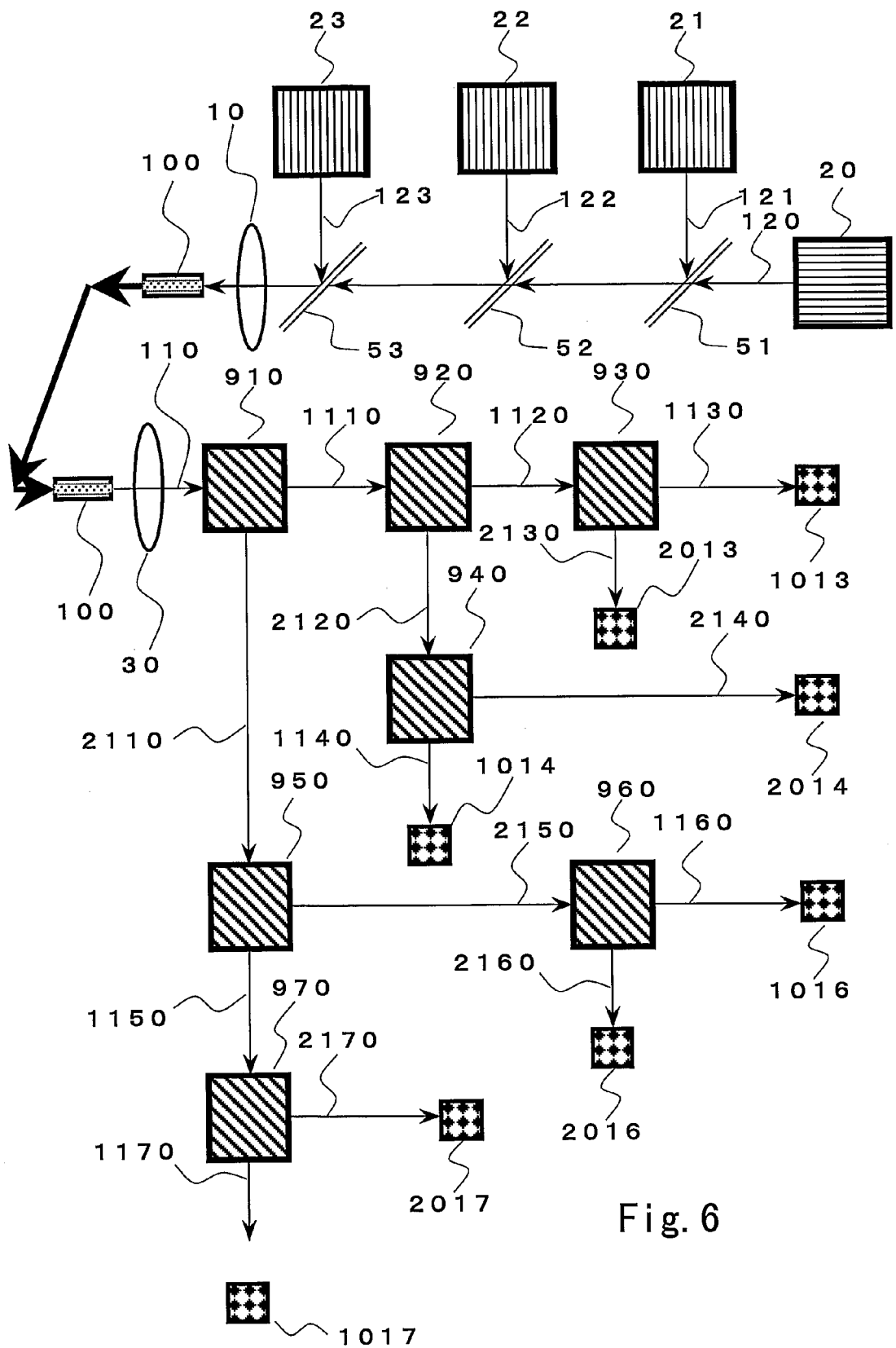
FIG. 6 shows a simplified schematic representation of the configuration of an optically controlled optical-path-switching-type optical signal transmitting apparatus of Example 5.

FIG. 6 shows a schematic view of the configuration of an optically controlled optical-path-switching-type optical signal transmitting apparatus of Example 5. Example 5 is an apparatus that has replaced the spatially-coupling-type optical path switching mechanisms 91, 92, 93, 94, 95, 96, and 97 (corresponding to those in FIG. 2a or FIG. 2b) in the optically controlled optical-path-switching-type optical signal transmitting apparatus of Example 4 with optical-fiber-coupling-type optical path switching mechanisms 910, 920, 930, 940, 950, 960, and 970 (all corresponding to those in FIG. 3). In all of the optical-fiber-coupling-type optical path switching mechanisms, similarly to the case of the optical path switching mechanisms in Example 1, the signal light beams and the control light beams were adjusted such that these beams focus at a position corresponding to the position 5 of FIG. 7(a) and FIG. 9, i.e., a position close to the entering surface of the light-absorbing layer films of the thermal lens devices and, furthermore, the sizes of the hole 161, etc. of the hole-provided mirror 61, etc. were set to be equal to those in the case of Example 1. Moreover, in all of the optical-fiber-coupling-type optical path switching mechanisms, the configuration, the material and the transmittance of the thermal lens forming devices were set to be same as those in the case of Example 1. The length of optical fibers connecting each of the optical-fiber-coupling-type optical path switching mechanisms was set to be 10 to 100 m, corresponding to ordinary use in installations such as homes, hospitals, offices, etc.

In order to compensate for the loss of the control light beams caused by the optical-fiber coupling, in the optical path switching mechanisms in all of the stages, the power of the control light beams that enters the thermal lens forming devices was adjusted to be 2 to 5 mW by increasing the output power of the light sources 21, 22, and 23 for the control light beams. Furthermore, the output power of the light sources for the signal light beams was also adjusted such that each of the eight (8) exiting signal light beams respectively has sufficient power.

The straight-traveling exiting signal light beams of the optical path switching mechanisms 930, 940, 960, and 970 in the third stage were directed to enter respective light-receiving devices 1013, 1014, 1016, and 1017 through optical fibers and collimating lenses, and the optical-path-switched signal light beams were directed to enter respective light receiving devices 2013, 2014, 2016, and 2017 through optical fibers and collimating lenses.

The correspondence relations between the combinations of the simultaneous turning on and off of the three (3) types of control light beams 121, 122, and 123 and the exit destination light-receiving devices for the signal light beams in Example 5 are collectively shown in Table 3.

TABLE 3

| | Control Light Beam | | | Destination of Exiting |
|---|---|---|---|---|
| | 121 | 122 | 123 | Light Beam |
| Combination | off | off | Off | 1013 |
| of ON and OFF | off | off | On | 2013 |
| of the | off | on | Off | 1014 |
| Control | off | on | On | 2014 |
| Light Beams | on | on | Off | 1016 |
| | on | on | On | 2016 |
| | on | off | Off | 1017 |
| | on | off | On | 2017 |

The optical response speed, the durability, the polarized-electromagnetic-wave dependence, and the cross-talk of the optically controlled optical-path-switching-type optical signal transmission apparatus of Example 5 were measured similarly as in the case of Example 4 and results equal or superior to those of Example 4 were obtained.

According to the present invention, an optically controlled optical-path-switching-type optical signal transmission apparatus and an optical signal optical path switching method can be provided that operates at a high speed and have high durability and exhibits no polarized-electromagnetic-wave dependence, without any electric circuits or any mechanically movable components.

INDUSTRIAL APPLICABILITY

The optically controlled optical-path-switching-type optical signal transmission apparatus and the optical signal optical path switching method can be advantageously used in, for example, a system for distributing at a high speed a large volume of digital information such as high definition image data, high definition moving image data, etc. from a server to a specific client in a plurality of clients in a corporate office, a factory, a hospital, an ordinary home, or the like.

The invention claimed is:

1. An optically controlled optical-path-switching-type optical signal transmission apparatus comprising:
a signal light beam light source for irradiating a signal light beam having one (1) or more wavelengths;
a control light beam light source for irradiating a control light beam having two (2) or more wavelengths that are different from those of the signal light beam;
two (2) or more light-absorbing layer films for transmitting the signal light beam and selectively absorbing respectively only one (1) specific wavelength of the control light beam;
means for respectively converging and irradiating the control light beam and the signal light beam to each of the light-absorbing layer films;
two (2) or more thermal lens forming devices for causing the converged signal light beam to exit while maintaining beam convergence, or for varying the angle of divergence of the signal light beam and for causing the signal beam to exit, in response to the presence or absence of irradiation of the one (1) specific wavelength of the control light beam, by using a thermal lens containing the light-absorbing layer films and based on a distribution of refractive index produced reversibly caused by temperature increase generated in an area of the light-absorbing layer film that has absorbed the one (1) specific wavelength of the control light beam and in the periphery thereof; and
a plurality of mirrors, one provided after each of the thermal lens forming devices and having a hole and reflecting means, for passing the signal light beam having exited the thermal lens forming devices through the hole or deflecting the optical path of the signal light beam by reflecting the signal light beam by the reflecting means in response to the presence or absence of irradiation of the one (1) specific wavelength of the control light beam.

2. An optically controlled optical-path-switching-type optical signal transmission apparatus according to claim 1, wherein the light-absorbing layer film contains two (2) or more pigments selected from a group consisting of:

N,N'-bis(2,5-di-tert-butylphenyl)-3,4,9,10-perylenedicarboxyimide) [1],

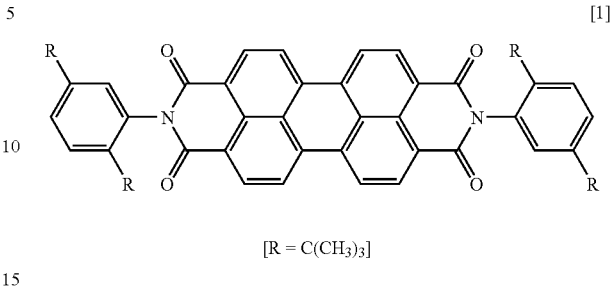

Copper(11)2,9,16,23-tetra-tert-butyl-29H,31H-phthalocyanine [2],

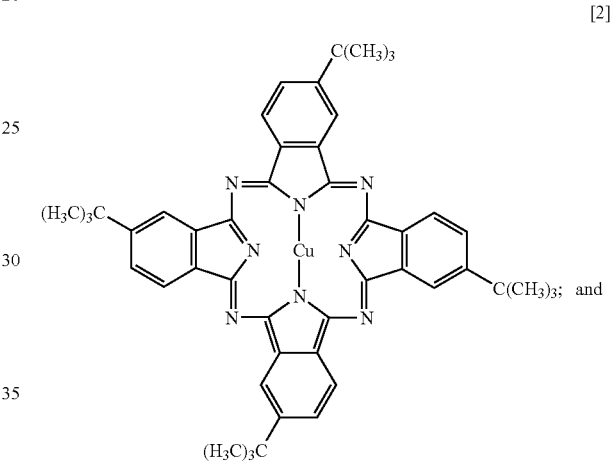

Vanadyl 2,11,20,29-tetra-tert-butyl-2,3-naphthalocyanine [3],

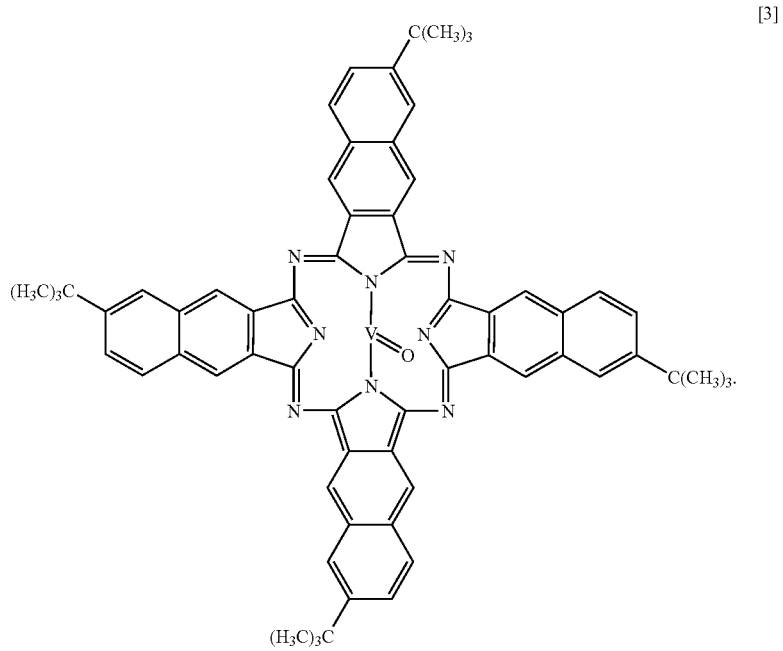

3. An optically controlled optical-path-switching-type optical signal transmission apparatus comprising:
- a signal light beam light source for irradiating a signal light beam having one (1) or more wavelengths;
- a control light beam light source for irradiating a control light beam having two (2) or more wavelengths that are different from those of the signal light beam;
- two (2) or more light-absorbing layer films for transmitting the signal light beam and selectively absorbing respectively only one (1) specific wavelength of the control light beam;
- means for respectively converging and irradiating the control light beam and the signal light beam to each of the light-absorbing layer films; and
- two (2) or more sets of optical path switching mechanism each comprising a combination of a thermal lens forming device and a mirror having a hole, wherein
- the thermal lens forming device includes the light-absorbing layer films and, by using a thermal lens based on a distribution of refractive index produced reversibly caused by temperature increase generated in an area of the light-absorbing layer film that has absorbed the one (1) specific wavelength of the control light beam and in the periphery thereof, causes the converged signal light beam to exit with an ordinary divergence angle when the one (1) specific wavelength of the control light beam has not been irradiated and no thermal lens has been formed, and causes the converged signal light beam to exit with a divergence angle larger than the ordinary divergence angle when the one (1) specific wavelength of the control light beam has been irradiated and a thermal lens has been formed, the thermal lens forming device thus changing the divergence angle of the signal light beam directed to exit in response to the presence or absence of irradiation of the one (1) specific wavelength of the control light beam, and wherein
- the hole in the mirror having is provided for passing either the signal light beam output from the thermal lens forming device with the ordinary divergence angle as is, or the signal light beam with the divergence angle varied by a light-receiving lens when the one (1) specific wavelength of the control light beam has not been irradiated and no thermal lens has been formed, and reflecting means for reflecting either the signal light beam output diverging from the thermal lens forming device with the divergence angle larger than the ordinary divergence angle as is, or the signal light beam with the divergence angle varied by the light-receiving lens when the one (1) specific wavelength of the control light beam has been irradiated and a thermal lens has been formed in the vicinity of an incidence surface of the light-absorbing layer film, the mirror changing the optical paths.

4. An optically controlled optical-path-switching-type optical signal transmission apparatus according to claim 3, wherein the two (2) or more sets of optical path switching mechanism are connected in series directly through a space or through an optical-fiber-connection system.

5. An optically controlled optical-path-switching-type optical signal transmission apparatus according to claim 3, wherein the three (3) or more sets of optical path switching mechanism are connected in a multi-stage configuration directly through a space or through an optical-fiber-connection system, branching in each one (1) stage of the connection in two (2) directions of a direction for a light beam to travel straight through the hole of the mirror and a direction for a light beam to be reflected.

6. An optically controlled optical-path-switching-type optical signal transmission apparatus according to claim 3, wherein, among light beams having a plurality of wavelengths, a light beam having the longest wavelength is set as the signal light beam and two (2) or more light beams having a wavelength shorter than that of the signal light beam are set as the control light beam, the optical path switching mechanism for which the wavelength that the thermal lens forming device therein absorbs is the shortest is set as a first stage, and the optical path switching mechanisms in the latter stages are connected in increasing order of the wavelength absorbed by each of the thermal lens forming devices.

7. An optically controlled optical-path-switching-type optical signal transmission apparatus comprising:
- a signal light beam light source for irradiating a signal light beam having one (1) or more wavelength(s);
- a control light beam light source for irradiating a control light beam having two (2) or more wavelengths that are different from those of the signal light beam;
- two (2) or more light-absorbing layer films for transmitting the signal light beam and selectively absorbing respectively only one (1) specific wavelength of the control light beam;
- means for respectively converging and irradiating the control light beam and the signal light beam to each of the light-absorbing layer films; and
- two (2) or more sets of optical path switching mechanism each comprising a combination of a thermal lens forming device and a mirror having a hole, wherein
- the thermal lens forming device includes the light-absorbing layer films and, by using a thermal lens based on a distribution of refractive index produced reversibly caused by temperature increase generated in an area of the light-absorbing layer film that has absorbed the one (1) specific wavelength of the control light beam and in the periphery thereof, causes the converged signal light beam to exit as converged when the one (1) specific wavelength of the control light beam has been irradiated and a thermal lens has been formed, and causes the converged signal light beam to exit with an ordinary divergence angle when the control light beam has not been irradiated and no thermal lens has been formed, the thermal lens forming device thus changing the divergence angle of the signal light beam directed to exit in response to the presence or absence of irradiation of the one (1) specific wavelength of the control light beam, and wherein
- the hole in the mirror having a hole is provided for passing the converged signal light beam output from the thermal lens forming device as converged when the one (1) specific wavelength of the control light beam has been irradiated and a thermal lens has been formed in the vicinity of an exiting surface of the light-absorbing layer film, and reflecting means for reflecting either the signal light beam output from the thermal lens forming device with the ordinary divergence angle as is, or the signal light beam that has passed through a light-receiving lens provided for changing the divergence angle when the one (1) specific wavelength of thecontrol light beam has not been irradiated and no thermal lens has been formed, the mirror changing the optical paths.

8. An optically controlled optical-path-switching-type optical signal transmission apparatus according to claim 7, wherein the two (2) or more sets of optical path switching mechanism are connected in series directly through a space or through an optical-fiber-connection system.

9. An optically controlled optical-path-switching-type optical signal transmission apparatus according to claim 7, wherein the three (3) or more sets of optical path switching mechanism are connected in a multi-stage configurationdirectly through a space or through an optical-fiber-connection system, branching in each one (1) stage of the connection in two (2) directions of a direction for a light beam to travel straight through the hole of the mirror and a direction for a light beam to be reflected.

10. An optically controlled optical-path-switching-type optical signal transmission apparatus according to claim 7, wherein, among light beams having a plurality of wavelengths, a light beam having the longest wavelength is set as the signal light beam and two (2) or more light beams having a wavelength shorter than that of the signal light beam are set as the control light beam, the optical path switching mechanism for which the wavelength that the thermal lens forming device therein absorbs is the shortest is set as a first stage, and the optical path switching mechanisms in the latter stages are connected in increasing order of the wavelength absorbed by each of the thermal lens forming devices.

11. An optically controlled optical-path-switching-type optical signal transmission apparatus comprising:
a signal light beam light source for irradiating a signal light beam having one (1) or more wavelength(s);
a control light beam light source for irradiating a control light beam having two (2) or more wavelengths that are different from those of the signal light beam;
two (2) or more light-absorbing layer films for transmitting the signal light beam and selectively absorbing respectively only one (1) specific wavelength of the control light beam;
means for respectively converging and irradiating the control light beam and the signal light beam to each of the light-absorbing layer films;
one (1) or more sets of first optical path switching mechanism each comprising a combination of a first thermal lens forming device and a first mirror having a hole; and
one (1) or more sets of second optical path switching mechanism each comprising a combination of a second thermal lens forming device and a second mirror having a hole, wherein
the first thermal lens forming device includes the light-absorbing layer films and, by using a thermal lens based on a distribution of refractive index produced reversibly caused by temperature increase generated in an area of the light-absorbing layer film that has absorbed the one (1) specific wavelength of the control light beam and in the periphery thereof, causes the converged signal light beam to exit with an ordinary divergence angle when the one (1) specific wavelength of the control light beam has not been irradiated and no thermal lens has been formed, and causes the converged signal light beam to exit with a divergence angle larger than the ordinary divergence angle when the one (1) specific wavelength of the control light beam has been irradiated and a thermal lens has been formed in the vicinity of an incidence surface of the light-absorbing layer film, the first thermal lens forming device thus changing the divergence angle of the signal light beam directed to exit in response to the presence or absence of irradiation of the one (1) specific wavelength of the control light beam, wherein
the hole in the first mirror having a hole is provided for passing either the signal light beam output from the thermal lens forming device with the ordinary divergence angle as is, or the signal light beam with the divergence angle varied by a light-receiving lens when the one (1) specific wavelength of the control light beam has not been irradiated and no thermal lens has been formed, and reflecting means for reflecting either the signal light beam output diverging from the thermal lens forming device with the divergence angle larger than the ordinary divergence angle as is, or the signal light beam with the divergence angle varied by the light-receiving lens when the one (1) specific wavelength of the control light beam has been irradiated and a thermal lens has been formed in the vicinity of an incidence surface of the light-absorbing layer film, wherein the second thermal lens forming device contains the light-absorbing layer films and, by using a thermal lens based on a distribution of refractive index produced reversibly caused by temperature increase generated in an area of the light-absorbing layer film that has absorbed the one (1) specific wavelength of the control light beam and in the periphery thereof, causes the converged signal light beam to exit as converged when the one (1) specific wavelength of the control light beam has been irradiated and a thermal lens has been formed in the vicinity of an exiting surface of the light-absorbing layer film, and causes the converged signal light beam to exit with an ordinary divergence angle when the control light beam has not been irradiated and no thermal lens has been formed, the second thermal lens forming device thus changing the divergence angle of the signal light beam directed to exit in response to the presence or absence of irradiation of the one (1) specific wavelength of the control light beam, and wherein the hole in the second mirror having a hole is provided for passing the converged signal light beam output from the thermal lens forming device as converged when the one (1) specific wavelength of the control light beam has been irradiated and a thermal lens has been formed in the vicinity of an exiting surface of the light-absorbing layer film, and reflecting means for reflecting either the signal light beam output from the thermal lens forming device with the ordinary divergence angle as is, or the signal light beam that has passed through the light-receiving lens provided for changing the divergence angle when the one (1) specific wavelength of the control light beam has not been irradiated and no thermal lens has been formed, the second mirror changing the optical paths.

12. An optically controlled optical-path-switching-type optical signal transmission apparatus according to claim 11, wherein the two (2) or more sets of optical path switching mechanism are connected in series directly through a space or through an optical-fiber-connection system.

13. An optically controlled optical-path-switching-type optical signal transmission apparatus according to claim 11, wherein the three (3) or more sets of optical path switchingmechanism are connected in a multi-stage configuration directly through a space or through an optical-fiber-connection system, branching in each one (1) stage of the connection in two (2) directions of a direction for a light beam to travel straight through the hole of the mirror and a direction for a light beam to be reflected.

14. An optically controlled optical-path-switching-type optical signal transmission apparatus according to claim 11, wherein, among light beams having a plurality of wavelengths, a light beam having the longest wavelength is set as the signal light beam and two (2) or more light beams having a wavelength shorter than that of the signal light beam are set as the control light beam, the optical path switching mechanism for which the wavelength that the thermal lens forming device therein absorbs is the shortest is set as a first stage, and the optical path switching mechanisms in the latter stages are connected in increasing order of the wavelength absorbed by each of the thermal lens forming devices.

15. A method of switching optical paths for optical signals comprising the steps of:
   causing a signal light beam having one (1) or more wavelengths and a control light beam having two (2) or more wavelengths that are different from those of the signal light beam to travel substantially coaxial and in the same direction;
   converging and irradiating respectively the control light beam and the signal light beam to each of two (2) or more light-absorbing layer films that transmits the signal light beam and absorbs selectively only one specific wavelength of the control light beam;
   at each of two (2) or more thermal lens forming devices each containing the light-absorbing layer films, by using a thermal lens based on a distribution of refractive index produced reversibly caused by temperature increase generated in an area of the light-absorbing layer film that has absorbed the one (1) specific wavelength of the control light beam and in the periphery thereof, in response to the presence or absence of irradiation of the control light beam having the one (1) specific wavelength, causing the converged signal light beam to exit as converged or to exit varying the divergence angle thereof; and
   using a hole-provided mirror having a reflecting surface, in response to the presence or absence of irradiation of the control light beam of the one (1) specific wavelength, causing the signal light beam output from the thermal lens forming device to travel straight from the hole or changing the optical paths thereof by reflecting the signal light beam at the reflecting surface.

16. A method of switching optical paths for optical signals light-absorbing layer film contains two (2) or more pigments selected from a group consisting of:
   N,N'-bis(2,5-di-tert-butylphenyl)-3,4,9,10-perylenedicarboxyimide) [1],

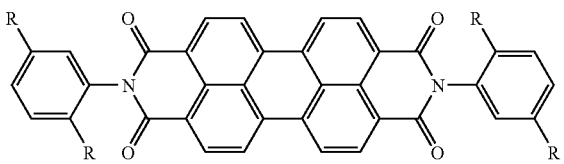

[R = C(CH$_3$)$_3$]

Copper(11)2,9,16,23-tetra-tert-butyl-29H,31H-phthalocyanine [2],

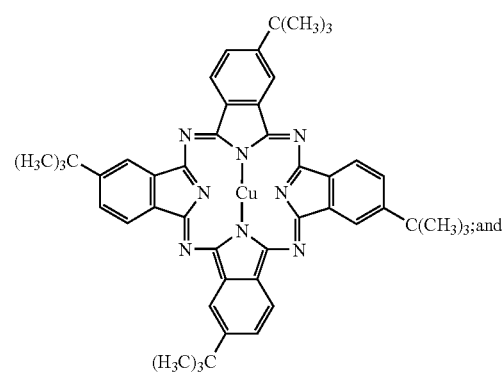

Vanadyl 2,11,20,29-tetra-tert-butyl-2,3-naphthalocyanine [3],

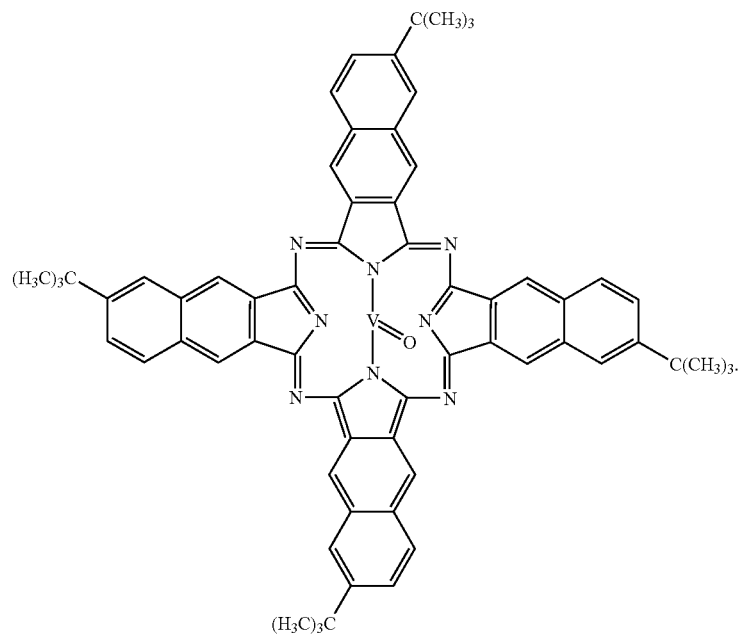

17. A method of switching optical paths for optical signals comprising the steps of:
- causing a signal light beam having one (1) or more wavelength(s) and a control light beam having two (2) or more wavelengths that are different from those of the signal light beam to travel substantially coaxial and in the same direction;
- converging and irradiating respectively the control light beam and the signal light beam to each of two (2) or more light-absorbing layer films that transmits the signal light beam and absorbs selectively only one specific wavelength of the control light beam;
- at each of two (2) or more thermal lens forming devices each containing the light-absorbing layer films, by using a thermal lens based on a distribution of refractive index produced reversibly caused by temperature increase generated in an area of the light-absorbing layer film that has absorbed the one (1) specific wavelength of the control light beam and in the periphery thereof, causing the converged signal light beam to exit from the thermal lens forming device with an ordinary divergence angle when the one (1) specific wavelength of the control light beam has not been irradiated and no thermal lens has been formed in the vicinity of an incidence surface of the light-absorbing layer film, and causing the converged signal light beam to exit from the thermal lens forming device with a divergence angle larger than the ordinary divergence angle when the one (1) specific wavelength of the control light beam has been irradiated and a thermal lens has been formed, and causing the divergence angle of the signal light beam directed to exit to vary in response to presence/absence of irradiation of the control light beam having the one (1) specific wavelength;
- passing through the hole of a hole-provided mirror either the signal light beam output from the thermal lens forming device with the ordinary divergence angle as is, or the signal light beam with the divergence angle varied by a light-receiving lens when the one (1) specific wavelength of the control light beam has not been irradiated and no thermal lens has been formed; and
- reflecting, using a reflecting surface of the hole-provided mirror, either the signal light beam output diverging from the thermal lens forming device with the divergence angle larger than the ordinary divergence angle as is, or the signal light beam with the divergence angle varied by a light-receiving lens when the one (1) specific wavelength of the control light beam has been irradiated and a thermal lens has been formed in the vicinity of an incidence surface of the light-absorbing layer film and, thereby, changing the optical paths.

18. A method of switching optical paths comprising the steps of:
- causing a signal light beam having one (1) or more wavelength(s) and a control light beam having two (2) or more wavelengths that are different from those of the signal light beam to travel substantially coaxial and in the same direction;
- converging and irradiating the control light beam and the signal light beam to each of two (2) or more light-absorbing layer films that transmits the signal light beam and absorbs selectively only one specific wavelength of the control light beam;
- at each of two (2) or more thermal lens forming devices each containing the light-absorbing layer films, by using a thermal lens based on a distribution of refractive index produced reversibly caused by temperature increase generated in an area of the light-absorbing layer film that has absorbed the one (1) specific wavelength of the control light beam and in the periphery thereof, causing the converged signal light beam to exit as converged when the one (1) specific wavelength of the control light beam has been irradiated and a thermal lens has been formed in the vicinity of an exiting surface of the light-absorbing layer film, and causing the converged signal light beam to exit with an ordinary divergence angle when the control light beam has not been irradiated and no thermal lens has been formed, and changing the divergence angle of the signal light beam directed to exit in response to the presence or absence of irradiation of the control light beam having the one (1) specific wavelength;
- causing the converged signal light beam output from the thermal lens forming device as converged to pass through the hole of the hole-provided mirror and to travel straight when the one (1) specific wavelength of the control light beam has been irradiated and a thermal lens has been formed in the vicinity of an exiting surface of the light-absorbing layer film; and
- changing the optical path by reflecting using a reflecting surface of the hole-provided mirror either the optical path of the signal light beam output from the thermal lens forming device with the ordinary divergence angle as is, or the signal light beam of which the divergence angle has been changed the light-receiving lens when the one (1) specific wavelength of the control light beam has not been irradiated and no thermal lens has been formed.

* * * * *